(12) United States Patent
Yoshida

(10) Patent No.: US 9,010,640 B2
(45) Date of Patent: *Apr. 21, 2015

(54) STREAM DOT PATTERN, METHOD OF FORMING STREAM DOT PATTERN, INFORMATION INPUT/OUTPUT METHOD USING STREAM DOT PATTERN, AND DOT PATTERN

(76) Inventor: Kenji Yoshida, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/384,134

(22) PCT Filed: Jul. 13, 2010

(86) PCT No.: PCT/JP2010/061849
§ 371 (c)(1),
(2), (4) Date: Jan. 13, 2012

(87) PCT Pub. No.: WO2011/007783
PCT Pub. Date: Jan. 20, 2011

(65) Prior Publication Data
US 2012/0118968 A1 May 17, 2012

(30) Foreign Application Priority Data

Jul. 13, 2009 (JP) .................................. 2009-165163

(51) Int. Cl.
*G06K 19/00* (2006.01)
*G06K 19/06* (2006.01)
(Continued)

(52) U.S. Cl.
CPC ........ *G06F 3/0317* (2013.01); *G06K 19/06037* (2013.01); *H04N 1/4051* (2013.01); *G06K 1/121* (2013.01)

(58) Field of Classification Search
USPC ........................................................ 235/462
See application file for complete search history.

(56) References Cited

U.S. PATENT DOCUMENTS

2007/0164110 A1 * 7/2007 Yoshida .................... 235/454
2010/0133351 A1   6/2010 Yoshida
(Continued)

FOREIGN PATENT DOCUMENTS

CN   101086761 A   12/2007
JP   1-296391 A    11/1989
(Continued)

OTHER PUBLICATIONS

International Search Report of PCT/JP2010/061849, mailing date Sep. 21, 2010.
(Continued)

*Primary Examiner* — Matthew Mikels
(74) *Attorney, Agent, or Firm* — Westerman, Hattori, Daniels & Adrian, LLP

(57) ABSTRACT

A stream dot technique forming a dot pattern at an arbitrary position on a curved surface body or a medium surface by including the step of linearly and consecutively arranging a plurality of reference dots according to a predetermined rule, providing a first virtual reference line which connects the plurality of reference dots, providing a second virtual reference line which is defined at a predetermined position from the reference dot and/or the first virtual reference line, providing a plurality of virtual reference points at predetermined positions on the second virtual reference line, and placing an information dot whose information is defined by a distance and a direction from the virtual reference point at an end point expressed by a vector with the virtual reference point being a start point.

61 Claims, 35 Drawing Sheets

(51) Int. Cl.
  *H04N 1/405* (2006.01)
  *G06K 1/12* (2006.01)
  *G06F 3/03* (2006.01)

(56) References Cited

U.S. PATENT DOCUMENTS

2011/0011925 A1  1/2011  Yoshida
2012/0320425 A1* 12/2012 Yoshida ................ 358/1.18

FOREIGN PATENT DOCUMENTS

| JP | 11-316795 A | 11/1999 |
| JP | 2007-012016 A | 1/2007 |
| JP | 2007-12016 A | 1/2007 |
| JP | 2008-210402 A | 9/2008 |
| JP | 2009-153058 A | 7/2009 |
| JP | 2009-163354 A | 7/2009 |
| WO | 2004-084125 A1 | 9/2004 |

OTHER PUBLICATIONS

Japanese Office Action dated Aug. 11, 2014, issued in related Japanese Patent Application No. 2011-141412 (3 pages).
Chinese Search Report issued in Chinese Patent Application No. 2010800314846 (2 pages).

* cited by examiner

POSITION AT WHICH REFERENCE DOT SHOULD BE PLACED

FIG.13
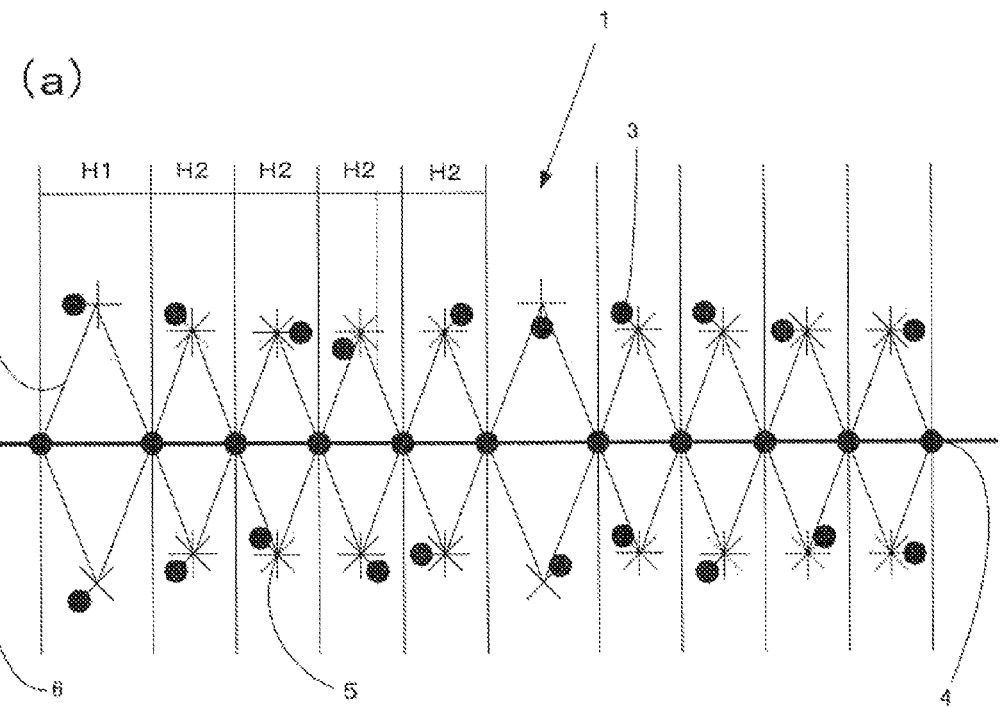
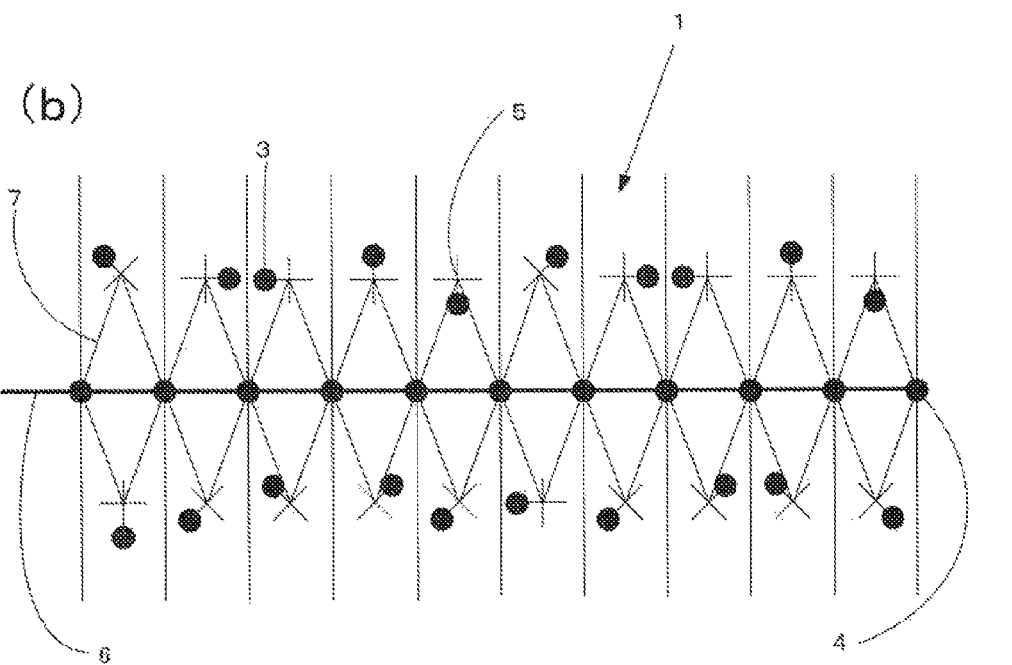

FIG.18
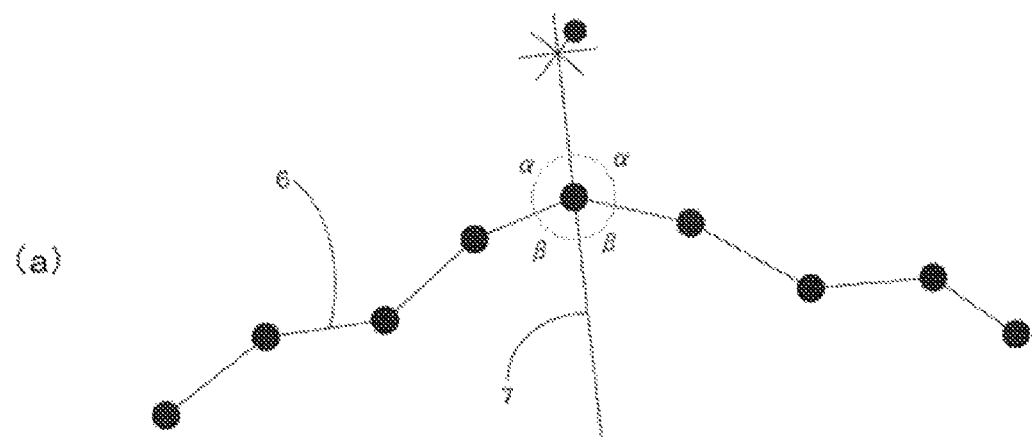
(a)
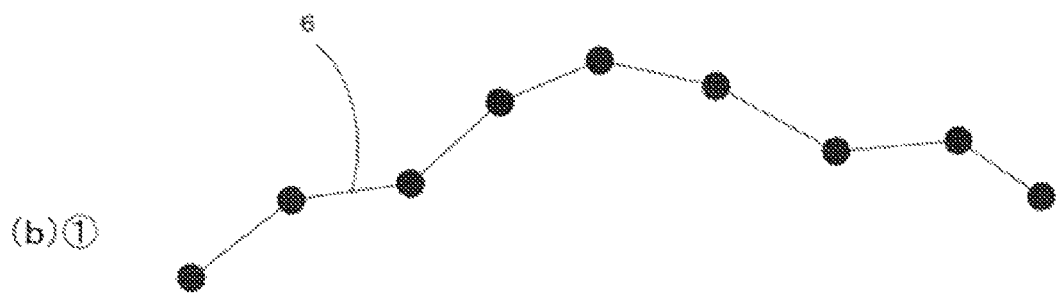
(b)①
POINT SERVING AS REFERENCE
FOR VARIOUS KINDS OF
PROCESSING (FOR EXAMPLE,
DEFINITION OF SECOND VIRTUAL
REFERENCE LINE) IN ADDITION TO
REFERENCE DOT
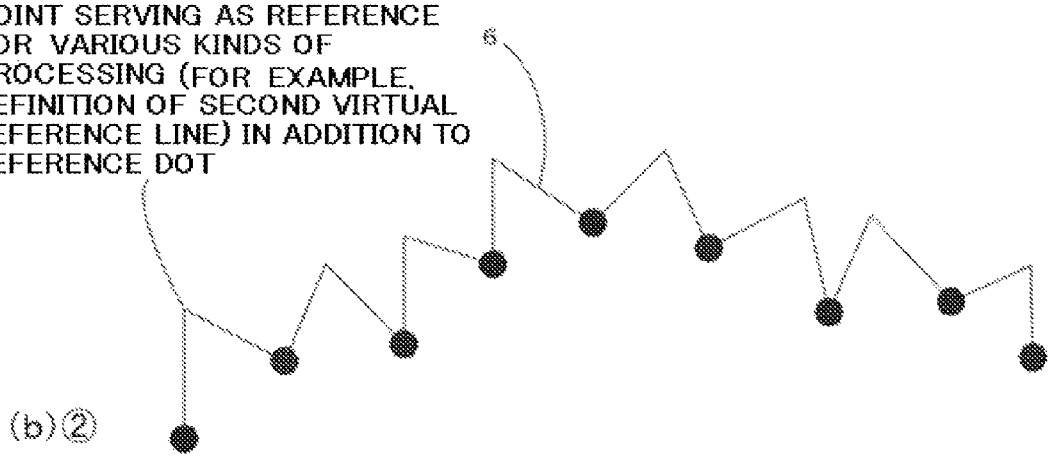
(b)②

FIG.19
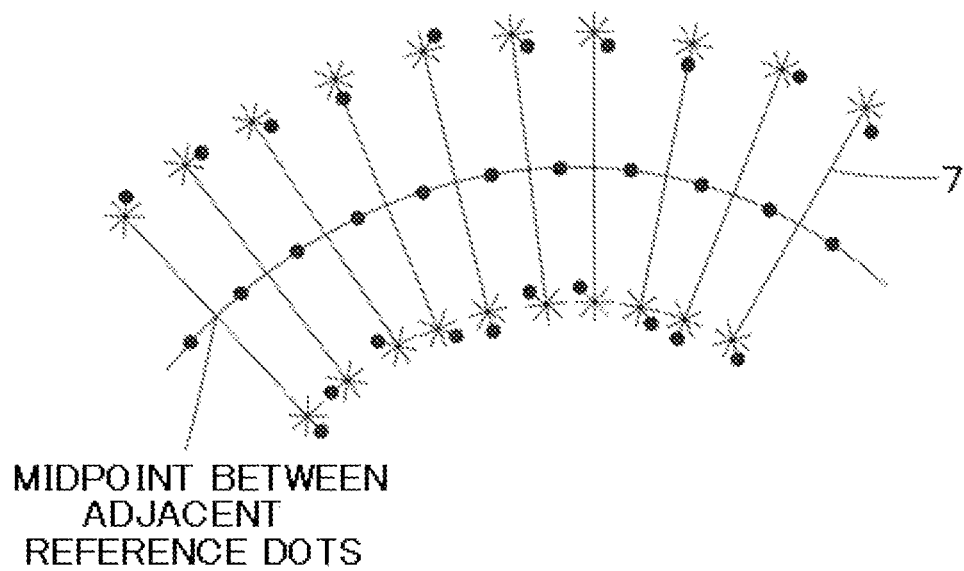
(a)
MIDPOINT BETWEEN ADJACENT REFERENCE DOTS
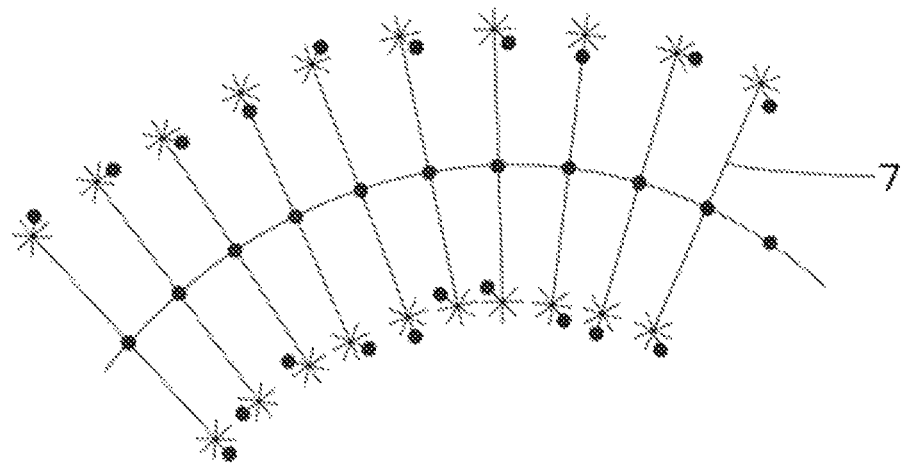
(b)

(a)

(b)

FIG.24
(a)
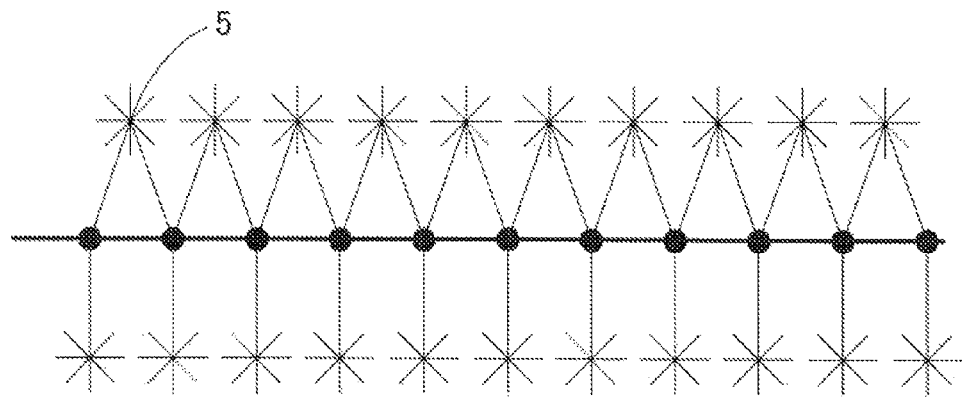
(b)
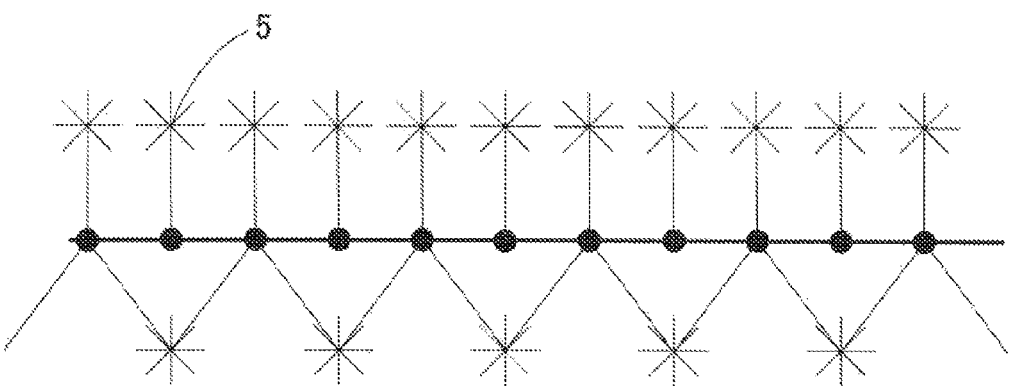
(c)
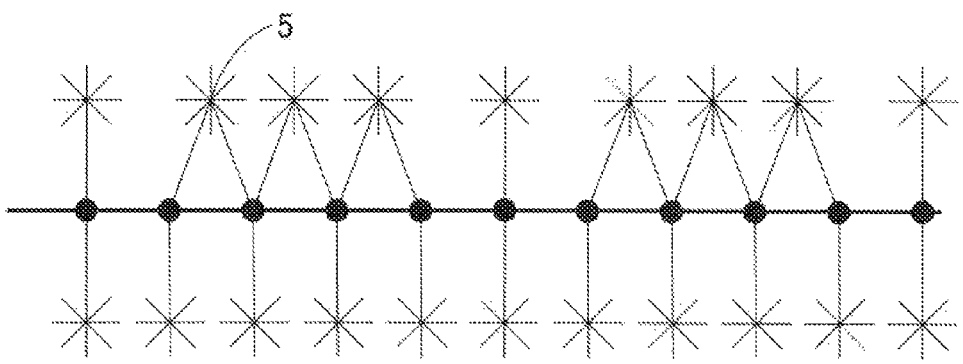

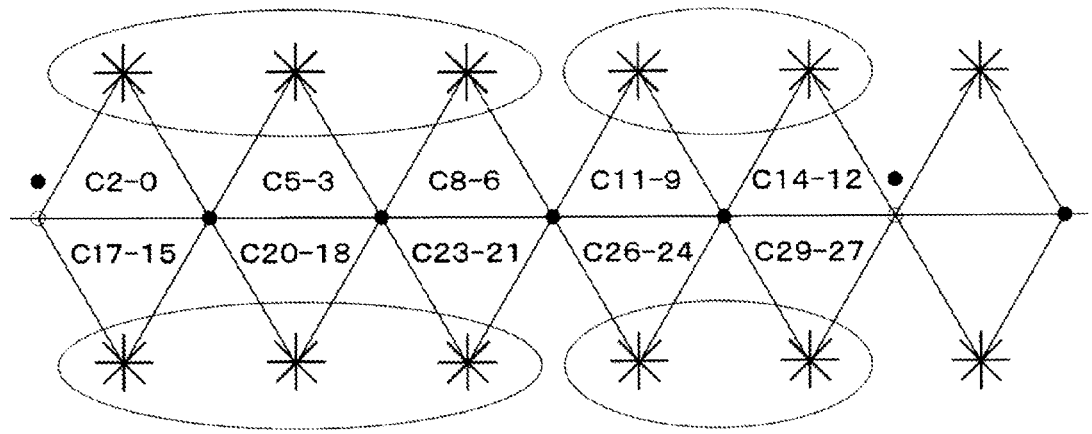

(b)

| C29 | C28 | C27 | C26 | C25 | C24 | C23 | C22 | C21 | C20 | C19 | C18 | C17 | C16 | C15 | C14 | C13 | C12 | C11 | C10 | C9 | C8 | C7 | C6 | C5 | C4 | C3 | C2 | C1 | C0 |
|---|---|---|---|---|---|---|---|---|---|---|---|---|---|---|---|---|---|---|---|---|---|---|---|---|---|---|---|---|---|
| PARITY | | | Z-COORDINATE VALUE | | | | | | | | | Y-COORDINATE VALUE | | | | | | | | | X-COORDINATE VALUE | | | | | | | | |

(c)

| C29 | C28 | C27 | C26 | C25 | C24 | C23 | C22 | C21 | C20 | C19 | C18 | C17 | C16 | C15 | C14 | C13 | C12 | C11 | C10 | C9 | C8 | C7 | C6 | C5 | C4 | C3 | C2 | C1 | C0 |
|---|---|---|---|---|---|---|---|---|---|---|---|---|---|---|---|---|---|---|---|---|---|---|---|---|---|---|---|---|---|
| PARITY | CODE VALUE | | Z-COORDINATE VALUE | | | | | | | Y-COORDINATE VALUE | | | | | | | X-COORDINATE VALUE | | | | | | | | | | | | |

(d)

| C29 | C28 | C27 | C26 | C25 | C24 | C23 | C22 | C21 | C20 | C19 | C18 | C17 | C16 | C15 | C14 | C13 | C12 | C11 | C10 | C9 | C8 | C7 | C6 | C5 | C4 | C3 | C2 | C1 | C0 |
|---|---|---|---|---|---|---|---|---|---|---|---|---|---|---|---|---|---|---|---|---|---|---|---|---|---|---|---|---|---|
| PARITY | CODE VALUE | | Y-COORDINATE VALUE | | | | | | | Y-COORDINATE VALUE | | | | | | | X-COORDINATE VALUE | | | | | | | | | | | | |

(e)

| C29 | C28 | C27 | C26 | C25 | C24 | C23 | C22 | C21 | C20 | C19 | C18 | C17 | C16 | C15 | C14 | C13 | C12 | C11 | C10 | C9 | C8 | C7 | C6 | C5 | C4 | C3 | C2 | C1 | C0 |
|---|---|---|---|---|---|---|---|---|---|---|---|---|---|---|---|---|---|---|---|---|---|---|---|---|---|---|---|---|---|
| PARITY | CODE VALUE | | | | | | | | | | | | | | | | | | | | | | | | | | | | |

(f)

| C29 | C28 | C27 | C26 | C25 | C24 | C23 | C22 | C21 | C20 | C19 | C18 | C17 | C16 | C15 | C14 | C13 | C12 | C11 | C10 | C9 | C8 | C7 | C6 | C5 | C4 | C3 | C2 | C1 | C0 |
|---|---|---|---|---|---|---|---|---|---|---|---|---|---|---|---|---|---|---|---|---|---|---|---|---|---|---|---|---|---|
| PARITY | | | Z-COORDINATE VALUE | | | | | | | | | Y-COORDINATE VALUE | | | | | | | | | X-COORDINATE VALUE | | | | | | | | |

(g)

| C29 | C28 | C27 | C26 | C25 | C24 | C23 | C22 | C21 | C20 | C19 | C18 | C17 | C16 | C15 | C14 | C13 | C12 | C11 | C10 | C9 | C8 | C7 | C6 | C5 | C4 | C3 | C2 | C1 | C0 |
|---|---|---|---|---|---|---|---|---|---|---|---|---|---|---|---|---|---|---|---|---|---|---|---|---|---|---|---|---|---|
| PARITY | CODE VALUE | | | | | | | Z-COORDINATE VALUE | | | | | | | | | | | | | | | | | | | | | |

STREAM DOT PATTERN, METHOD OF FORMING STREAM DOT PATTERN, INFORMATION INPUT/OUTPUT METHOD USING STREAM DOT PATTERN, AND DOT PATTERN

TECHNICAL FIELD

The present invention relates to an information input/output method using a dot pattern, which can input/output a variety of information by optically reading dot pattern information formed on a medium and, more particularly, to a technique of forming a stream dot pattern linearly according to a predetermined rule.

BACKGROUND ART

Conventionally, there has been proposed an information input/output method of printing, on a medium surface, a dot pattern obtained by two-dimensionally arranging fine dots according to a predetermined rule instead of a barcode so as to allow inputting/outputting of a lot of information and programs, picking up them as image data by means of a camera, digitizing the data, and then outputting information such as speech.

For example, there has been proposed a method of storing provided code information and information corresponding to XY coordinates in a storage means in advance and outputting various information or executing programs by retrieving them from code information and XY coordinates read by an optical reading means (patent literatures 1 and 2).

CITATION LIST

Patent Literature

[Patent Literature 1] PCT/JP2003/003162
[Patent Literature 2] Japanese Patent Laid-Open No. 2007-12016

SUMMARY OF INVENTION

Technical Problem

According to these dot pattern techniques (patent literatures 1 and 2) proposed by the present inventor, a region for printing a dot pattern, which is configured by a predetermined rectangular region, is arbitrarily determined in advance, and then a dot pattern is printed in the region on a medium surface. For this reason, in the case of drawings and maps including CAD drawings, characters/symbols/graphics, and the like, since the region where visible information is printed is small, very complicated operation is required to determine a region for printing a dot pattern. This makes it difficult to implement a dot pattern technique rich in convenience. This has been an unsolvable problem.

When forming a dot pattern on a medium surface, restrictions in terms of the shape of a rectangular region for the formation of a dot pattern make it impossible to properly print a dot pattern along actual lines and the like including visible curves printed on the medium surface. For example, a line itself cannot have information. In addition, owing to the restrictions in terms of shape, a dot pattern cannot be formed in an arbitrary shape at an arbitrary position on the medium surface, and dots are formed even in a region where it is not necessary to input/output information by a dot pattern technique. Furthermore, it is difficult to form dot patterns on curved surface bodies such as globes, human phantoms and the like, and various kinds of products while maintaining shapes of rectangular regions for the formation of the dot patterns.

The present invention has been made in consideration of the above problems, and has as its object to implement a stream dot technique rich in convenience by defining a plurality of pieces of information using a dot pattern formed based on reference dots arranged linearly and consecutively on a medium surface independently of the shape of a rectangular region for the formation of a dot pattern, and outputting the pieces of information by imaging operation or the like by an imaging means.

Solution to Problem

A method of forming a dot pattern according to the present invention is a method of forming a dot pattern comprising the following steps, when forming, on a medium surface, a stream dot pattern defining information according to a predetermined rule for dots:

1) arranging a plurality of reference dots linearly and consecutively on the medium surface according to a predetermined rule;
2) providing a first virtual reference line which connects the plurality of reference dots and is configured by a straight line or a polygonal line and/or a curve;
3) providing a second virtual reference line which is defined at a predetermined position from the reference dot and/or the first virtual reference line, and is formed by a straight line and/or a curve;
4) providing a plurality of virtual reference points at predetermined positions on the second virtual reference line; and
5) placing an information dot whose information is defined by a distance and a direction from the virtual reference point at an end point expressed by a vector with the virtual reference point being a start point.

This makes it possible to print a dot pattern in the form of a line including a curve on a medium surface independently of the shape of a rectangular region in a conventional dot pattern, and to input/output various kinds of information with respect to drawings and maps including CAD drawings, characters/symbols/graphics, and the like by optically reading dot pattern information formed on a medium.

In addition, continuously forming a dot pattern in the form of a strip in a circumferential direction allows to properly print the dot pattern on all types of curved surfaces such as globes, human phantoms and the like, and various kinds of products, and to optically read dot pattern information formed on a medium.

In addition, the method of forming a dot pattern according the present invention is the method of forming a dot pattern defined in claim 1 characterized in that in the step 1), a plurality of reference dots arranged linearly and consecutively are arranged at predetermined intervals.

This facilitates a search for the first and second virtual reference lines, and can save the calculation time due to the complexity of an algorithm.

In addition, the method of forming a dot pattern according the present invention is the method of forming a dot pattern according to claim 1, characterized in that in the step 4), a plurality of virtual reference points provided on the second virtual reference line are provided on the plurality of reference dots in place of the second virtual reference line.

This makes it possible to define information by the distance and direction from a reference dot, and hence allows to save the calculation time due to the complexity of the algorithm for searching for a virtual reference point. This can therefore reduce errors caused by calculation for obtaining the position of a virtual reference point.

In addition, the method of forming a dot pattern according the present invention is the method of forming a dot pattern according to claim 1, characterized by further comprising, after the step 4), a step of providing the plurality of virtual reference points on the plurality of reference dots.

In addition, the method of forming a dot pattern according the present invention is the method of forming a dot pattern according to claim 1, characterized by further comprising, after the step 4), a step of placing a reference dot on the virtual reference point.

This makes it possible to prevent deterioration in reading accuracy accompanying an increase in the area of a region configuring a predetermined information group of a dot pattern.

In addition, the method of forming a dot pattern according the present invention is the method of forming a dot pattern according to claim 1, characterized by further comprising, after the step 4), a step of providing a virtual reference point at a predetermined position at which a reference dot placed on the virtual reference point is connected to a reference dot placed on the first virtual reference line.

In addition, the method of forming a dot pattern according the present invention is the method of forming a dot pattern according to claim 1, characterized in that in the step 1), a plurality of reference dots arranged linearly and consecutively according to a predetermined rule are arranged in not less than two rows at least on the medium surface, in the step 2), not less than two first virtual reference lines which connect a plurality of reference dots and are formed by straight lines or polygonal lines and/or curves are provided in correspondence with the reference dots in not less than two rows, and in the step 3), a second virtual reference line defined at a predetermined position from a reference dot and/or a first virtual reference line is defined between the not less than two first virtual reference lines.

In addition, the method of forming a dot pattern according the present invention is the method of forming a dot pattern according to claim 7, characterized in that the second virtual reference line comprises a straight line connecting a plurality of reference dots arranged on the not less than two different first virtual reference lines.

In addition, the method of forming a dot pattern according the present invention is the method of forming a dot pattern according to claim 7, characterized in that in the step 4), a plurality of virtual reference points arranged at predetermined positions on second virtual reference lines are provided at midpoints of the second virtual reference lines.

In addition, the method of forming a dot pattern according the present invention is the method of forming a dot pattern according to claim 1, characterized in that in the step 3), second virtual reference lines defined at predetermined positions from reference dots and/or a first virtual reference line comprise straight lines configuring opposite sides forming a triangle having, as a base, a first virtual reference line connecting adjacent reference dots with a straight line, and in the step 4), a plurality of virtual reference points provided at predetermined positions on second virtual reference lines are provided on vertices of the triangle or on opposite sides of the triangle.

In addition, the method of forming a dot pattern according the present invention is the method of forming a dot pattern according to claim 10, characterized in that the triangle is defined by predetermined base angles at the adjacent reference dots and lengths of opposite sides corresponding to predetermined magnifications relative to the base or a height from the base to the vertex which corresponds to a predetermined magnification ratio relative to the base.

In addition, the method of forming a dot pattern according the present invention is the method of forming a dot pattern according to claim 10, characterized in that the triangle comprises an isosceles triangle.

In addition, the method of forming a dot pattern according the present invention is the method of forming a dot pattern according to claim 10, characterized in that the triangle comprises an equilateral triangle.

In addition, the method of forming a dot pattern according the present invention is the method of forming a dot pattern according to claim 1, characterized in that in the step 3), a second virtual reference line defined at a predetermined position from a reference dot and/or a first virtual reference line comprises a straight line which divides an interior angle at a vertex of the first virtual reference line formed by the polygonal line into equal halves, and in the step 4), a plurality of virtual reference points provided at predetermined positions on the second virtual reference lines are provided at predetermined distances from the plurality of reference dots.

In addition, the method of forming a dot pattern according the present invention is the method of forming a dot pattern according to claim 1, characterized in that in the step 2), a first virtual reference line which connects a plurality of reference dots and is formed by a polygonal line is provided with only a portion where the reference dot is placed being a vertex.

In addition, the method of forming a dot pattern according the present invention is the method of forming a dot pattern according to claim 1, characterized in that in the step 3), a second virtual reference line defined at a predetermined position from a reference dot and/or a first virtual reference line comprises a straight line which forms an arbitrary angle with respect to a tangent to the first virtual reference line formed by the curve, and in the step 4), a plurality of virtual reference points provided at predetermined positions on second virtual reference lines are provided at predetermined positions determined from the adjacent dots.

In addition, the method of forming a dot pattern according the present invention is the method of forming a dot pattern according to claim 16, characterized in that a predetermined position determined from the adjacent reference dots is defined by an intersection point between the second virtual reference lines which form predetermined angles from the adjacent reference dots, a distance from the reference dot corresponding to a predetermined magnification ratio relative to a length of the first virtual reference line formed by the curve connecting the adjacent reference dots, or a height from the first virtual reference line, formed by a curve connecting the adjacent reference dots, which corresponds to a predetermined magnification ratio relative to a length of the first virtual reference line.

In addition, the method of forming a dot pattern according the present invention is the method of forming a dot pattern according to claim 1, characterized in that in the step 3), a second virtual reference line defined at a predetermined position from a reference dot and/or a first virtual reference line comprises a straight line passing through the reference dot or a midpoint of the adjacent reference dots.

In addition, the method of forming a dot pattern according the present invention is the method of forming a dot pattern according to claim 1, characterized in that in the step 3), a second virtual reference line defined at a predetermined position from a reference dot and/or a first virtual reference line comprises a straight line perpendicular to the first virtual reference line formed by a straight line or a straight line perpendicular to a tangent to the first virtual reference line formed by a curve, and in the step 4), a plurality of virtual reference points provided at predetermined positions on second virtual reference lines are provided at predetermined positions determined from the adjacent reference dots.

In addition, the method of forming a dot pattern according the present invention is the method of forming a dot pattern according to claim 1, characterized in that in the fourth step 4), a plurality of virtual reference points provided at predetermined positions on a second virtual reference line are provided at predetermined distances from the first virtual reference line formed from a straight line or from a tangent to the first virtual reference line formed by a curve.

In addition, the method of forming a dot pattern according the present invention is the method of forming a dot pattern according to claim 1, characterized in that in the step 1), a plurality of reference dots arranged linearly and consecutively are arranged at different intervals, and a direction of a dot pattern and a predetermined information group of the dot pattern are defined by the arrangement intervals.

In addition, the method of forming a dot pattern according the present invention is the method of forming a dot pattern according to claim 21, characterized in that the plurality of reference dots are arranged for each predetermined information group of the dot pattern such that an interval between at least one pair of the adjacent reference dots differs from uniform intervals between other pairs of the adjacent reference dots, and a predetermined information group of the dot pattern is defined by the arrangement intervals.

In addition, the method of forming a dot pattern according the present invention is the method of forming a dot pattern according to claim 21, characterized in that the plurality of reference dots are arranged for each predetermined information group of the dot pattern such that intervals between at least two pairs of the adjacent reference dots differ from uniform intervals between other pairs of the adjacent reference dots, and a direction of the dot pattern and a predetermined information group of the dot pattern are defined by the arrangement intervals.

In addition, the method of forming a dot pattern according the present invention is the method of forming a dot pattern according to claim 1, characterized in that in the step 5), information dots each of whose information is defined by a distance and a direction from the virtual reference point at an end point expressed by a vector with the virtual reference point being a start point are placed on two opposite sides of the first virtual reference line in different shifting directions, and a direction of the dot pattern and a predetermined information group of the dot pattern are defined by a difference between the shifting directions.

In addition, the method of forming a dot pattern according the present invention is the method of forming a dot pattern according to claim 1, characterized in that in the step 4), a plurality of virtual reference points provided at predetermined positions on second virtual reference lines are arranged such that different numbers of virtual reference points are arranged on two sides of the first virtual reference line, and a direction of the dot pattern and a predetermined information group of the dot pattern are defined by a difference between the numbers.

In addition, the method of forming a dot pattern according the present invention is the method of forming a dot pattern according to claim 1, characterized in that in the step 5), information dots each of whose information is defined by a distance and a direction from the virtual reference point at an end point expressed by a vector with the virtual reference point being a start point are arranged such that different numbers of information dots are arranged on two sides of the first virtual reference line, and a direction of the dot pattern and a predetermined information group of the dot pattern are defined by a difference between the numbers.

In addition, the method of forming a dot pattern according the present invention is the method of forming a dot pattern according to claim 1, characterized in that in the step 5), information is defined depending on whether an information dot whose information is defined by a distance and a direction from the virtual reference point at an end point expressed by a vector with the virtual reference point being a start point is placed at each of the virtual reference points, placed on the virtual reference point, or placed on neither thereof.

This allows a flexible way of arranging information dots, that is, placing an information dot at a position shifted from a given virtual reference point of a plurality of virtual reference points arranged in one dot pattern (with the distance and direction being other than 0), placing an information dot on another virtual reference point (with the distance and direction being 0), and placing no information dot on still another virtual reference point (with no information dot).

In addition, the method of forming a dot pattern according the present invention is the method of forming a dot pattern according to claim 1, characterized in that in the step 1), a direction of the dot pattern and a predetermined information group are defined by shifting and placing at least one of the plurality of reference dots as a key dot at a predetermined position.

n addition, the method of forming a dot pattern according the present invention is the method of forming a dot pattern according to claim 28, characterized by further comprising, after the step 3), a step of defining a direction of the dot pattern and a predetermined information group by placing the key dot at a predetermined position in a direction parallel or perpendicular to a direction of the second virtual reference line.

In addition, the method of forming a dot pattern according the present invention is the method of forming a dot pattern according to claim 28, characterized by further comprising, after the step 3), a step of providing a third virtual reference line which passes through at least one of the plurality of reference dots and is perpendicular to a straight line forming the first virtual reference line or a tangent to a curve forming the first virtual reference line, or divides an interior angle into equal halves at a vertex of a polygonal line forming the first virtual reference line, and defining a direction of the dot pattern and a predetermined information group by placing the key dot at a predetermined position on the third virtual reference line.

In addition, the method of forming a dot pattern according the present invention is the method of forming a dot pattern according to claim 28, characterized in that in the step 3), a second virtual reference line defined at a predetermined position from a reference dot and/or a first virtual reference line is defined from only a reference dot other than the reference dot shifted as the key dot.

In addition, the method of forming a dot pattern according the present invention is the method of forming a dot pattern according to claim 1, characterized by further comprising, after the step 2), a step of providing a third virtual reference line which passes through at least one of the plurality of reference dots and is perpendicular to a straight line forming the first virtual reference line or a tangent to a curve forming the first virtual reference line, or divides an interior angle into equal halves at a vertex of a polygonal line forming the first virtual reference line, and placing at least one side dot, at a predetermined position on the third virtual reference line, which defines a direction of the dot pattern and a predetermined information group.

In addition, the method of forming a dot pattern according the present invention is the method of forming a dot pattern according to claim 32, characterized in that in the step 4), a plurality of virtual reference points provided at predetermined position on second virtual reference lines are provided on a fourth virtual reference line which is parallel to the first virtual reference line and passes through the side dot.

In addition, the method of forming a dot pattern according the present invention is the method of forming a dot pattern according to claim 33, characterized in that the plurality of virtual reference points are provided at predetermined intervals on the fourth virtual reference line.

In addition, the method of forming a dot pattern according the present invention is the method of forming a dot pattern according to claim 32, characterized in that at least not less than one of the side dots is placed on each of two sides of the first virtual reference line such that the side dots are located at different distances from the first virtual reference line, and a direction of the dot pattern is defined by distances between the side dots and the first virtual reference line.

In addition, the method of forming a dot pattern according the present invention is the method of forming a dot pattern according to claims 28 and 32, characterized in that at least not less than one of the side dots is placed on each of two sides of the first virtual reference line such that the side dots are located at equal distances from the first virtual reference line, and a direction of the dot pattern and a predetermined information group of the dot pattern are defined by a distance between the side dot and the key dot.

This makes it possible to recognize the shifting direction of a key dot from the distance from a side dot in addition to a shift from the first virtual reference line. It is therefore possible to recognize the direction of the dot pattern more accurately.

In addition, the method of forming a dot pattern according the present invention is the method of forming a dot pattern according to claim 1, characterized in that a reference dot and/or an information dot is formed by a polygonal shape configured to express a direction, and a direction of the dot pattern is defined by the shape.

In addition, the method of forming a dot pattern according the present invention is the method of forming a dot pattern according to claim 1, characterized in that one reference dot and/or an information dot is formed to have a size different from that of other reference dots and/or other information dots, and a direction of the dot pattern and a predetermined information group are defined from a difference between the sizes.

In addition, the method of forming a dot pattern according the present invention is the method of forming a dot pattern according to claim 1, characterized in that one reference dot and/or an information dot is formed to have a shape different from that of other reference dots and/or other information dots, and a direction of the dot pattern and a predetermined information group are defined from a difference between the shapes.

In addition, the method of forming a dot pattern according the present invention is the method of forming a dot pattern according to claim 1, characterized in that a reference dot and/or an information dot is printed by ink having a property of exhibiting a different reaction to irradiation light than ink used to print visible information on a medium surface.

In addition, the method of forming a dot pattern according the present invention is the method of forming a dot pattern according to claim 40, characterized in that the ink having the property of exhibiting the different reaction is invisible.

In addition, the method of forming a dot pattern according the present invention is the method of forming a dot pattern according to claim 40, characterized in that the irradiation light comprises infrared light, the ink having the property comprises an infrared-absorbing ink, and the ink used to print visible information on a medium surface comprises an infrared-transmitting ink or an infrared-reflecting ink.

In addition, the information input/output method using a dot pattern according the present invention is the information input/output method used for a stream data pattern formed by a method defined in claim 1, characterized by comprising:

a step of causing optical reading means to pick up a predetermined position, a predetermined region, or an entire region on a medium surface, as image data, which configures the stream dot pattern; and a step of causing information processing means to obtain a code value and/or a coordinate value by analyzing the image data and output corresponding information or execute a corresponding program.

In addition, the information input/output method using a dot pattern according the present invention is the information input/output method according to claim 43, characterized in that the optical reading means reads a dot pattern at a predetermined position, in a predetermined region, or in an entire region while being in contact or spaced apart from a medium surface, or reads a dot pattern formed linearly.

A dot pattern according the present invention is a stream dot pattern characterized by comprising:

a plurality of reference dots arranged linearly and consecutively on a medium surface according to a predetermined rule;

a first virtual reference line which connects the plurality of reference dots and is formed by a straight line or a polygonal line and/or a curve;

a second virtual reference line which is defined at a predetermined position from the reference dot and/or the first virtual reference line, and is formed by a straight line and/or a curve;

a plurality of virtual reference points provided at predetermined positions on the second virtual reference line; and an information dot whose information is defined by a distance and a direction from the virtual reference point.

This makes it possible to form a dot pattern along an actual line including a curve. In addition, since predetermined information groups determined by a predetermined rule for dot patterns are consecutively provided, it is possible to adjust the length of a predetermined information group, as a design consideration, in a predetermined range by increasing or decreasing the intervals of predetermined information groups based on the length of the actual line.

In addition, deriving the length of predetermined information groups, as an average length, from the length of an actual line can prevent a decrease in information amount and the distortion of a dot pattern that occurs to the extent that a reading means cannot read it, due to the differences between the length, interval, size, and number of dots near the end portion (near the joint between strips) and those of other consecutive dot patterns, when consecutively forming stream dot patterns in the form of strips on, for example, a curved body in the circumferential direction.

In this case, the predetermined range is defined by the minimum value at which it is guaranteed to analyze image data obtained by imaging a predetermined information group using an optical reading means. With the state-of-the-art optical reading means, the minimum value is almost 1 mm to several mm. Obviously, advances in technology will make the minimum value approach 0 without limit.

In this case, the optical reading means is, for example, a camera or a scanner. The scanner includes a pen-type scanner and a flatbed scanner.

The manner of adjustment is not limited to this. It is possible to perform adjustment by changing the positions of dots or the predetermined interval and number of dots in a predetermined information group, that is, by making it have a so-called variable length.

This makes it possible to cope with data of various sizes within the amount of information set when each predetermined information group is made to have a variable length, that is, within the range in which information can be read by the reading means.

In addition, a dot pattern according the present invention is a dot pattern formed by arranging, in one line or a plurality of lines, a stream dot pattern according to a step of linearly and consecutively arranging a plurality of reference dots according to a predetermined rule, a step of providing a first virtual reference line which connects the plurality of reference dots and is formed by a straight line or a polygonal line and/or a curve, a step of providing at least not less than one second virtual reference line which is defined at a predetermined position from the reference dot and/or the first virtual reference line, and is formed by a straight line and/or a curve, a step of providing a plurality of virtual reference points at predetermined positions on the second virtual reference line, and a step of placing an information dot whose XY coordinate value and/or code value is defined by a distance and a direction from the virtual reference point at an end point expressed by a vector with the virtual reference point being a start point.

According to this technique, forming a plurality of stream dot patterns with constant intervals between reference points side by side can define XY coordinate values on a printing medium without any gaps and generate locus information. In addition, assume that characters, a staff notation, a map, graphics, or the like are printed on a printing medium, and the line segments are traced or touched with a scanner pen to perform some operation. In this case, forming a stream dot pattern only along the line segments allows to rationally arrange a dot pattern. When forming a dot pattern whose XY coordinates are defined as a two-dimensional code, it is possible to form a dot pattern by repeating a predetermined information group in an arbitrary shape conforming to an information region visibly formed on a medium surface without being restricted by the shape of a rectangular region (used as an index).

In addition, a dot pattern according the present invention is, the dot pattern according to claim 46, characterized in that the stream dot pattern is provided with a reference dot at a predetermined position which serves as a reference for defining the second virtual reference line and/or a direction of the dot pattern and one XY coordinate value and/or code value.

According to this technique, placing a new reference point can easily define the direction of the stream dot pattern and a predetermined information group without using any information dot. This makes it possible to suppress an unnecessary decrease in information. In addition, placing a new reference point allows to accurately indicate the position of a virtual reference point as the start point of information dots.

In addition, a dot pattern according the present invention is, the dot pattern according to any one of claims 45 to 47, characterized in that the plurality of reference dots or the plurality of virtual reference points are arranged at least on or along an actual line visibly formed on a medium surface.

This can make a line itself have information and implement information input/output operation rich in convenience.

In this case, the expression "at least" means that reference dots or virtual reference points are arranged on or along an actual line in a portion where the actual line is visibly formed on the medium surface. In a portion where no actual line is formed, it is possible to arbitrarily arrange reference dots or virtual reference points without being restricted by the above expression.

Advantageous Effects of Invention

According to the present invention, it is possible to print a dot pattern linearly on a medium surface independently of the shape of a rectangular region in which a dot pattern is formed as a two-dimensional code. In addition, it is possible to input/output various kinds of information with respect to drawings and maps including CAD drawings, characters/symbols/graphics, and the like by optically reading dot pattern information formed on a medium. It is difficult to print a dot pattern configured by a rectangular region on a curved surface body while maintaining its shape. Using a stream dot pattern according to the present invention makes it possible to properly print dot patterns on all types of curved surfaces such as globes, human phantoms and the like, and various kinds of products, and to optically read dot pattern information formed on a medium.

BRIEF DESCRIPTION OF DRAWINGS

FIG. 13 shows an example of each stream dot pattern.
FIG. 18 shows an example of a method of defining the second virtual reference line.
FIG. 19 shows an example of a method of defining the second virtual reference line.

FIG. 24 shows an example of how the direction of each dot pattern and each predetermined information group of the dot pattern are defined by the number of virtual reference points.

FIG. 33 shows an example of the format of each dot pattern.

DESCRIPTION OF EMBODIMENTS

Figure 1:
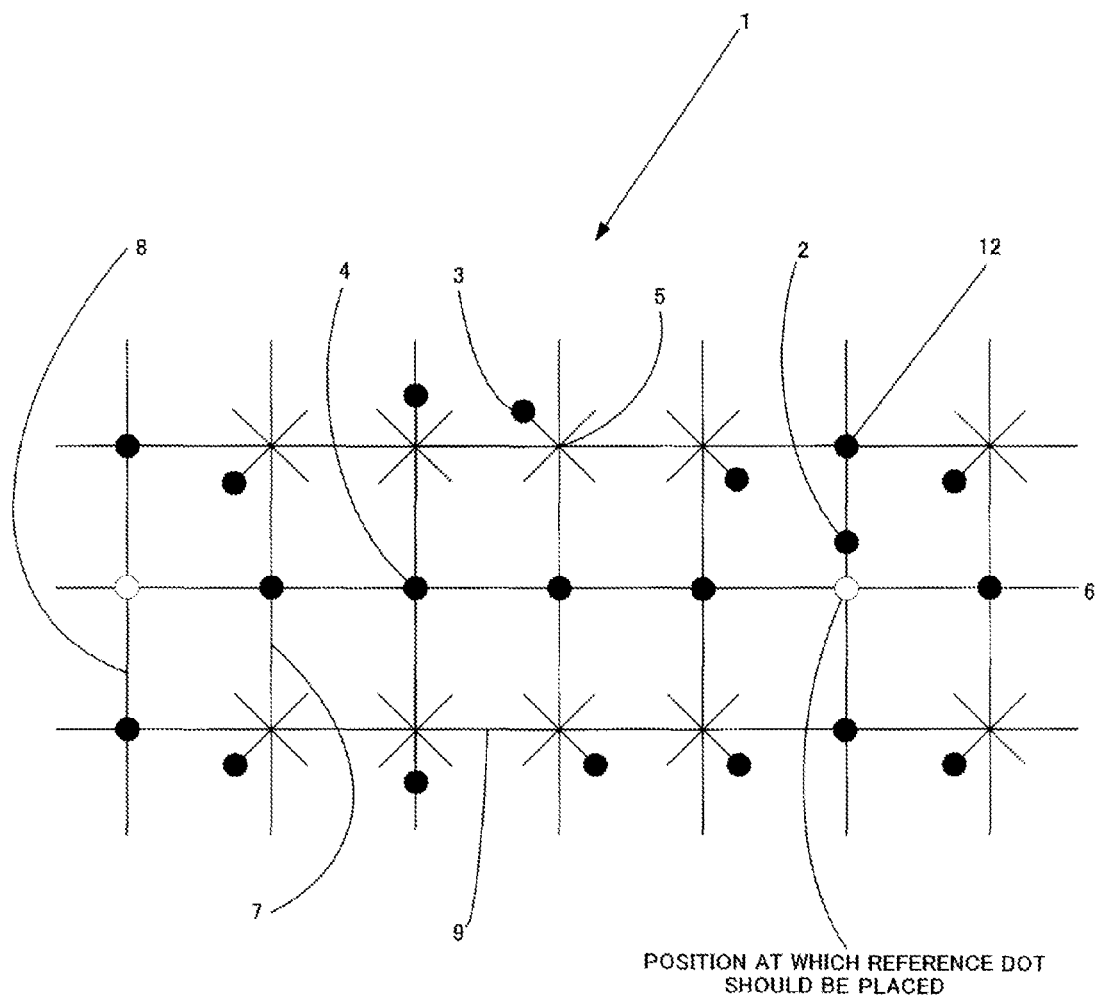
FIG. 1 is a view schematically showing a stream dot pattern.
Figure 2:
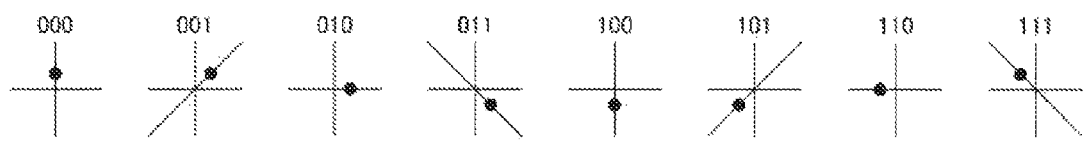
FIG. 2 is a view showing examples of the information dots of a dot pattern and the bit display of data defined on them.

FIG. 1 is a view for explaining an example of the dot pattern according to the present invention. FIG. 2 is an enlarged view showing an example of the information dots of a dot pattern and the bit display of data defined on them.

An information input/output method using a dot pattern according to the present invention includes recognition of a dot pattern 1 and a means for outputting information from the dot pattern 1 and executing a program.

This method extracts reference dots 4 first by picking up the dot pattern 1 formed in a region where information is to be provided (for example, an actual line formed on a medium) as image data using an optical reading means, and then sets a line connecting the reference dots 4 as a first virtual reference line 6. If no dots are arranged at positions where the reference dots 4 should be located on the first virtual reference line 6, dots near the positions where the reference dots 4 should be located are extracted and set as key dots 2 (on the two end portions of a predetermined information group). The method then extracts side dots 12 arranged on extended lines in the positive and negative directions of the positional shifts of the key dot 2, and sets a straight line which passes through the side dots 12 and the key dot 2 and is perpendicular to the first virtual reference line 6 as a third virtual reference line 8.

This method then sets second virtual reference lines 7 which pass through the reference dots 4 and extend in a direction perpendicular to the first virtual reference line 6, and fourth virtual reference lines 9 which pass through the side dots 12 and are parallel to the first virtual reference line 6, and sets the intersection points between the virtual reference lines as virtual reference points 5. The method then searches for a dot around the virtual reference point 5 and extracts an information dot 3 on which information is defined by the distance and direction from the virtual reference point 5.

In this case, the ratio between the arrangement interval of the reference dots 4 and the distance from the first virtual reference line 6 to the side dot 12 is 1:1. Therefore, setting a square having the reference dot 4 as a vertex and an aspect ratio of 1:1 on the first virtual reference line 6 can derive the position of the virtual reference point 5 by interpolation. Note that it is possible to arbitrarily set an aspect ratio.

This method determines the direction of a predetermined information group, i.e., the direction of the dot pattern 1, from the direction of the key dot 2 from the first virtual reference line 6. If, for example, the key dot 2 is shifted from the first virtual reference line 6 in the +Y direction, the information dots 3 in the predetermined information group may be recognized upon recognizing the shifting direction as coinciding with the correct position.

If the key dot 2 is shifted from the first virtual reference line 6 in the −Y direction, the information dots 3 in a predetermined information group may be recognized upon recognizing, as coinciding with the correct position, the direction of the predetermined information group which is set by being rotated about its center through 180°.

In this case, it is also possible to define the direction of the dot pattern 1 by the distance between the side dot 12 and the key dot 2. If, for example, the distance between the key dot 2 and the side dot 12 placed in the +Y direction is shorter than the distance between the key dot 2 and the side dot 12 placed in the −Y direction, the information dots 3 in a predetermined information group may be recognized upon recognizing the corresponding direction as coinciding with the correct position.

If the distance between the key dot 2 and the side dot 12 placed in the −Y direction is shorter than the distance between the key dot 2 and the side dot 12 placed in the +Y direction, the information dots 3 in a predetermined information group may be recognized upon recognizing, as coinciding with the correct position, the direction of the predetermined information group rotated about set by being its center through 180°.

Figure 3:
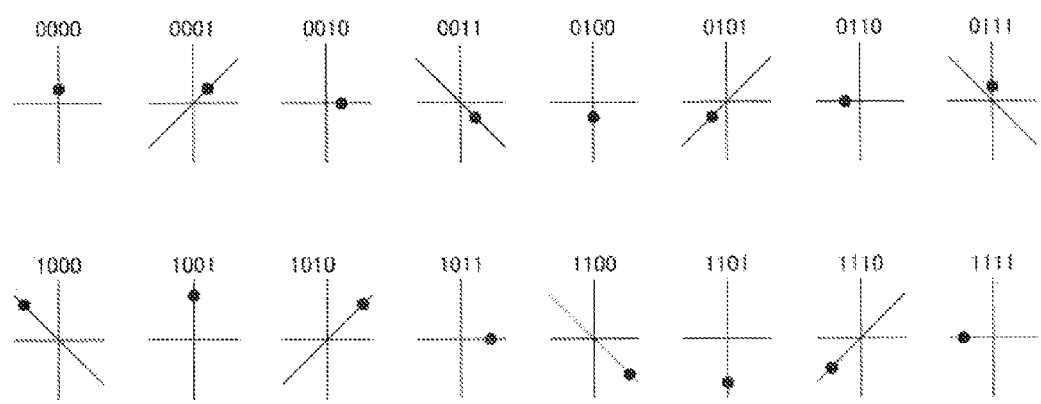
FIG. 3 is a view showing examples of the information dots of a dot pattern and the bit display of data defined on them.
Figure 4:
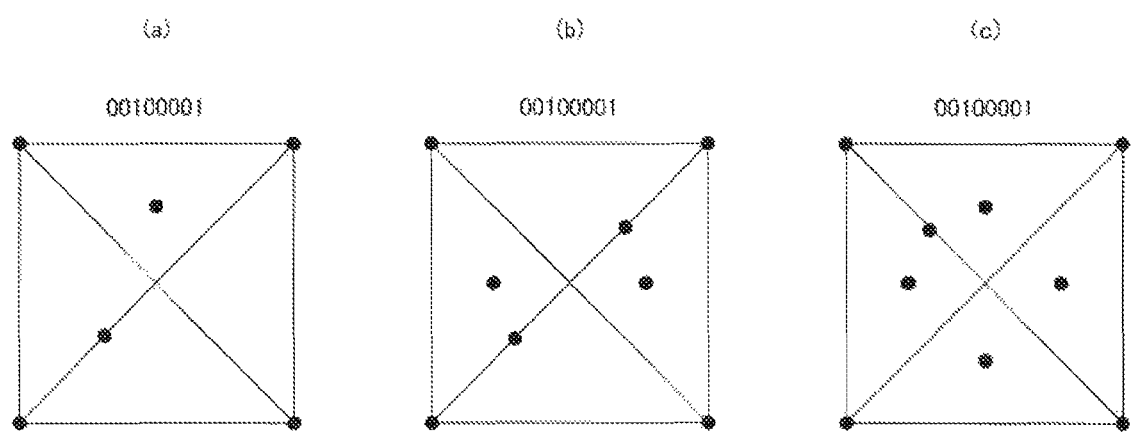
FIG. 4 is a view showing examples of the information dots of a dot pattern and the bit display of data defined on them.

When an image of the dot pattern 1 read by the optical reading means is stored in the frame buffer, the central processing unit (CPU) of the optical reading means analyzes the dots in the frame buffer to decode a numerical value defined for each information dot 3 based on the distance and direction of each information dot 3 from the virtual reference point 5 (see FIGS. 2, 3, and 4). These numerical values are then collated as XYZ coordinates or code values with information stored in the memory of the optical reading means or personal computer. As a consequence, speech, images, moving images, characters, programs, or the like corresponding to the XYZ coordinates or code values are read out and output from a display means or speech/image output means.

When generating the dot pattern 1 of the present invention, a dot code generation algorithm arranges fine dots, i.e., the key dots 2, the information dots 3, reference dots 4, and the side dots 12, in order to make information such as speech recognizable, according to a predetermined rule. (For example, linearly and consecutively arranging reference dots, providing virtual reference lines constituting a polygon by using the plurality of arranged reference dots, providing a virtual reference point at the vertex of the polygon, and providing a dot defining information at the end point of a vector having the virtual reference point as the start point. Note that it is possible to define the direction of the dot pattern by using the shape of this polygon.)

As shown in FIG. 1, a straight line in the horizontal direction which configures a predetermined information group of the dot pattern 1 formed along the linearly arranged reference dots 4 (linear in the case shown in FIG. 1) is provided as the first virtual reference line 6 on the medium.

The side dot 12 is provided on the third virtual reference line 8 perpendicular to the first virtual reference line 6 passing through the reference dot 4 (a reference dot placed as the key dot 2 in the case shown in FIG. 1). A straight line parallel to the third virtual reference line 8 passing through the reference dot 4 is set as the second virtual reference line 7. A straight line which passes through the side dot 12 and is parallel to the first virtual reference line 6 is set as the fourth virtual reference line 9. In addition, this method defines the direction in which the key dot 2 placed at a predetermined position on the medium (on the third virtual reference line 8 in the case shown in FIG. 1) shifts from the first virtual reference line 6, the direction of the dot pattern with the distance from the side dot 12, and a predetermined information group of the dot pattern 1 from the arrangement interval of the side dots 12 and/or the key dots 2.

Note that it is possible to form the dot pattern 1 along an actual line visibly formed on the medium surface. An actual line in this case is a concept relative to a virtual line and includes every line that actually exists.

For example, actual lines include solid lines, broken lines, dotted lines, straight lines, and curves. The present invention is not limited to any specific type of medium on which lines are formed (for example, the display of a video display apparatus) or any specific type of material to form lines (for example, ink). Note that a dot pattern may be a printed indication, a display indication, or a convex/concave pattern such as a hole or groove pattern on a metal or plastic medium.

The intersection point between the second virtual reference line 7 and the fourth virtual reference line 9 is set as the virtual reference point 5.

The dot pattern 1 is generated by arranging one or a plurality of information dots 3, each having a distance and direction with reference to the virtual reference point 5 set in the above manner.

When the optical reading means picks up the dot pattern 1 as image data, it is possible to correct the distortion of the lens of the optical reading means or the like, oblique imaging, the expansion and contraction of a sheet surface, the curvature of the medium surface, distortion at the time of printing by using the reference dots 4. More specifically, this method obtains correction function $(X_n, Y_n) = f(X_n', Y_n')$ which converts a plurality of virtual reference points 5 exhibiting distortion into an original polygon (a square in this case shown in FIG. 1), and corrects the information dots 3 using the same function, thereby obtaining the vectors of the correct information dots 3.

Arranging the reference dots 4 in the dot pattern 1 allows image data picked up from the dot pattern 1 by the optical reading means to correct distortion due to the optical reading means and/or distortion due to oblique imaging. Even oblique imaging by a popular camera attached with a lens with a high distortion ratio allows to correctly recognize the dot pattern 1 when picking up its image data. In addition, even if the user reads the dot pattern 1 with the optical reading means while tilting it relative to the surface of the dot pattern 1, using a predetermined algorithm makes it possible to correctly recognize the dot pattern 1.

As shown in FIG. 1, the key dots 2 are dots arranged on the two ends of a predetermined information group. The key dots 2 are the representative points of the dot pattern 1 of one region which represents one information dot group. Note that representative points can be arranged at any positions in an information dot group. Assume that the interval between adjacent reference dots is 0.5 mm. In this case, each representative dot is placed at a position shifted 0.1 mm upward from the position at which the reference dot 4 on an end portion of the region of the dot pattern 1 should be placed. If, therefore, the information dot 3 is defined by X- and Y-coordinate values from the reference dot 4, the position spaced downward from the key dot 2 by 0.1 mm corresponds to a coordinate point. However, this numerical value (0.1 mm) is not limited to the above value, and is variable in accordance with the size of the region of the dot pattern 1.

The information dots 3 are dots for the recognition of various kinds of information. Each information dot 3 is a dot placed at the end point expressed by a vector extending from the virtual reference point 5 as the start point. For example, as shown in FIG. 2, each information dot 3 is a dot which is spaced apart from the virtual reference point 5 by 0.1 mm has a direction and length which are expressed by a vector, and hence 3 bits are expressed by arranging information dots clockwise at angular intervals of 45° in eight directions.

According to FIG. 2, one predetermined information group can express 3 (bits)×8=24 bits.

In the case shown in FIG. 2, 3 bits are expressed by arranging dots in the eight directions. However, the present invention is not limited to this. It is possible to express 4 bits by arranging dots in 16 directions. Obviously, it is possible to arrange dots in arbitrary directions at arbitrary lengths.

Referring to FIG. 1, the information dots 3 are arranged at the end positions relative to all the virtual reference points 5 as the start points. However, the present invention is not limited to this. It is possible to define information depending on whether a dot is placed on a virtual reference point. For example, information can be defined such that the placement of a dot on a virtual reference point represents "1", and the placement of no dot represents "0".

The key dot 2, information dot 3, reference dot 4, and side dot 12 desirably have diameters of about 0.03 mm to 0.05 mm in consideration of appearance, the accuracy of printing relative to paper quality, the resolution of the optical reading means, optimal calculation speed, and the like. Obviously, as the accuracy of printing, the resolution of the optical reading means, and the optimal calculation speed increase with advances in technology, the dot diameter unlimitedly approaches 0.

This makes it possible to simultaneously recognize all pieces of information by imaging the entire medium surface as well as imaging at an arbitrary position on the medium surface. Even in the present conditions, using a high-precision scanner allows to simultaneously recognize information defined on the entire medium surface. On the other hand, when printing dots on a very large medium surface and remotely imaging the medium surface, the dot diameter and arrangement interval may be properly determined based on the resolution of the optical reading means and the optimal calculation speed.

It is desirable to set the interval between the reference dots 4 to about 0.3 mm to 0.5 mm in consideration of a necessary information amount corresponding to an imaging area and the false recognition of various kinds of dots, i.e., the dots 2, 3, 4, and 12. Obviously, as the accuracy of printing, the resolution of the optical reading means, and the optimal calculation speed increase with advances in technology, this interval unlimitedly approaches 0. In consideration of the false recognition of the reference dots 4 and information dots 3, the shift of the key dot 2 is desirably about 20% of the interval between the reference dots 4.

The interval between the information dot 3 and the virtual reference point 5 is desirably about 15% to 30% of the distance between the adjacent virtual reference points 5 for the following reasons. If the distance between the information dot 3 and the virtual reference point 5 is smaller than this interval, dots tend to be recognized as a large lump, and the dot pattern 1 deteriorates in appearance. In contrast, if the distance between the information dot 3 and the virtual reference point 5 is larger than this interval, it is difficult to determine which one of the adjacent virtual reference points 5 is the center based on which the information dot 3 is made to have vector directivity.

An optical reading means (for example, a camera or scanner) is used to read the dot pattern according to the present invention. This means is held in contact with or spaced apart from the medium surface to read a dot pattern at a predetermined position or in a predetermined region or the entire region. Alternatively, the means traces the linearly formed dot pattern to read it.

That is, an optical reading means images a predetermined position or a predetermined region on the medium surface from above, and reads information defined on the medium surface. Alternatively, a high-resolution camera images the entire medium surface at a predetermined distance from the medium surface, or a high-resolution scanner reads the information defined on the entire medium surface.

Defining information with a dot pattern with a sufficient length can define an enormous amount of information. In this case, the information is read by tracing the region on the medium surface on which the dot pattern is formed.

That is, information is read by tracing along lines depicting drawings or graphics visibly formed on a medium surface, or information is read by tracing along the frames of photos or images or the contours of objects in photos or images. Alternatively, it is possible to read information by tracing along character strings on a medium surface.

FIG. 3 shows examples of information dots and the bit display of data defined on them, and another embodiment.

Assume that this method uses two types of information dots 3, with one type exhibiting a short distance (the upper row in FIG. 3) from the virtual reference point 5 derived from the reference dot 4, and the other type exhibiting a long distance (the lower row in FIG. 3) from the virtual reference point 5 derived from the reference dot 4, and eight vector directions are set. In this case, 4 bits can be expressed. The long distance is desirably, about 25% to 30% of the distance between the adjacent virtual reference points 5, and the short distance is desirably about 15% to 20% of the distance. Note that the interval between the centers of the information dots 3 with the long/short distance is desirably longer than the diameter of the dots.

The information dot 3 is desirably one dot in consideration of appearance. If it is desired to increase the information amount in disregard of appearance, it is possible to obtain a large amount of information by expressing the information dot 3 using a plurality of dots while assigning one bit to each vector. For example, the information dot 3 defined from the reference dot 4 can express information of $2^8$ with vectors in eight concentric directions. Eight information dots of one predetermined information group express information of $2^{64}$.

FIG. 4 shows examples of the information dots 3 and the bit display of data defined on them. In FIG. 4, (a), (b), and (c) respectively indicate two dots, four dots, and five dots.

Figure 5:
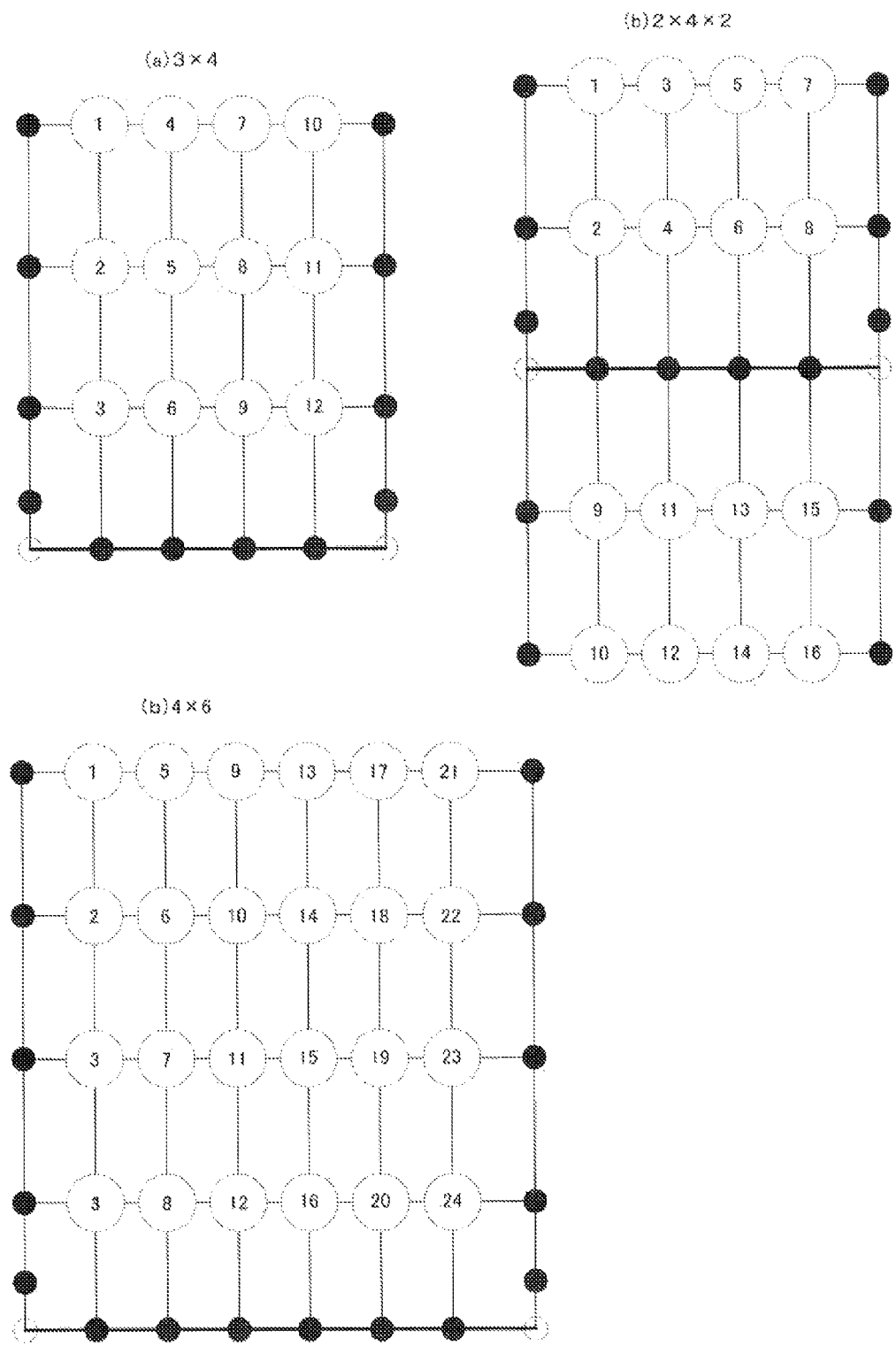
FIG. 5 is a view showing modifications of the dot pattern.

FIG. 5 shows modifications of the dot pattern. In FIG. 5, (a), (b), and (c) respectively indicate a pattern having 12 information dots 3 arranged in a region, a pattern having 16 information dots 3 arranged in a region, and a pattern having 24 information dots 3 arranged in a region.

The dot pattern 1 shown in FIG. 1 described above indicates an example having eight information dots 3 arranged in a predetermined information group. However, the number of information dots 3 arranged in the predetermined information group is not limited to eight, and can be variously changed. For example, this method uses a pattern having 12 information dots 3 arranged in one predetermined information group ((a) in FIG. 5), a pattern having 16 information dots 3 arranged in one predetermined information group ((b) in FIG. 5), and a pattern having 24 information dots 3 arranged in one predetermined information group ((c) in FIG. 5) in accordance with the amount of information required or the resolution of an optical reading means.

(Method of Forming Stream Dot Pattern)

A method of forming a dot pattern will be described next with reference to FIGS. 6 and 7.

Figure 6:
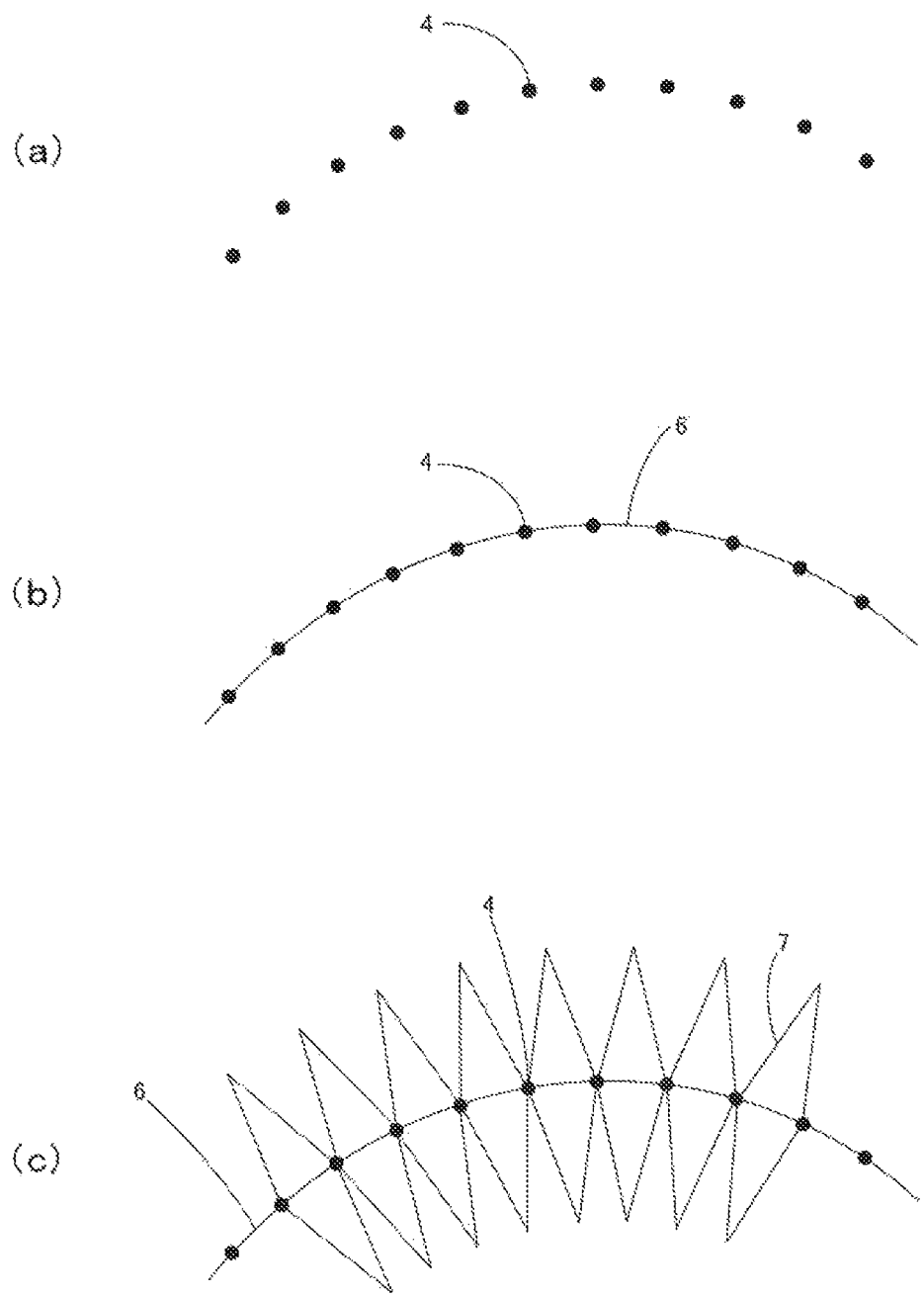
FIG. 6 explains a method of forming a stream dot pattern.
Figure 7:
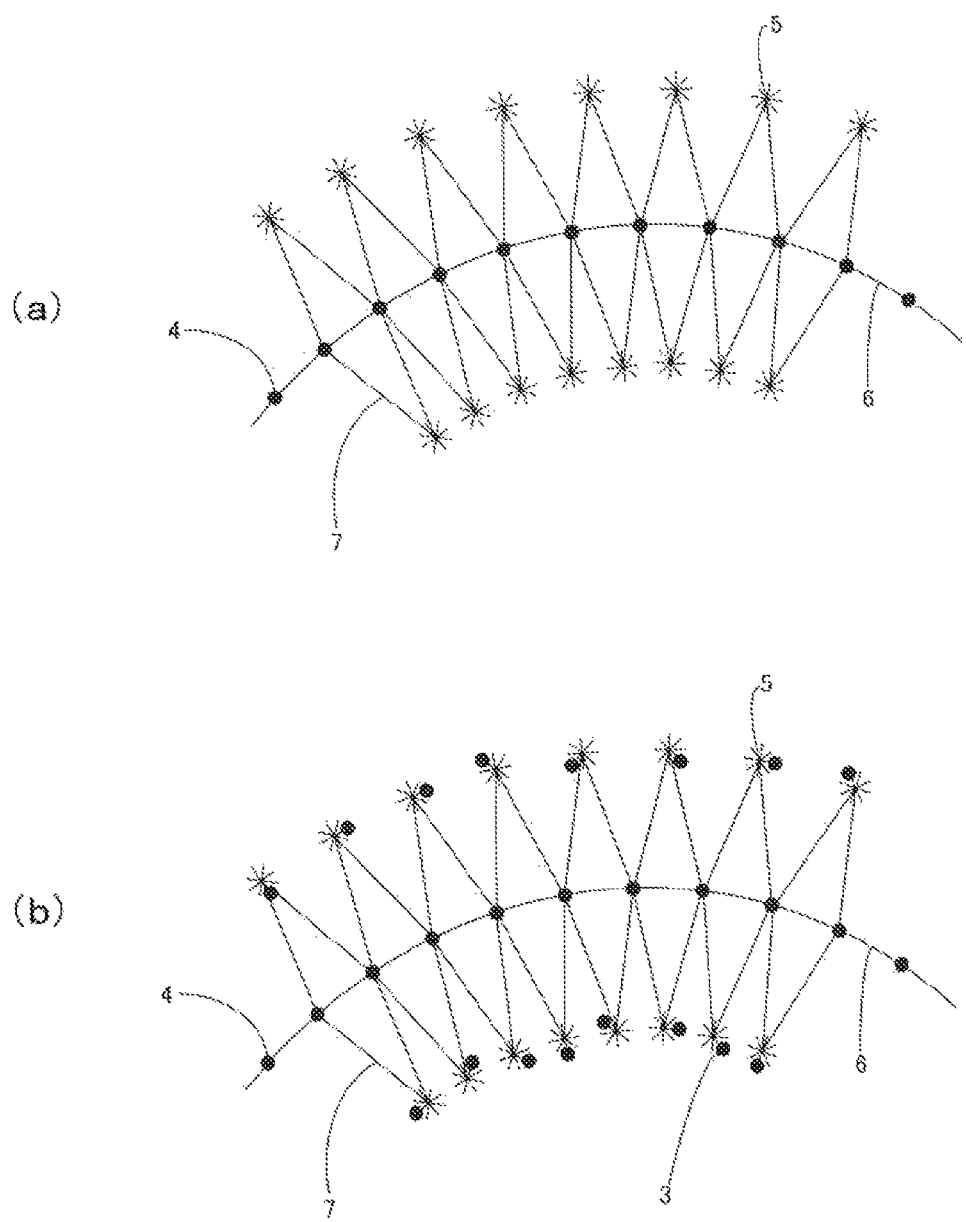
FIG. 7 explains a method of forming a stream dot pattern.

FIGS. 6 and 7 sequentially show the steps, as an example, in forming a stream dot pattern.

When forming a dot pattern according to the present invention, unlike conventional dot patterns, first of all, a plurality of reference dots 4 are arranged linearly and consecutively at portions, where information is to be input/output, in accordance with visible information on a medium surface in step 1.

Referring to (a) in FIG. 6, the reference dots 4 are arranged in a curve. However, the arrangement of the reference dots 4 is not limited to this, and can be variously changed to form dot patterns in shapes corresponding to regions where information is input/output. For example, a dot pattern may be formed by mixing straight lines and curves or may be formed in a polygonal line pattern constituted by a plurality of line segments.

In addition, it is possible to arrange the reference dots 4 on an actual line visibly formed on the medium surface or along an actual line according to a predetermined rule.

Note that reference dots are preferably arranged at equal intervals from the viewpoint of an improvement in reading accuracy. However, the present invention is not limited to this. It is possible to define a predetermined information group of a dot pattern by mixing a plurality of intervals or to define both a predetermined information group of a dot pattern and the direction of the dot pattern based on the arrangement intervals between three different reference dots in the predetermined information group.

Figure 15:
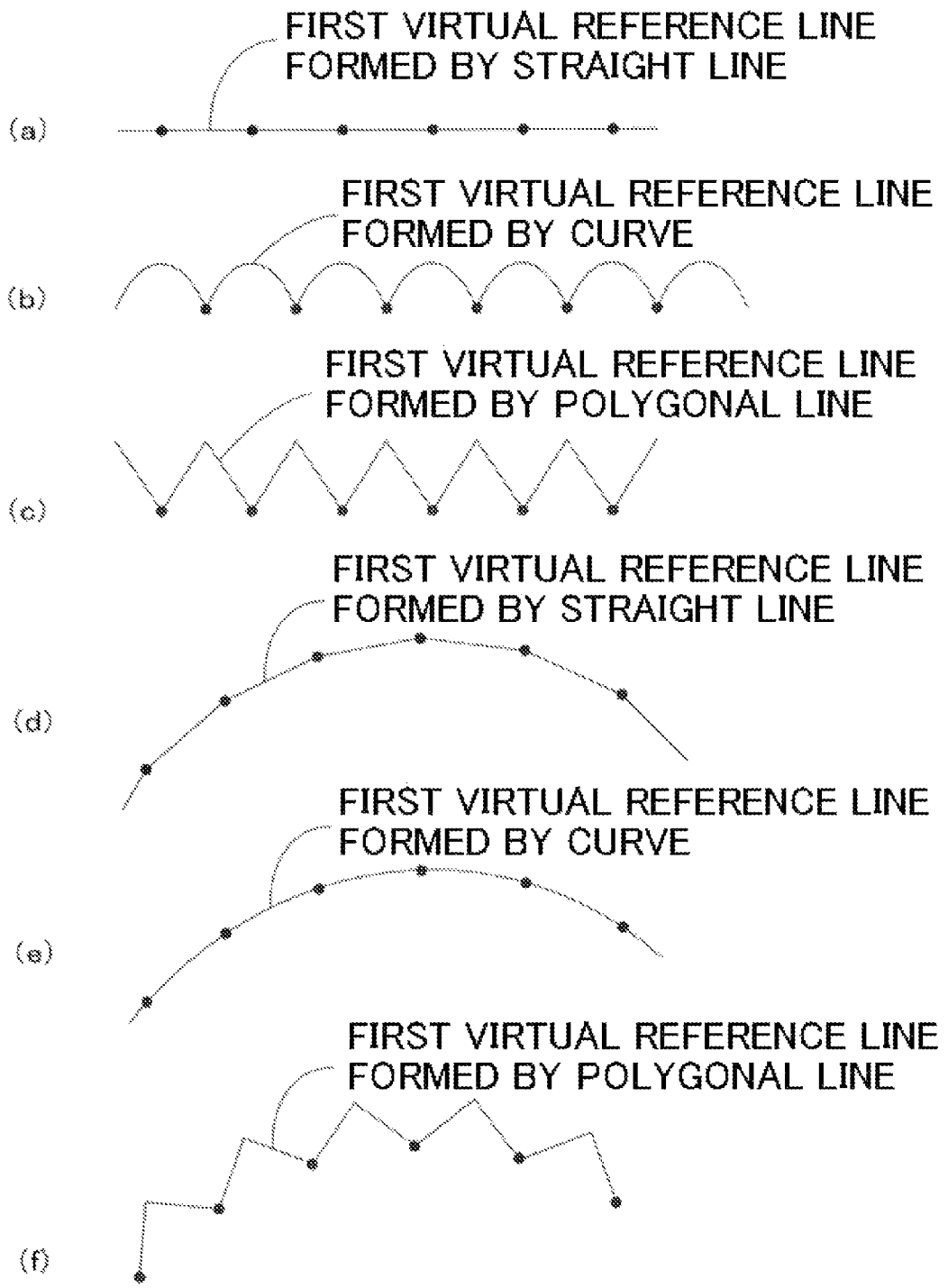
FIG. 15 shows an example of how each first virtual reference line is defined from the arrangement of reference dots.

In step 2, the first virtual reference line 6 is provided, which connects the reference dots 4 arranged linearly. Referring to (b) in FIG. 6, the first virtual reference line 6 is provided in the form of a curve. However, the first virtual reference line 6 is not limited to this. It is possible to provide the first virtual reference line 6 as a straight line for the reference dots 4 arranged in a curve. Alternatively, as shown in FIG. 15, it is possible to provide the first virtual reference line 6 as a curve for the reference dots 4 arranged linearly. That is, it is possible to freely define the first virtual reference line 6, which connects the reference dots, formed by a straight line or a polygonal line and/or a curve depending on the positions where the second virtual reference lines 7, virtual reference points 5, and information dots 3 are arranged in steps 3 to 5.

Figure 8:
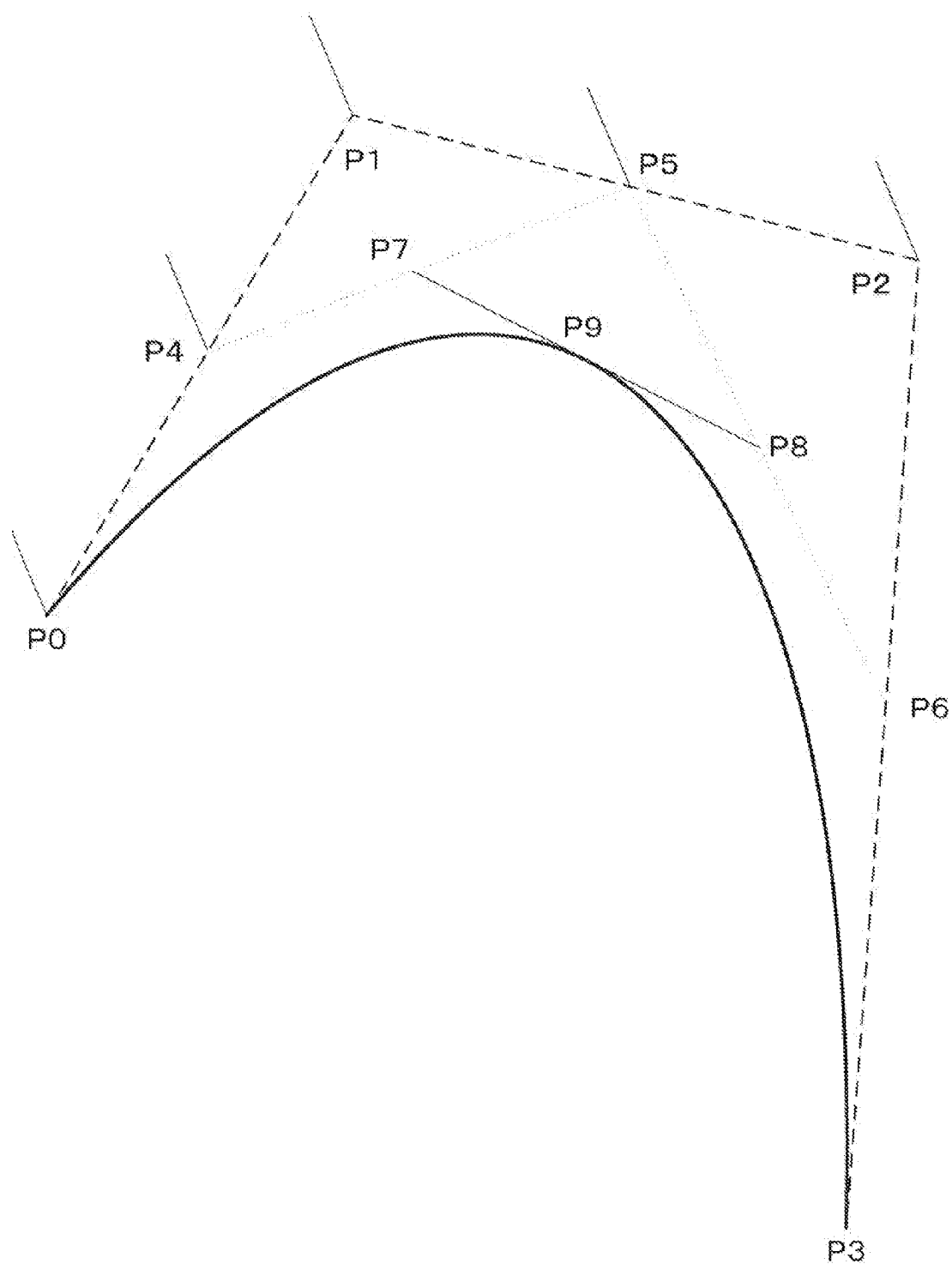
FIG. 8 is a view showing an example of how the first virtual reference line is provided by a Bezier curve.

Note that as shown in FIG. 8, the first virtual reference line 6 as a curve is desirably formed by a Bezier curve.

First of all, assume that reference dots on the first virtual reference line are represented by P0 and P3, and provided control points are represented by P1 and P2. This method then obtains points P4, P5, and P6 which respectively divide three line segments P0-P1, P1-P2, and P2-P3, obtained by sequentially connecting the control points, at a ratio of 1:1. The method obtains points P7 and P8 which respectively divide two line segments P4-P5 and P5-P6, obtained by sequentially connecting the points P7 and P8, at a ratio of 1:1.

Finally, this method obtains a point P9 which divides a line segment P7-P8 connecting two points at a ratio of 1:1. This point is a point on a Bezier curve.

Repeating this procedure will obtain a Bezier curve including P0, P1, P2, and P3 as control points.

Note that the first virtual reference line 6 is not limited to a Bezier curve and may be provided by using various types of algorithms, such as a spline curve obtained by a spline function, an n-degree polynomial, or an elliptic arc.

In addition, it is possible to define a curve for the second virtual reference line or the fourth virtual reference line (to be described later) by using the same method as that for the first virtual reference line.

In step 3, the second virtual reference lines 7 are provided, which are defined at predetermined positions relative to the reference dots 4 arranged linearly and/of the first virtual reference line 6. Referring to (c) in FIG. 6, the second virtual reference lines 7 are provided so as to extend from the adjacent reference dots 4 at an arbitrary angle toward a predetermined position on a line perpendicular to a tangent to the first virtual reference line 6 at the middle point between the adjacent reference dots 4. However, the second virtual reference lines 7 are not limited to these. As will be indicated later, since virtual reference points are provided in accordance with a region where information is to be input/output by using a dot pattern, the second virtual reference lines 7 can be defined by various methods.

In addition, the second virtual reference lines 7 may be provided only one side with reference to the first virtual reference line 6 so as to define the direction of the dot pattern, or may be provided on the two sides to increase the information amount.

In step 4, a plurality of virtual reference points 5 are provided at predetermined positions on the second virtual reference lines 7. Referring to (a) in FIG. 7, each virtual reference point 5 is provided at the intersection point between the second virtual reference lines 7, i.e., the vertex of an isosceles triangle having a straight line connecting the adjacent reference dots 4 as a base and the second virtual reference lines 7 as opposite sides. However, the position of each virtual reference point 5 is not limited to this, and can be variously changed. For example, the position of each virtual reference point 5 may be provided at the midpoint of the second virtual reference line 7 or on the reference dot 4 in place of the second virtual reference line 7.

In step 5, the information dots 3 are arranged at the end points expressed by vectors extending from the virtual reference points 5 as the start points. Referring to (b) in FIG. 7, the information dots 3 are arranged in eight vector directions from the virtual reference points 5 at equal distances from the virtual reference points 5, with one information dot 3 being provided for each virtual reference point 5. However, the arrangement of the information dots 3 is not limited to this. It is possible to arrange a plurality of information dots 3 in arbitrary directions at arbitrary lengths. For example, it is possible to arrange the information dots 3 on the virtual reference points 5, arrange them in 16 vector directions, or arrangement two information dots 3 for one virtual reference point 5.

In this manner, the stream dot pattern according to the present invention is formed based on reference dots arranged consecutively in a line including a curve, unlike conventional dot patterns proposed by the present inventor, in which reference dots are two-dimensionally formed in a lattice pattern.

This makes it possible to form a dot pattern by a predetermined information group in an arbitrary shape conforming to an information region visibly formed on a medium surface without any restriction by the shape of a rectangular region in which a dot pattern is formed as a two-dimensional code.

Note that virtual reference lines and virtual reference points according to the present invention are not actually printed on a medium surface but are virtually set in the image memory of a computer when arranging a dot pattern or reading a dot pattern.

[First Embodiment]

Various modifications of the stream dots will be described below.

Figure 9:
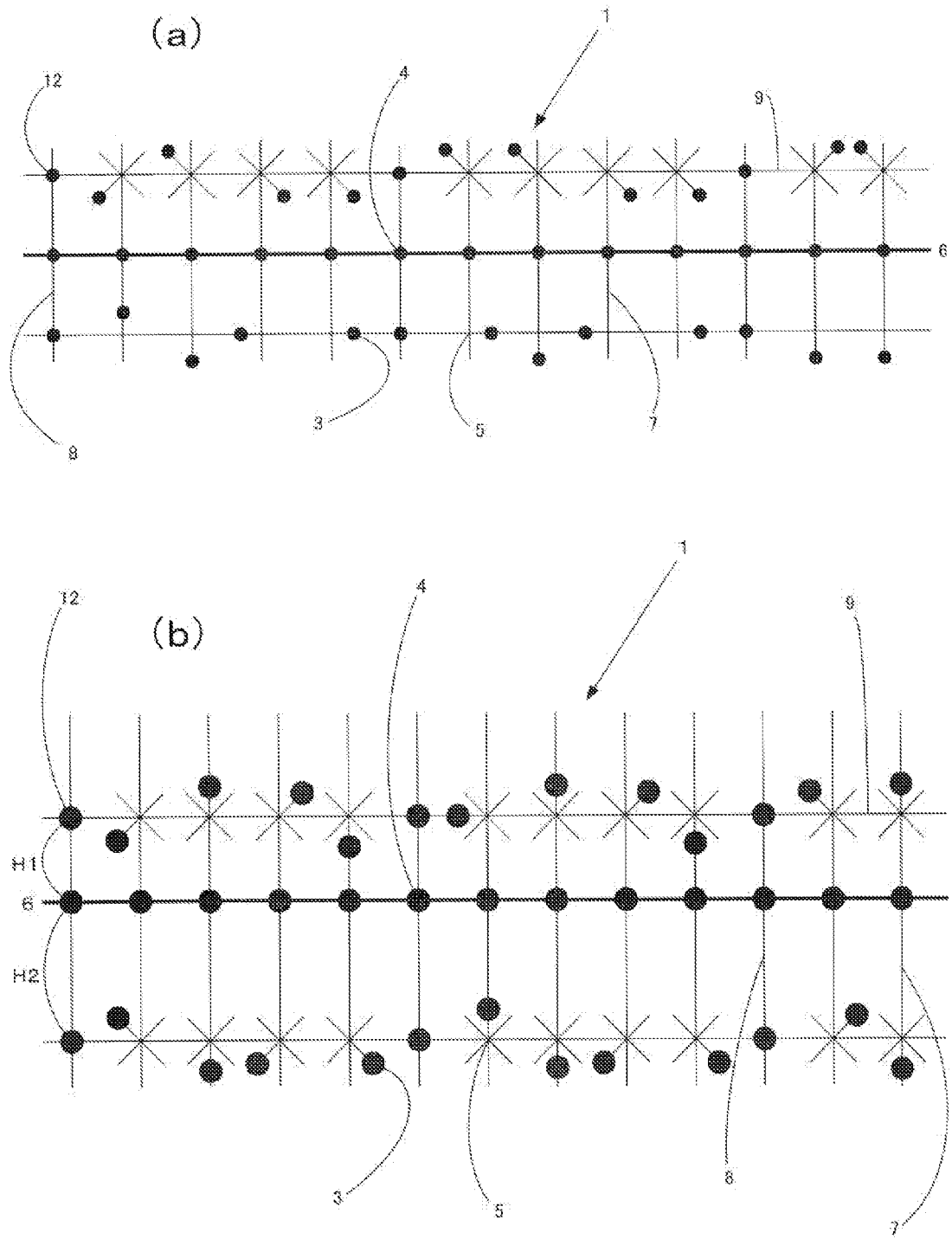
FIG. 9 shows an example of each dot pattern in the present invention.

In FIG. 9, (a) indicates an example of the dot pattern used in the present invention.

In the example indicated by (a) in FIG. 9, a predetermined information group of a dot pattern 1 is constituted by a first virtual reference line 6, reference dots 4, second virtual reference lines 7, virtual reference points 5, information dots 3, third virtual reference lines 8, side dots 12, and fourth virtual reference lines 9.

A predetermined information group of the dot pattern 1 is defined by the side dots 12 arranged on the third virtual reference line 8. The direction of the dot pattern 1 is defined by arranging the information dots 3 located in the +Y direction (upward direction) only in the X direction relative to the virtual reference points 5, and arranging the information dots 3 located in the −Y direction (downward direction) only in the + direction relative to the virtual reference points 5.

That is, a predetermined information group is defined by arranging the side dots 12 at predetermined intervals. When the information dot 3 shifted from the virtual reference point 5 in the X direction appear on the upper side relative to the first virtual reference line 6, it is known that the dot pattern is oriented upward. When the information dot 3 located in the + direction appears, it is known that the dot pattern is oriented downward.

There are various modifications of the means for defining the direction of a dot pattern with the shifting direction of an information dot from a virtual reference point. For example, if three information dots whose shifting directions from the virtual reference points are the + direction exist in a predetermined information group on the upper side relative to the first virtual reference line, it is determined that the dot pattern is oriented upward. If two such information dots exist, it is determined that the dot pattern is oriented downward. Alternatively, if a region including no information dot exists in a predetermined information group or is placed on a virtual reference point on the upper side relative to the first virtual reference line, it is determined that the dot pattern is oriented upward. If all regions include information dots, are not arranged on virtual reference points, and are spaced apart from them by a predetermined distance, it is determined that the dot pattern is oriented downward.

In FIG. 9, (b) indicates an example of the dot pattern used in the present invention.

In the example indicated by (b) in FIG. 9, a predetermined information group of the dot pattern 1 is constituted by the first virtual reference line 6, the reference dots 4, the second virtual reference lines 7, the virtual reference points 5, the information dots 3, the third virtual reference lines 8, the side dots 12, and the fourth virtual reference lines 9.

A predetermined information group of the dot pattern 1 is defined by the side dots 12 arranged on the third virtual reference lines 8. In addition, the direction of the dot pattern 1 is defined by setting different intervals H1 and H2 between the first virtual reference line 6 (or the reference dot 4) and the side dots 12 on the upper and lower sides relative to the first virtual reference line 6.

That is, when recognizing image data, it is possible to recognize the direction of the dot pattern 1 regardless of the imaging direction with respect to the dot pattern 1 by converting image data using an algorithm, if a predetermined information group is defined by the side dots 12, and it is defined in advance such that when a region where the distance between the reference dot 4 and the side dot 12 is shorter (H1) appears on the upper side relative to the first virtual reference line 6, the dot pattern 1 is oriented upward, whereas when a region where the distance is longer (H2) appears on the upper side, the dot pattern 1 is oriented downward.

Figure 10:
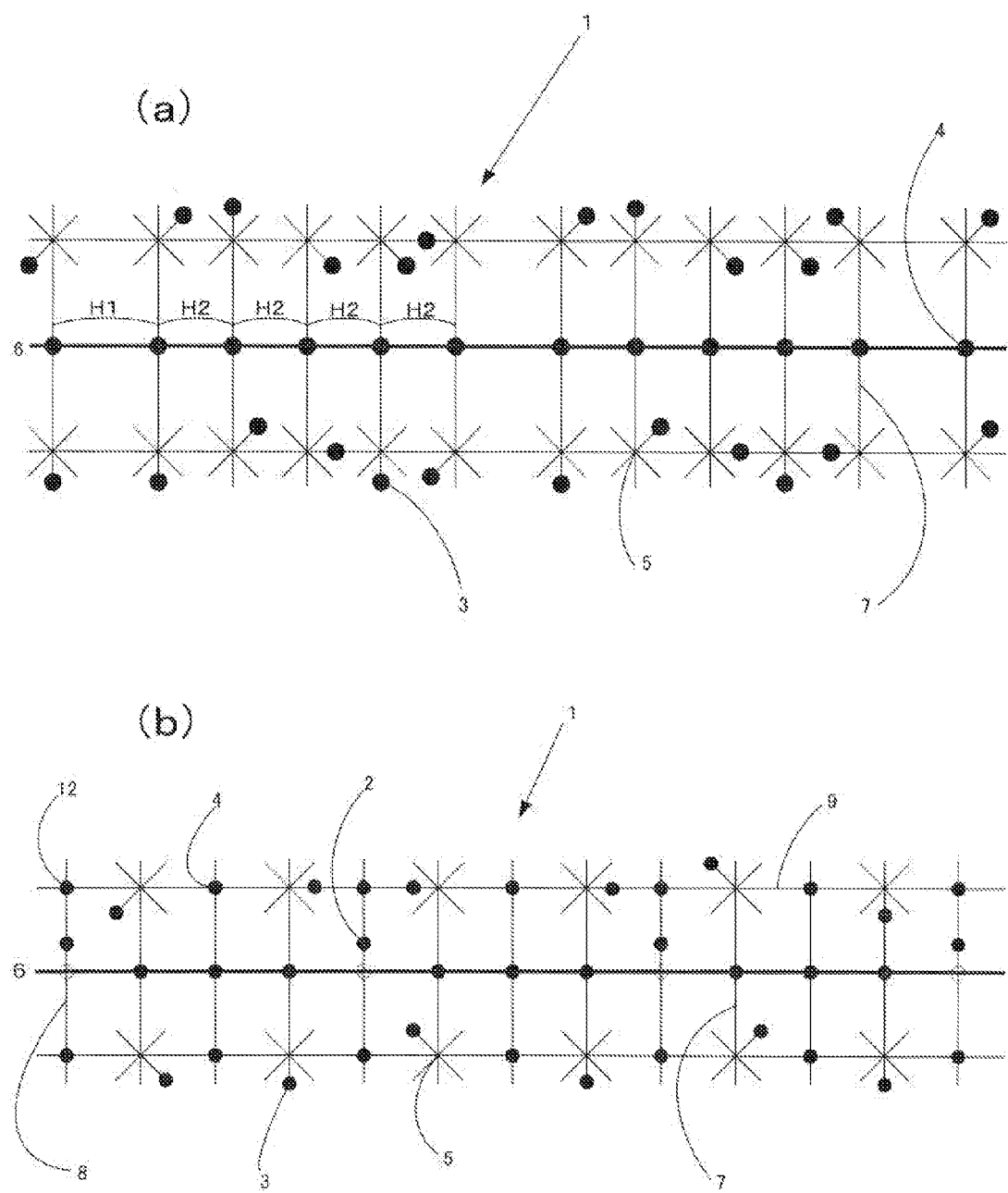
FIG. 10 shows an example of each stream dot pattern.

In FIG. 10, (a) indicates an example of the dot pattern used in the present invention.

In the example indicated by (a) in FIG. 10, a predetermined information group of the dot pattern 1 is constituted by the first virtual reference line 6, the reference dots 4, the second virtual reference lines 7, the virtual reference points 5, and the information dots 3.

A predetermined information group of the dot pattern 1 is defined by the arrangement intervals of a plurality of reference dots 4 provided on the first virtual reference line 6. In addition, the direction of the dot pattern 1 is defined by shifting both the information dots 3 from the virtual reference points 5 located on the leftmost side of the predetermined information group on the upper and lower sides relative to the first virtual reference line 6 in the downward direction.

That is, if a region where the interval between the reference dots 4 is the largest is located on the leftmost side of a predetermined information group, and the shifting directions of the information dots 3 from the virtual reference points 5 located on the leftmost side of the predetermined information group are both the downward direction on the upper and lower sides relative to the first virtual reference line 6, it is known that the dot pattern 1 is oriented upward. If both the above directions are the upward direction, it is known that the dot pattern 1 is oriented downward.

Note that it is possible to improve the recognition accuracy of the direction of a dot pattern by interpolation by further arranging side dots, changing the number of information dots, or setting regions with different areas on the upper and lower sides with reference to the first virtual reference line.

In FIG. 10, (b) indicates an example of the dot pattern used in the present invention.

In the example indicated by (b) in FIG. 10, a predetermined information group of the dot pattern 1 is constituted by the first virtual reference line 6, the reference dots 4, the second virtual reference lines 7, the virtual reference points 5, the information dots 3, the side dots 12, the third virtual reference lines 8, and the fourth virtual reference lines 9.

A predetermined information group of the dot pattern 1 is defined by the key dots 2 shifted upward from the first virtual reference line 6. In addition, the key dots 2 are arranged in the +Y direction relative to the first virtual reference line 6, and the distance from the side dot 12 in the +Y direction is shorter than that in the −Y direction. With this arrangement, it is known that the direction of the dot pattern 1 coincides with the correct position, and the dot pattern 1 is oriented upward.

Figure 11:
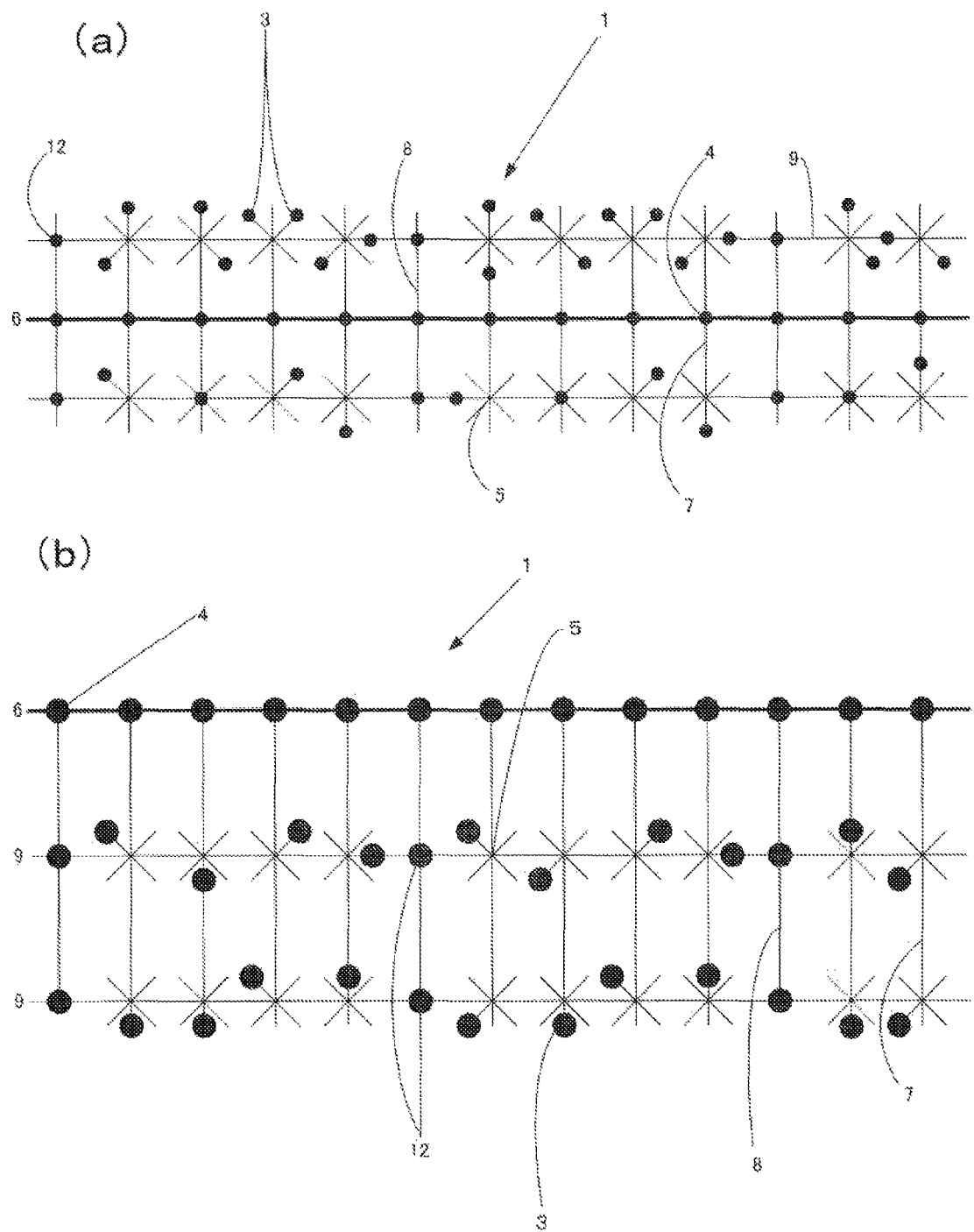
FIG. 11 shows an example of each stream dot pattern.

In FIG. 11, (a) indicates an example of the dot pattern used in the present invention.

In the example indicated by (a) in FIG. 11, a predetermined information group of the dot pattern 1 is constituted by the first virtual reference line 6, the reference dots 4, the second virtual reference lines 7, the virtual reference points 5, the information dots 3, the third virtual reference lines 8, the side dots 12, and the fourth virtual reference lines 9.

A predetermined information group of the dot pattern 1 is defined by the side dots 12 arranged on the third virtual reference lines 8. In addition, the direction of the dot pattern 1 is defined by arranging the two information dots 3, each of whose information is defined by the distance and direction from the virtual reference point 5, in the upward direction, and placing one information dot 3 in the downward direction.

That is, if the two information dots 3 are arranged in the +Y direction, the information dots 3 in a predetermined information group are recognized while the direction of the group is recognized as coinciding with the correct position. If one information dot 3 is placed in the +Y direction, the information dots 3 in the predetermined information group may be recognized while the direction of the group set by rotating it about its center through 180° is recognized as coinciding with the correct position.

Note that the direction of the dot pattern may be defined by respectively setting different distances (shift widths) between information dots and virtual reference points on the upper and lower sides with reference to the first virtual reference line, and a predetermined information group of the dot pattern may obviously be defined by arranging different numbers of information dots on the upper and lower sides with reference to the first virtual reference line.

In addition, information may be defined by arranging information dots at a distance of 0 from some of the virtual reference points located on the lower side with reference to the first virtual reference line, that is, on some of the virtual reference points.

In addition, a group of a dot pattern in a predetermined direction and its direction may be defined by making a portion where an information dot is placed on a virtual reference point appears on only one of the upper and lower sides with reference to the first virtual reference line.

In FIG. 11, (b) indicates an example of the dot pattern used in the present invention.

In the example shown in FIG. 11, a predetermined information group of the dot pattern 1 is constituted by the first virtual reference line 6, the reference dots 4, the second virtual reference lines 7, the virtual reference points 5, the information dots 3, the third virtual reference lines 8, the side dots 12, and the fourth virtual reference lines 9.

In the example shown in FIG. 11, a predetermined information group of the dot pattern 1 is defined by the side dots 12 arranged on the third virtual reference lines 8. In addition, the direction of the dot pattern 1 is defined by placing an arrangement region of information dots on only one of the upper and lower sides with reference to the first virtual reference line 6.

That is, a predetermined information group is known from the side dots 12 arranged at predetermined intervals. When the information dots 3 and the side dots 12 are arranged only in the upward direction relative to the first virtual reference line 6, it is known that the dot pattern 1 is oriented downward, whereas when the information dots 3 and the side dots 12 are arranged only in the downward direction, it is known that the dot pattern 1 is oriented upward.

Figure 12:
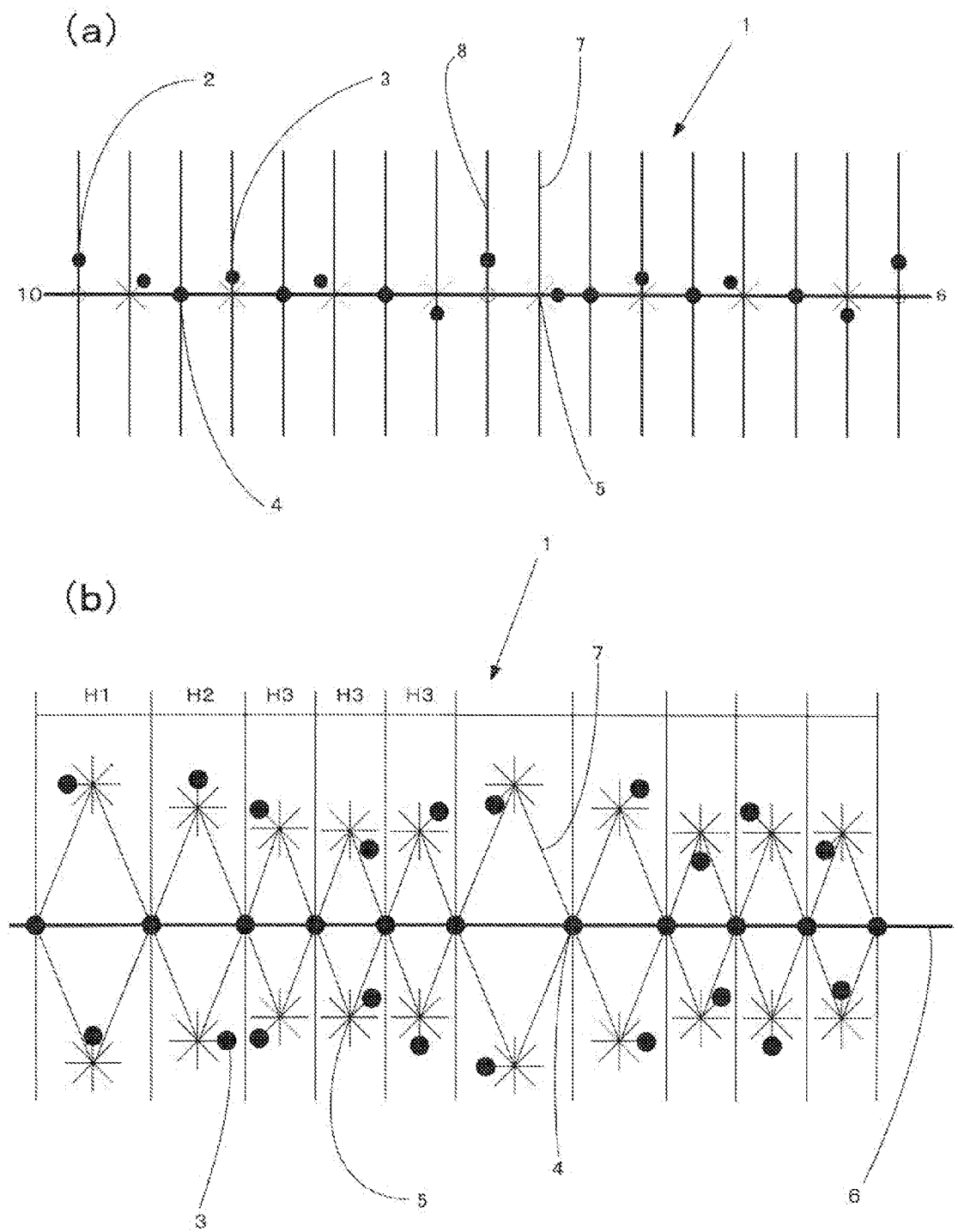
FIG. 12 shows an example of each stream dot pattern.

In FIG. 12, (a) indicates an example of the dot pattern used in the present invention.

In the example indicated by (a) in FIG. 12, a predetermined information group of the dot pattern 1 is constituted by the first virtual reference line 6, the reference dots 4, the second virtual reference lines 7, the virtual reference points 5, the information dots 3, and the key dots 2.

In the example indicated by (a) in FIG. 12, the direction of the dot pattern 1 and a predetermined information group are defined by the key dots 2. That is, when the key dots 2 are arranged in the upward direction relative to the first virtual reference line 6, it is known that the dot pattern 1 is oriented upward. When the key dots 12 are arranged in the downward direction, it is known that the dot pattern 1 is oriented downward.

A predetermined information group is known from the key dots 2 arranged at predetermined intervals.

Note that the example indicated by (a) in FIG. 12 indicates an example of how a dot pattern with a small stream width, in particular, is formed, in which the virtual reference points 5 are defined at the midpoints between the adjacent reference dots 4. This pattern allows an actual line 10 itself to have information.

Note that it is possible to arrange not only reference dots but also virtual reference points or information dots on or along an actual line visibly formed on a medium surface.

In FIG. 12, (b) indicates an example of the dot pattern used in the present invention.

In the example indicated by (b) in FIG. 12, a predetermined information group of the dot pattern 1 is constituted by the first virtual reference line 6, the reference dots 4, the second virtual reference lines 7, the virtual reference points 5, and the information dots 3.

A predetermined information group of the dot pattern 1 is defined by the arrangement interval of a plurality of reference dots 4 provided on the first virtual reference line. The direction of the dot pattern 1 is defined by setting three different arrangement intervals between the reference dots 4.

That is, predetermined information groups are defined by repeatedly arranging the reference dots 4 at large, intermediate, and small arrangement intervals according to a predetermined rule. In this case, when the intervals of the reference dots 4 repeatedly appear in order of large, intermediate, and small intervals from the −X direction to the + direction, it is recognized that the direction coincides with the correct position, and the dot pattern is oriented upward. When the above intervals repeatedly appear from the +X direction to −X direction, it is known that the direction set by rotating the predetermined information group about its center through 180° coincides with the correct position, and the dot pattern is oriented downward.

In FIG. 13, (a) indicates an example of the dot pattern used in the present invention.

In the example indicated by (a) in FIG. 13, a predetermined information group of the dot pattern 1 is constituted by the first virtual reference line 6, the reference dots 4, the second virtual reference lines 7, the virtual reference points 5, and the information dots 3.

A predetermined information group of the dot pattern 1 is defined by the arrangement intervals of a plurality of reference dots 4 provided on the first virtual reference line 6. The direction of the dot pattern 1 is defined by shifting the information dots 3 from the virtual reference points 5 located on the leftmost side of the predetermined information group in different directions relative to the first virtual reference line on the two opposite sides.

That is, the region where the interval between the reference dots 4 is the largest corresponds to the leftmost side of a predetermined information group. If the information dots 3 are respectively shifted from the virtual reference points 5 located on the leftmost side of the predetermined information group in the + direction in the +Y direction relative to the first virtual reference line 6 and in the X direction in the −Y direction, it is known that the dot pattern is oriented upward. If the information dots 3 are respectively shifted in the X direction in the +Y direction and in the + direction in the −Y direction, it is known that the dot pattern is oriented downward.

Note that it is obviously possible to improve the recognition accuracy of the direction of a dot pattern by interpolation by changing the number of information dots or setting regions with different areas on the upper and lower sides with reference to the first virtual reference line.

In FIG. 13, (b) indicates an example of the dot pattern used in the present invention.

In the example indicated by (b) in FIG. 13, a predetermined information group of the dot pattern 1 is constituted by the first virtual reference line 6, the reference dots 4, the second virtual reference lines 7, the virtual reference points 5, and the information dots 3.

A predetermined information group of the dot pattern 1 is defined by the shifting directions of the information dots 3 from the virtual reference points 5. The direction of the dot pattern 1 is defined by shifting the information dots 3 from the virtual reference points 5 in different directions on the upper and lower sides with reference to the first virtual reference line 6.

That is, a region defined as being located on the leftmost side of a predetermined information group is a region where the information dots 3 are shifted in the X direction in the upward direction with reference to the first virtual reference line 6, and are shifted in the + direction in the downward direction. Alternatively, a predetermined information group is defined by shifting the information dots 3 from the virtual reference points 5 with a predetermined period (regularity such as the X, +, +, +, and + directions in the upward direction with reference to the first virtual reference line 6, and the +, X, X, X, and X directions in the downward direction). In this case, if the information dots 3 shifted in the X, +, +, +, and + directions in the upward direction with reference to the first virtual reference line 6, and shifted in the +, X, X, X, and X directions in the downward direction, from the −X direction to the +X direction, it is known that the dot pattern 1 is oriented upward. If the information dots 3 are shifted in the +, X, X, X, and X directions in the upward direction, and in the X, +, +, +, and + directions in the downward direction, it is known that the dot pattern 1 is oriented downward.

Figure 14:
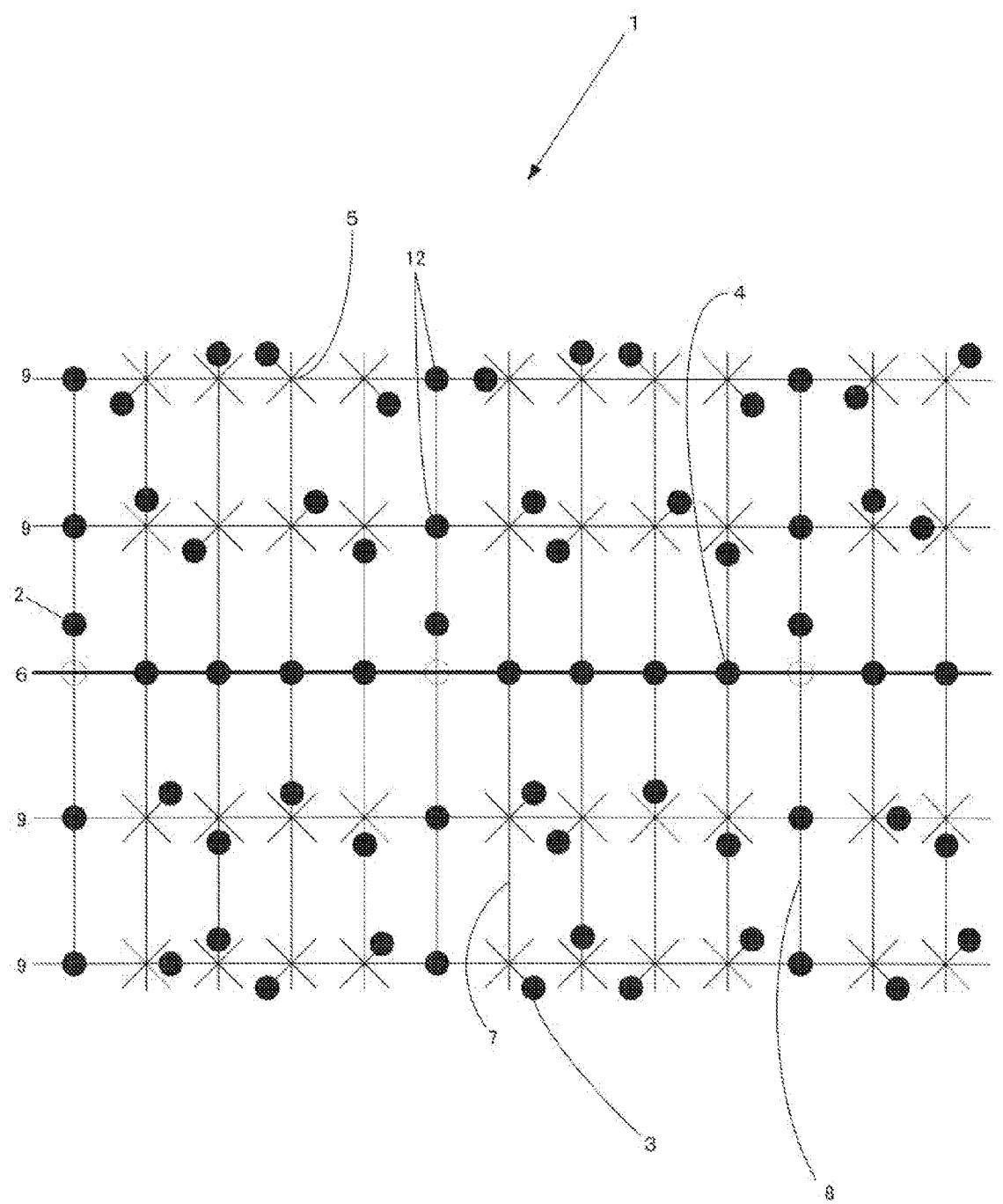
FIG. 14 shows an example of each stream dot pattern.

FIG. 14 is a view showing an example of the dot pattern used in the present invention.

In the example shown in FIG. 14, a predetermined information group of the dot pattern 1 is constituted by the first virtual reference line 6, the reference dots 4, the second virtual reference lines 7, the virtual reference points 5, the information dots 3, the third virtual reference lines 8, the key dots 2, the side dots 12, and the fourth virtual reference lines 9.

In the example shown in FIG. 14, the four side dots 12 are arranged on the third virtual reference line 8 for each predetermined information group to increase the number of fourth virtual reference lines 9, the number of virtual reference points 5, and the number of information dots 3, thereby increasing the information amount. A predetermined information group of the dot pattern 1 expresses 3 bits×16=48 bits.

Note that in the example shown in FIG. 14, the information dots 3 are shifted differently (in terms of the distances from the virtual reference points to the information dots) from the virtual reference points 5 in the X direction and the + direction. This allows to perform determination based on not only the shifting directions of information dots but also the distances from the information dots to the virtual reference points. This makes it possible to accurately recognize the information dots.

Note that it is desirable to properly determine, in accordance with the state or usage environment of a dot pattern formed medium, whether to make dots unnoticeable by unifying the shift widths of the dots or allow to accurately recognize information dots by making the shift widths different.

FIG. 15 shows an example of how the first virtual reference lines are defined from the arrangements of reference dots.

In FIG. 15, (a) indicates an example in which the reference dots are arranged in the form of a line, and the first virtual reference line is provided in the form of a straight line. In FIG. 15, (b) indicates an example in which the reference dots are arranged linearly, and the first virtual reference line is provided in the form of a curve. In FIG. 15, (c) indicates an example in which the reference dots are arranged linearly, and the first virtual reference line is provided in the form of a polygonal line. In FIG. 15, (d) indicates an example in which the reference dots are arranged in the form of a curve, and the first virtual reference line is provided in the form of a straight line. In FIG. 15, (e) indicates an example in which the reference dots are arranged in a curve, and the first virtual reference line is provided in the form of a curve. In FIG. 15, (f) indicates an example in which the reference dots are arranged in a curve, and the first virtual reference line is provided in the form of a polygonal line.

As described above, even if the arrangement of reference dots remains the same, it is possible to define the first virtual reference line in various manners. This makes it possible to form dot patterns constituted by predetermined information groups in arbitrary shapes in conformity with information regions visibly formed on medium surfaces.

Note that if the first virtual reference line is provided in the form of a polygonal line, it is desirable to arrange reference dots on all vertices to improve the reading accuracy of the optical reading means.

Figure 16:
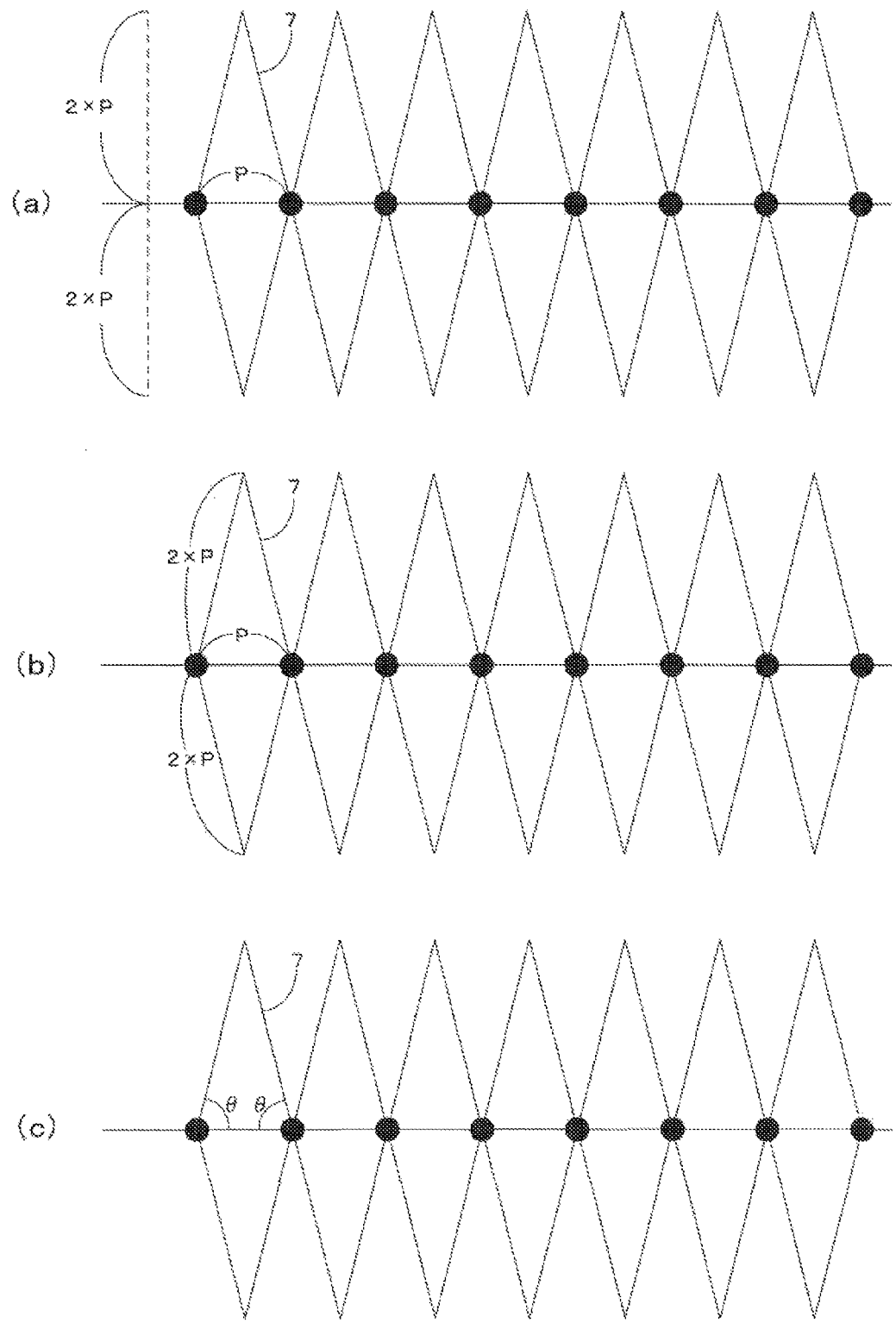
FIG. 16 shows an example of a method of defining the second virtual reference line.

FIG. 16 explains methods of defining the second virtual reference lines defined from a plurality of reference dots and/or the first virtual reference line to form a triangle having, as a base, the first virtual reference line which is a straight line connecting adjacent reference dots.

Referring to (a) in FIG. 16, the second virtual reference lines 7 constituting a triangle is defined by a distance P between the adjacent reference dots. That is, the second virtual reference lines 7 are provided so as to intersect above the midpoint between the adjacent reference dots upon setting the height of a triangle to a predetermined magnification ratio relative to the interval between the reference dots.

In the example indicated by (a) in FIG. 16, the height of each triangle is set to a length twice the distance P between the adjacent reference dots. However, the height of the triangle is not limited to this, and can be variously changed.

Referring to (b) in FIG. 16, the second virtual reference lines 7 constituting a triangle are defined by the distance P between the adjacent reference dots. That is, the second virtual reference lines 7 are provided so as to intersect above the midpoint between the adjacent reference dots upon setting the length of the opposite sides of the triangle to a predetermined magnification ratio relative to the interval between the reference dots.

In the example indicated by (b) in FIG. 16, the length of the opposite sides of the triangle is set to a length twice the distance P between the adjacent reference dots. However, the length of the opposite sides of the triangle is not limited to this, and can be variously changed.

Referring to (c) in FIG. 16, the second virtual reference lines 7 constituting a triangle are defined by a base angle θ of the triangle. That is, the value of the base angle of the triangle is set in advance so as to provide reference dots at arbitrary positions on a medium surface, and the second virtual reference lines 7 are provided so as to form the set base angle.

This makes it possible to set in advance a region where information is to be input/output and set a base angle for a triangle by back calculation so as to arrange information dots at the corresponding points. It is therefore possible to implement a dot pattern technique rich in convenience.

Note that it is possible to use a proper combination of the methods of defining the second virtual reference lines 7 in (a) to (c) in FIG. 16. This can reduce errors caused by the calculation of the positions of virtual reference points.

Note that in order to improve the analysis/reading accuracy, it is desirable to provide virtual reference points on the vertices of triangles.

Figure 17:
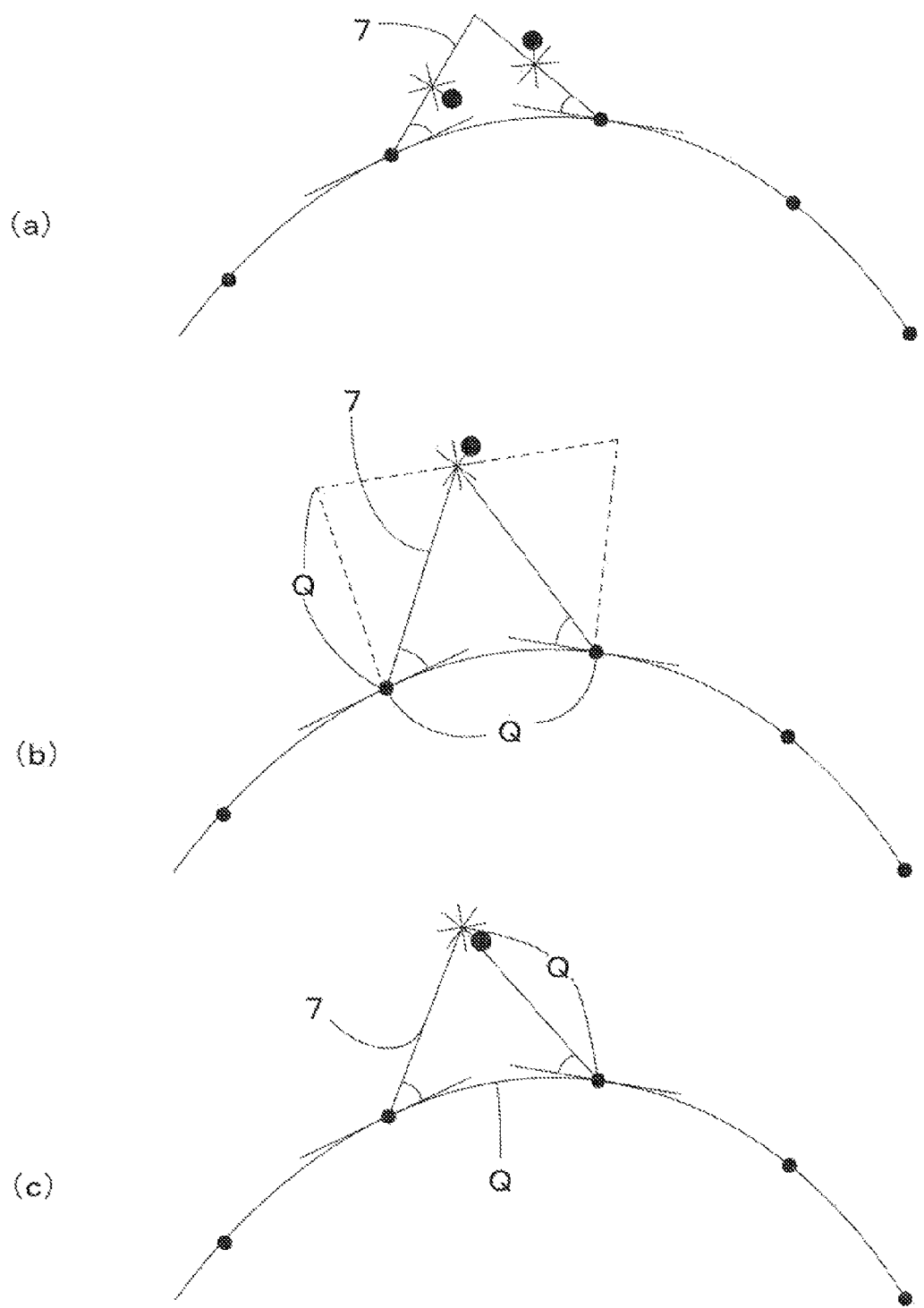
FIG. 17 shows an example of a method of defining the second virtual reference line.

FIG. 17 explains methods of defining the second virtual reference lines from the first virtual reference line and/or a plurality of reference dots when the first virtual reference line is formed by a curve.

In FIG. 17, (a) indicates an example in which an angle for providing each second virtual reference line is set in advance relative to a tangent to the first virtual reference line so as to provide virtual reference points at an arbitrary position on a medium surface, and each second virtual reference line 7 is provided to form the set angle.

Referring to (b) in FIG. 17, the second virtual reference lines 7 are defined by a length Q of the first virtual reference line formed by a curve connecting the adjacent reference dots. That is, a height from a tangent to the first virtual reference line is set to a predetermined magnification ratio relative to the length, and the second virtual reference lines 7 are provided from the adjacent reference dots so as to intersect at a position corresponding to the height.

In the example indicated by (b) in FIG. 17, the height from the tangent to the first virtual reference line is set to a length equal to the length Q of the first virtual reference line formed by a curve connecting the adjacent reference dots. However, the height is not limited to this, and can be variously changed. For example, the height may be set to a length an even multiple of the length Q at a given point and to a length an odd multiple of the length Q at another point, thereby defining the direction of a dot pattern or a predetermined information group.

Referring to (c) in FIG. 17, the second virtual reference line 7 is defined by the length Q of the first virtual reference line formed by a curve connecting adjacent reference dots. That is, the second virtual reference lines 7 are provided from the adjacent reference dots such that the length of each second virtual reference line is set to a predetermined magnification ratio relative to the length Q.

In the example indicated by (c) in FIG. 17, the length of the second virtual reference line 7 is set to a magnification ratio of 1:1 relative to the length Q of the first virtual reference line formed by a curve connecting adjacent reference dots. However, the length of the second virtual reference line is not limited to this, and can be variously changed. For example, the length may be set to a length an even multiple of the length Q at a given point and to a length an odd multiple of the length Q at another point, thereby defining the direction of a dot pattern or a predetermined information group.

Obviously, it is possible to use a proper combination of the methods indicated by (a) to (c) in FIG. 17. That is, a straight line perpendicular to a tangent at the midpoint of the first virtual reference line formed by a curve may be defined, and the second virtual reference lines and virtual reference points may be defined by a combination of the methods described above.

In FIG. 18, (a) indicates an example of a method of defining the second virtual reference line when the first virtual reference line is formed by a polygonal line.

When the first virtual reference line 6 is formed by a polygonal line, the second virtual reference 7 line is desirably a straight line dividing the interior angle at a vertex formed by the first virtual reference line 6 into equal angles.

That is, as indicated by this example indicated by (a) in FIG. 18, the second virtual reference line 7 is preferably provided such that angles α and β defined by the first virtual reference line 6 and the second virtual reference line 7 become values satisfying α+β=180°.

This makes it possible to define each virtual reference point by interpolation according to this equation, thereby allowing to more accurately extract an information dot.

Note that it is possible to use this method when defining the third virtual reference line.

In FIG. 18, (b) (1) indicates an example in which reference dots are always arranged on the vertices of the first virtual reference line.

The first virtual reference line is a virtual line formed by a straight line, a polygonal line and/or a curve which connects a plurality of reference dots. As indicated by (b) (2) in FIG. 18, there is available a method of defining the first virtual reference line from a polygonal line by a predetermined algorithm to provide points for reference for various types of processing (for example, to provide virtual reference dots) in addition to reference dots. As indicated by (b) (1) in FIG. 18, however, the first virtual reference line formed by a polygonal line in the present invention is desirably provided such that only portions at which reference dots are arranged are the vertices of the first virtual reference line.

This makes it possible to connect adjacent reference dots with one straight line, and hence it is possible to prevent decrease in dot pattern analysis and reading speed due to the use of a complicated algorithm.

FIG. 19 shows an example of a method of defining the second virtual reference lines.

In FIG. 19, (a) indicates the midpoints between adjacent reference dots. In FIG. 19, (b) indicates an example in which the second virtual reference lines 7 are provided on reference dots.

In this case, the second virtual reference lines are preferably straight lines perpendicular to the first virtual reference line at the midpoints between adjacent reference dots.

Figure 20:
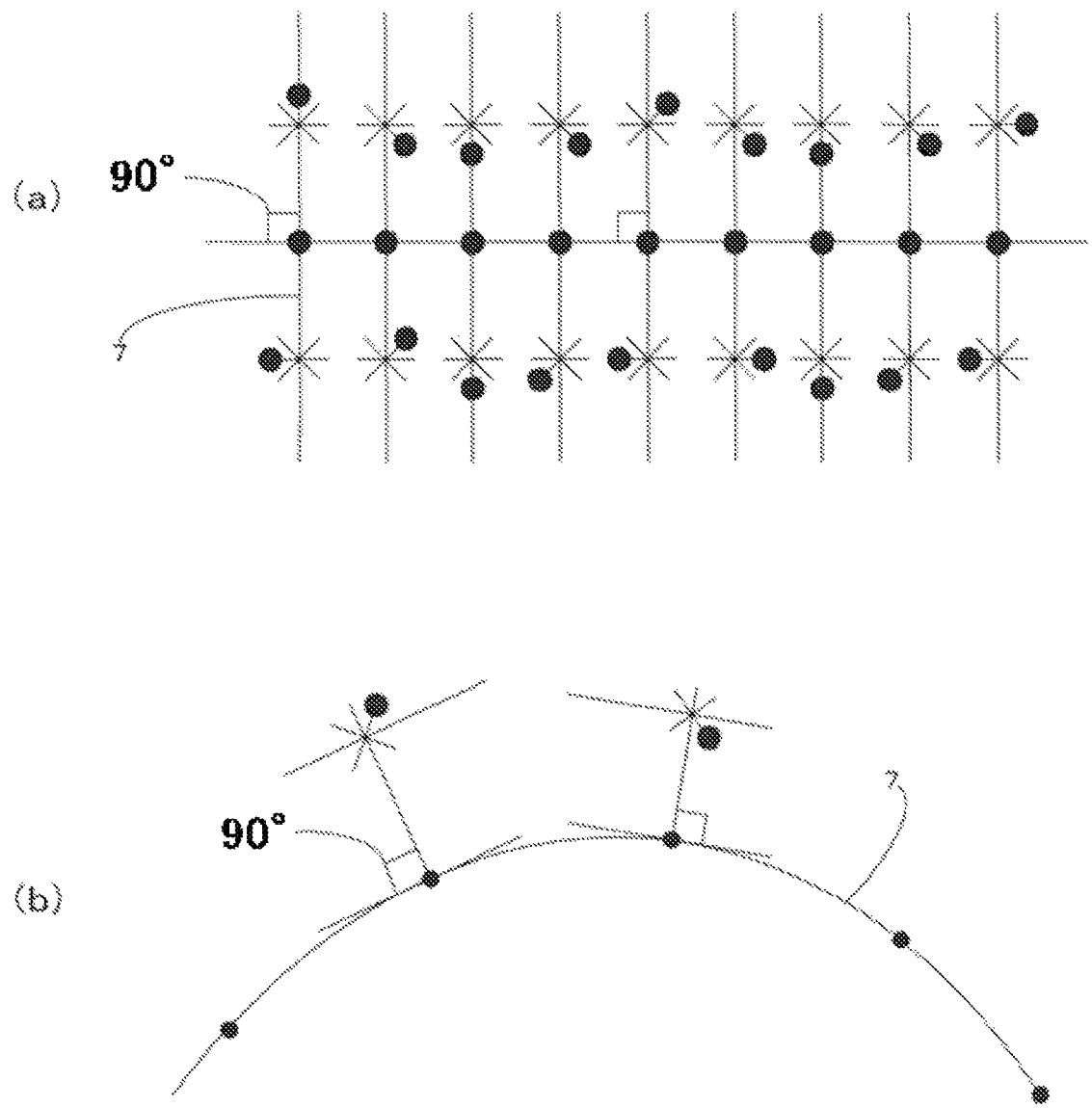
FIG. 20 shows an example of a method of defining the second virtual reference line.

FIG. 20 shows an example in which the second virtual reference lines 7 are provided to be perpendicular to the first virtual reference line formed by a straight line or to be perpendicular to tangents to the first virtual reference line formed by a curve.

There are various types of modifications of a method of defining the second virtual reference lines. For example, it is possible to form a dot pattern rich in convenience by properly combining and using these definition methods in accordance with a region where information is to be input/output.

Figure 21:
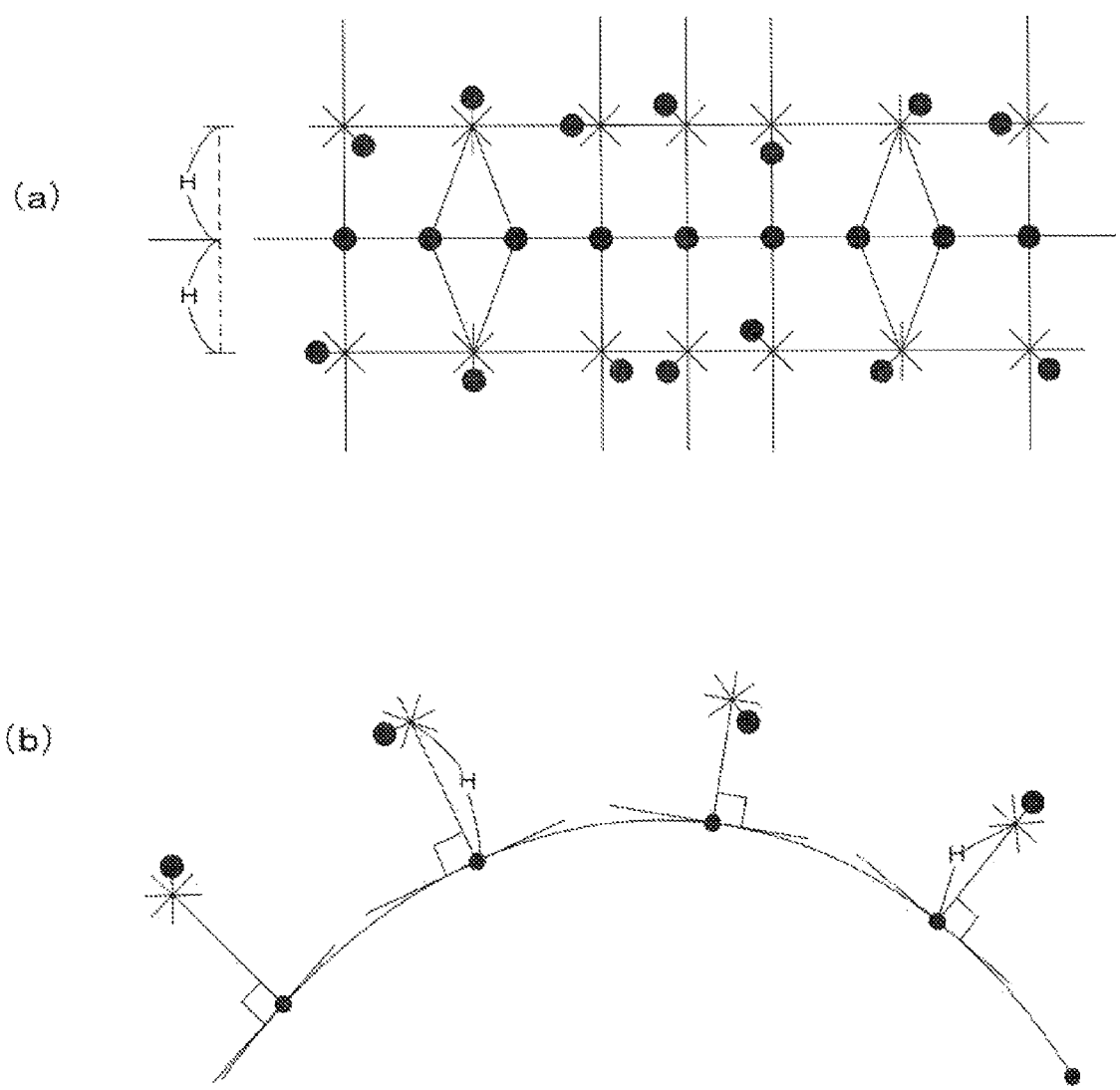
FIG. 21 explains the positions where virtual reference points are provided.

FIG. 21 shows an example in which a plurality of virtual reference points are provided at predetermined positions on the second virtual reference lines at a constant distance from the first virtual reference line formed by a straight line or from tangents to the first virtual reference line formed by a curve.

That is, distances H from the first virtual reference line or tangents to the first virtual reference line to virtual reference points are unified as shown in FIG. 21 regardless of whether the method of defining the second virtual reference lines remains the same for each predetermined information group of each dot pattern or each reference dot and/or each first virtual reference line in each predetermined information group.

This makes it possible to use a method of defining the second virtual reference lines in accordance with a region where information is to be input/output while unifying the arrangement positions of information dots to a predetermined height.

Figure 22:
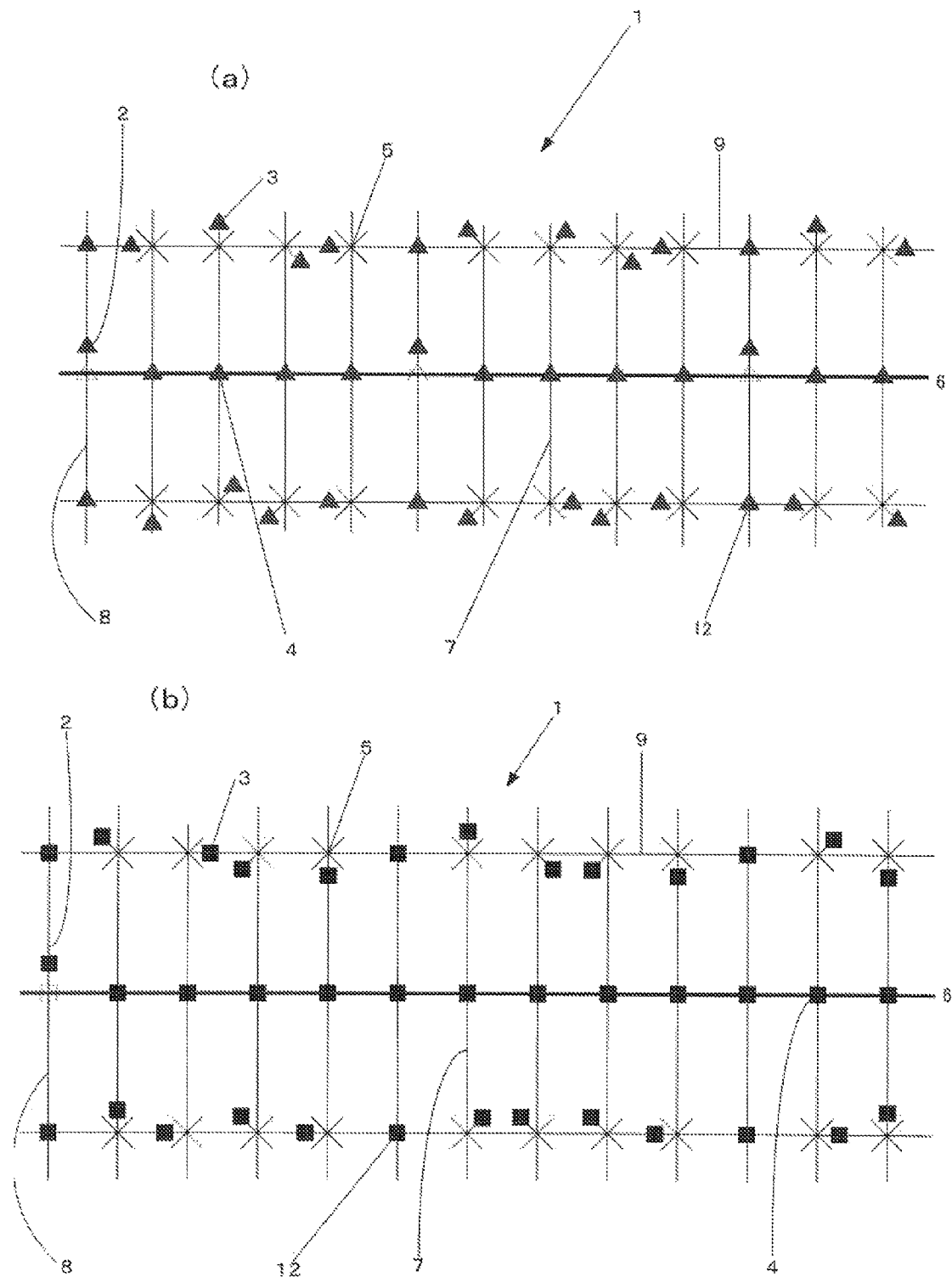
FIG. 22 shows an example of each stream dot pattern.

In FIG. 22, (a) indicates an example in which dots themselves each are formed to have a polygonal shape which can define a direction instead of a general round shape, and the direction of the dot pattern 1 is defined by the shape difference.

In FIG. 22, (a) indicates an example in which dots are formed in triangular shapes. It is possible to define the direction of a dot pattern by various methods. For example, it is possible to define the direction of a dot pattern depending on in which direction a dot in a triangular shape is formed from one side of the triangle which is parallel to the first virtual reference line 6 or the fourth virtual reference line 9 (in the example indicated by (a) in FIG. 22, since the dot is formed in the +Y direction from the side, the dot pattern 1 may be recognized upon recognizing the corresponding direction as coinciding with the correct position). Alternatively, when the vertex of the triangle overlapping the second virtual reference line 7 or the third virtual reference line 8 is located in the +Y direction, the corresponding direction is regarded as coinciding with the correct position of the dot pattern 1.

In FIG. 22, (b) indicates an example in which normal round dots and polygonal dots exist together.

Each polygonal dot in the example indicated by (b) in FIG. 22 has a square shape, and hence the direction of the dot pattern 1 cannot be defined. However, it is possible to define the direction of the dot pattern 1 by combining and using the side dots 12 and the key dots 2.

It is possible to change the shapes of all the dots used in the present invention, which are not limited to reference dots and information dots. For example, it is possible to arrange normal round dots as the reference dots 4 and the key dots 2 while arranging polygonal dots, which can define a direction, as the information dots 3 and the side dots 12. Obviously, in addition, a predetermined information group may simultaneously include round dots and polygonal dots.

Figure 23:
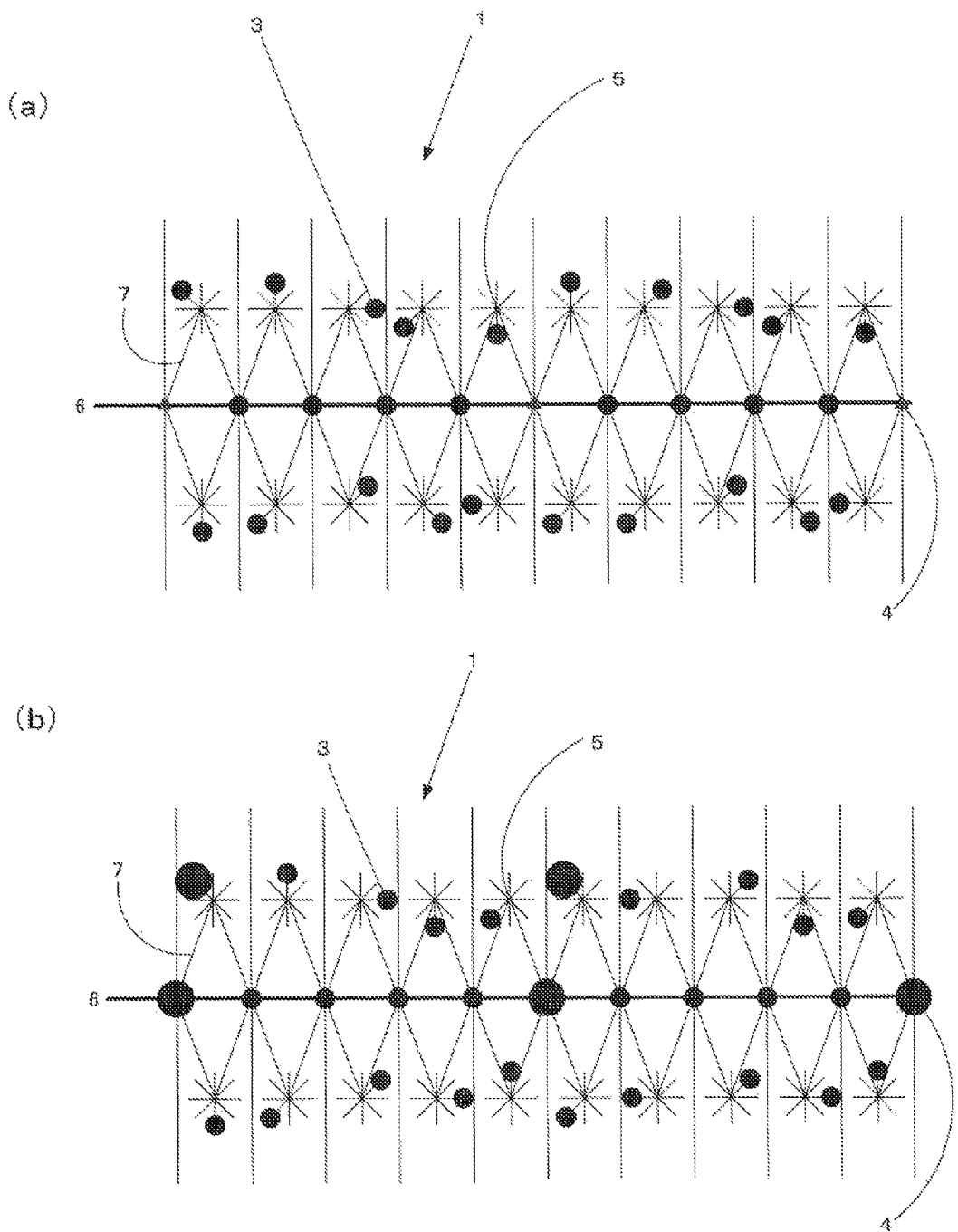
FIG. 23 shows an example of each stream dot pattern.

In FIG. 23, (a) and (b) each indicate an example in which the direction of a dot pattern and a predetermined information group are defined by changing the size of a dot itself as needed.

Referring to (a) in FIG. 23, a predetermined information group of the dot pattern 1 and the direction of the dot pattern 1 are defined by using, as one of a plurality of reference dots 4, a triangular dot different in size from the remaining dots. Referring to (b) in FIG. 23, a predetermined information group of the dot pattern 1 is defined by arranging, as the reference dots 4, round dots different in size from the remaining dots, whereas the direction of the dot pattern 1 is defined by arranging, only in the +Y direction, the information dots 3 different in size from the remaining information dots 3.

Obviously, the method of defining a predetermined information group and the direction of a dot pattern by changing the sizes and shapes themselves of dots shown in FIGS. 22 and 23 can change the sizes and shapes of some or all of the dots, as needed, in accordance with various conditions including an algorithm for generating and analyzing dot patterns and the precision of a reader.

FIG. 24 shows examples in which the direction of a dot pattern and a predetermined information group of the dot pattern are defined by arranging different numbers of virtual reference points on the two sides with reference to the first virtual reference line.

Referring to (a) in FIG. 24, in the +Y direction, the second virtual reference lines are provided at predetermined angles relative to the adjacent reference dots such that they intersect each other on a perpendicular line at the midpoint between the adjacent reference dots, and the virtual reference points 5 are arranged on the second virtual reference lines. In the –Y direction, the second virtual reference lines are provided so as to pass through the reference dots and intersect the first virtual reference line at right angles, and the virtual reference points 5 are arranged on the second virtual reference lines.

With this arrangement, when the reader recognizes a dot pattern, the virtual reference point 5 is defined by at least two reference dots. If the virtual reference points 5 smaller in number than the virtual reference points 5 provided on the opposite side of the first virtual reference line appear in the +Y direction, it is possible to define the direction of the dot pattern upon recognizing the corresponding direction as coinciding with the correct position. If the virtual reference points 5 (smaller in number than those on the opposite side) appear in the −Y direction relative to the first virtual reference line, it is possible to define the direction of the dot pattern upon recognizing the direction set by rotating the corresponding dot pattern about its center through 180° as coinciding with the correct position.

In FIG. 24, (b) indicates a modification in which one virtual reference point 5 is provided for one reference dot in the +Y direction with reference to the first virtual reference line, and one virtual reference point 5 is provided for three reference dots in the −Y direction. In FIG. 24, (c) indicates an example in which a portion where one virtual reference point 5 is provided, for one reference dot, on each of the two sides with reference to the first virtual reference line is a spot for the definition of a predetermined information group of a dot pattern, and the direction of the dot pattern is defined by arranging different numbers of virtual reference points 5 on the upper and lower sides with reference to the first virtual reference line (a predetermined information group includes three virtual reference points 5 in the +Y direction and four virtual reference points in the −Y direction).

Obviously, as described above, it is possible to change the manner of defining virtual reference points within a predetermined information group as needed, and to adjust the positions at which virtual reference points are provided in accordance with visible information on a medium surface.

Figure 25:
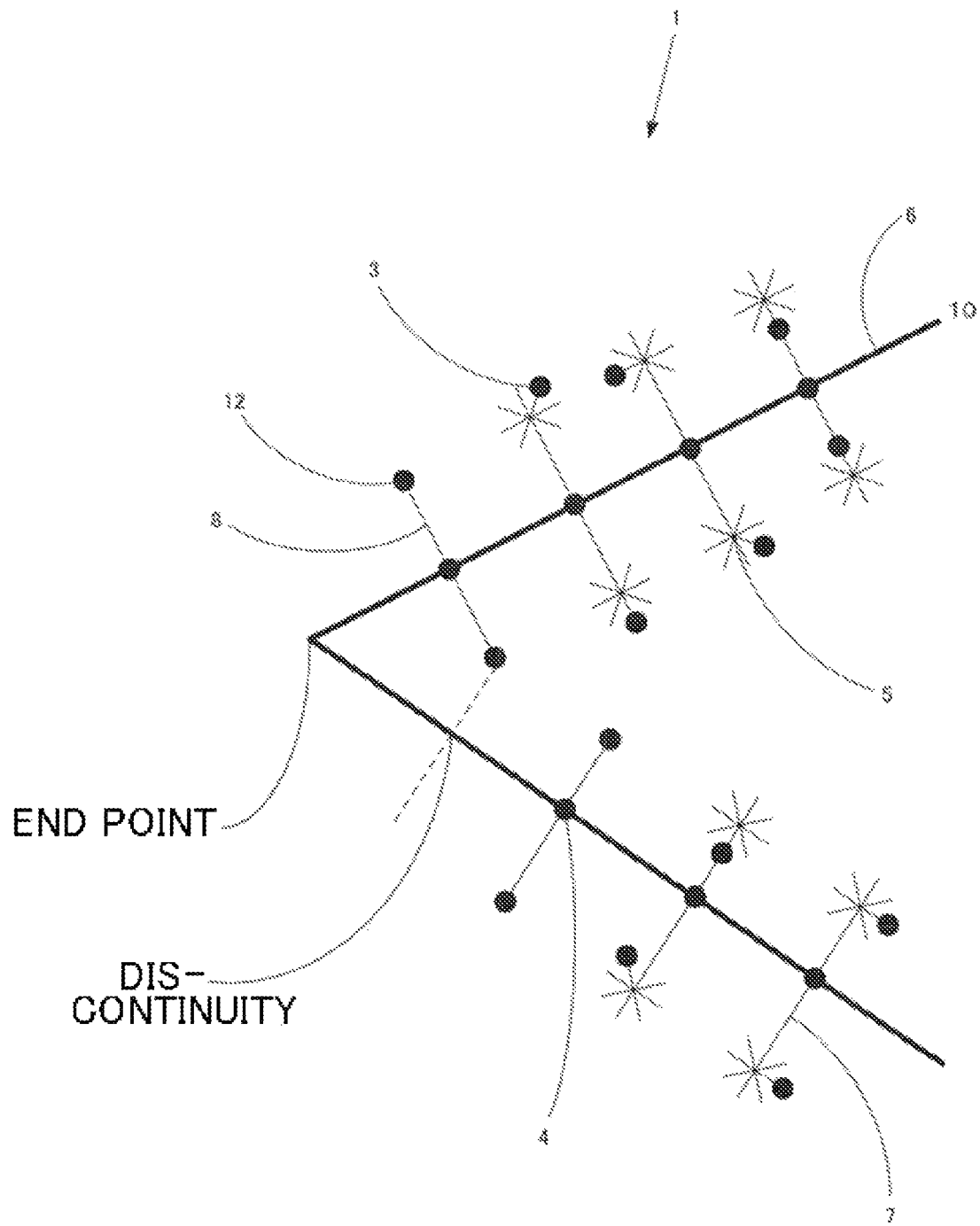
FIG. 25 shows an example of each stream dot pattern.

FIG. 25 is a view showing an example of a dot pattern formed along an actual polygonal line.

When an actual line 10 forms an angle, that is, there is an interval between two lines having the same edge point, the dot patterns 1 are preferably made discontinuous.

This can prevent erroneous information input/output operation, when reading near an edge point, due to reading of an information dot located near an information dot which should be read, instead of it, when dot patterns are formed consecutively.

Note that if an information dot which should be read is read erroneously together with an adjacent information dot, information input/output operation near an edge point may be allowed by linking to predetermined information upon determining that the read dots do not comply with a dot pattern generation algorithm.

Figure 26:
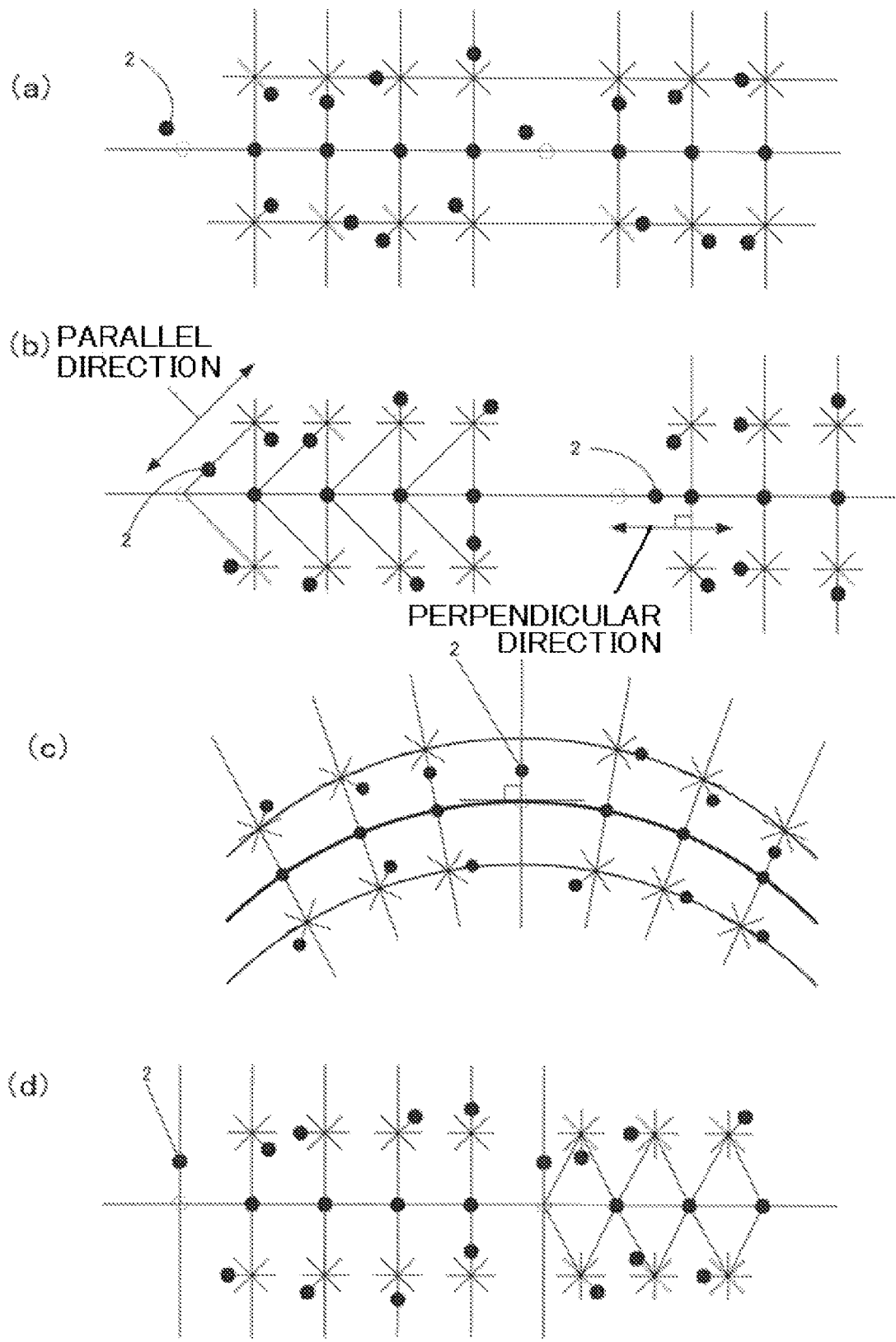
FIG. 26 explains an example of each arrangement of key dots.

FIG. 26 shows examples of the arrangement of key dots according to the present invention.

Referring to (a) in FIG. 26, the direction of a dot pattern and a predetermined information group are defined by shifting one of a plurality of reference dots arranged linearly in an oblique direction from the first virtual reference line.

That is, a predetermined information group of a dot pattern is defined by placing the key dot 2 in an obliquely upper leftward direction from the position at which a reference dot should be placed in the example indicated by (a) in FIG. 26 instead of placing a reference dot at the position at which it should be placed. The direction of the dot pattern is defined by recognizing, as coinciding with the correct position, the direction in which the key dot 2 is placed when it is placed in the shifted direction.

Referring to (b) in FIG. 26, a predetermined information group and the direction of a dot pattern are defined by placing the key dot 2, of the key dots 2 arranged on the medium surface, which is located on the left in the example indicated by (b) in FIG. 26, in a direction parallel to the direction of the second virtual reference line, and placing the key dot 2, located on the right in the example indicated by (b) in FIG. 26, in a direction perpendicular to the direction of the second virtual reference line.

That is, the key dot 2 located on the left indicated by (b) in FIG. 26 is placed in a direction parallel to the direction of the second virtual reference line in the +Y direction to define a predetermined information group and the direction of the dot pattern. In contrast, the key dot 2 located on the right indicated by (b) in FIG. 26 is placed in a direction perpendicular to the direction of the second virtual reference line to define a predetermined information group. In this case, since the key dot 2 is shifted in the +X direction from the position at which a reference dot should be placed, the direction of the dot pattern can be defined by recognizing the corresponding direction as coinciding with the correct position.

Referring to (c) in FIG. 26, a predetermined information group and the direction of a dot pattern are defined by placing the key dot 2, placed on the medium surface, at a predetermined position on the third virtual reference line.

That is, a predetermined information group is defined by placing the key dot 2 on the third virtual reference line as a straight line perpendicular to a tangent to a curve forming the first virtual reference line. The direction of the dot pattern is defined by recognizing, as coinciding with the correct position, the direction in which the key dot 2 is placed, depending on at which position on the third virtual reference line the key dot 2 is placed with reference to the first virtual reference line, more specifically, depending on whether the key dot 2 is placed in the +Y direction in the example indicated by (c) in FIG. 26.

In FIG. 26, (d) indicates an example in which the second virtual reference lines are defined from only reference dots except for the reference dots which are shifted as key dots.

That is, no second virtual reference line is defined from the reference dot before it is placed as the key dot 2 on the left in the example indicated by (d) in FIG. 26, whereas the second virtual reference line is defined from the reference dot before it is placed as the key dot 2 on the right in the example indicated by (d) in FIG. 26.

With this arrangement, other dots such as information dots are not arranged near the key dot 2. This can prevent erroneous recognition of key dots and other dots.

Figure 27:
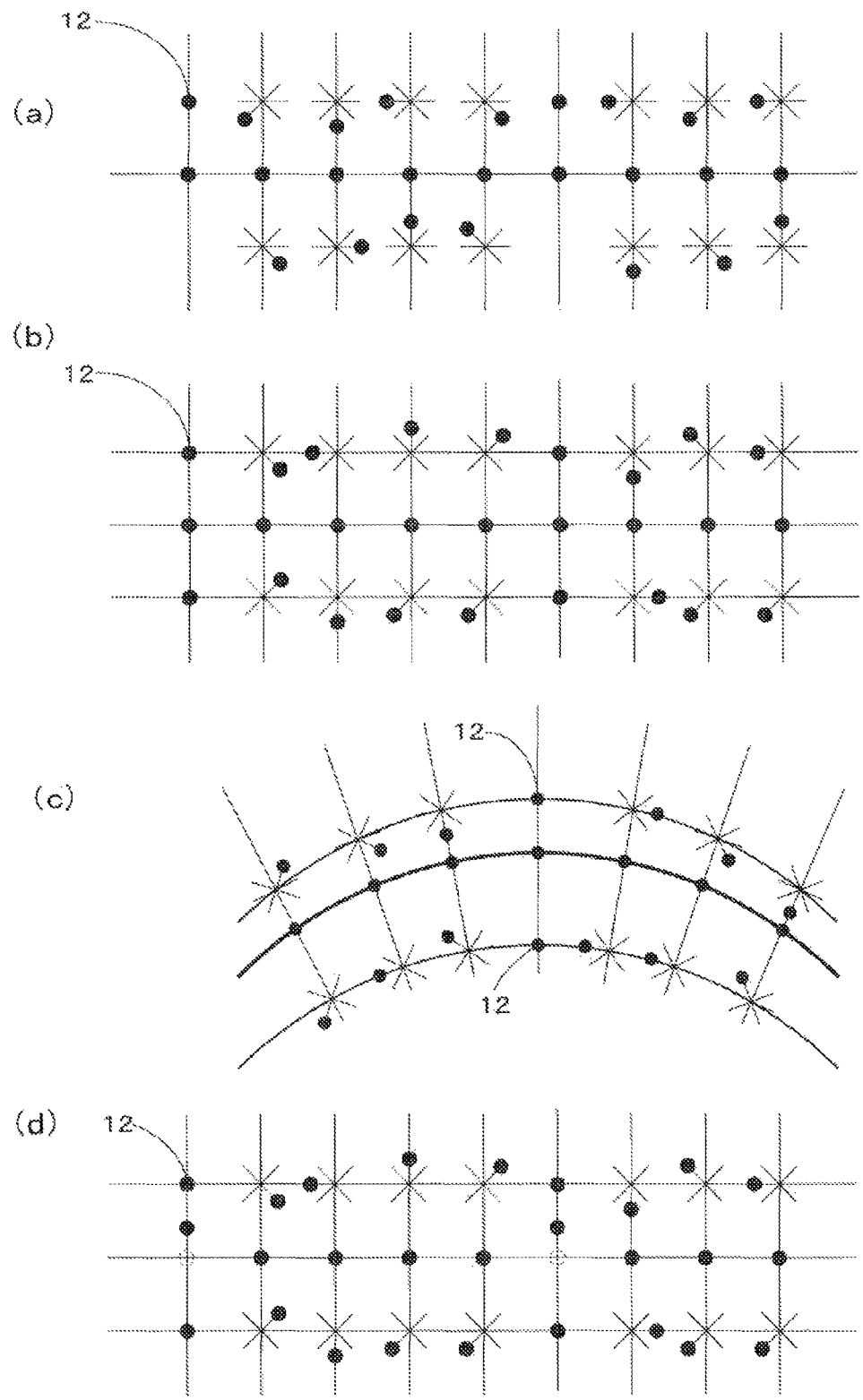
FIG. 27 explains examples of the arrangements of side dots.

FIG. 27 explains examples of the arrangement of side dots according to the present invention.

Referring to (a) in FIG. 27, a predetermined information group and the direction of a dot pattern are defined by placing the side dot 12 on the third virtual reference line passing through a reference dot. That is, a predetermined information group, is defined by adding a dot while maintaining the arrangement of reference dots unlike the key dot described above. The direction of the dot pattern is defined by placing the side dot 12 on only one of the upper and lower sides with reference to the first virtual reference line.

In FIG. 27, (b) indicates an example in which the fourth virtual reference line is provided, which is a straight line passing through the side dot 12 and parallel to the first virtual reference line, and virtual reference points are provided at predetermined intervals on the fourth virtual reference line. Defining virtual reference points using both the second and fourth virtual reference lines can improve the reading accuracy.

In FIG. 27, (c) indicates an example in which a predetermined information group and the direction of a dot pattern are defined by arranging the side dots 12 on the two sides of the first virtual reference line at different distances from the first virtual reference line. In FIG. 27, (d) indicates an example in which the direction of a dot pattern is defined by a key dot obtained by shifting a reference dot upward on the third virtual reference line and the distances between the key dot and the side dots 12 arranged on the two sides of the first virtual reference line at equal distances from the first virtual reference line, and a predetermined information group is defined by the intervals between the side dots 12 and the key dot.

As described above, there are various modifications of the arrangement of side dots which can define a predetermined information group, the direction of a dot pattern, the fourth virtual reference lines, and the like, and alterations can be freely made to the arrangement within the scope of the present invention.

Figure 28:
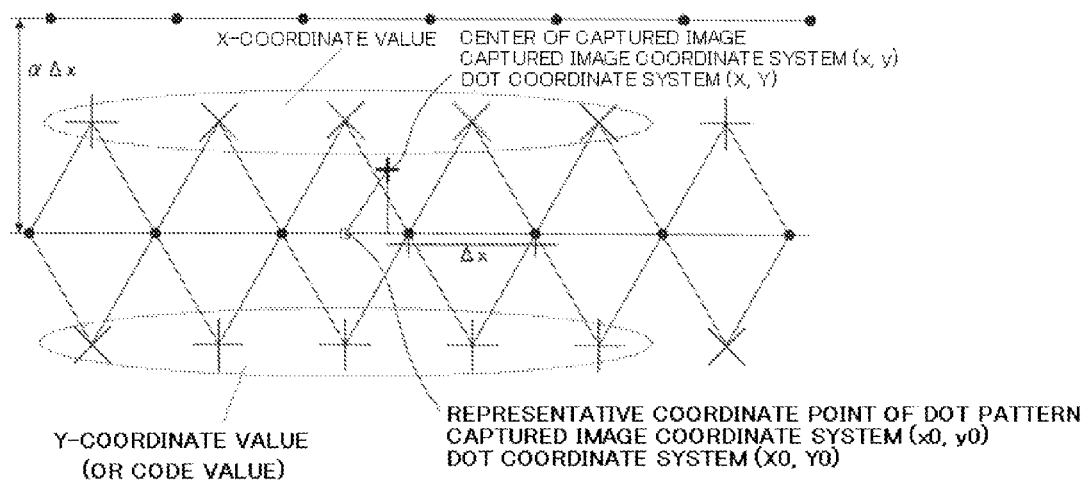
FIG. 28 is a view showing an example of how XY coordinates are obtained from a dot pattern.

FIG. 28 is a view showing an example of how the XY coordinate value of the center of an image of a dot pattern captured by the optical reading means.

When obtaining the XY coordinate values of the center of the captured image, the coordinate values of the coordinate center of the dot pattern are obtained first.

A representative coordinate value of a dot pattern which defines one coordinate value is represented by $(X_o, Y_o)$ in the dot coordinate system, and is represented by $(x_0, y_0)$ in the imaging coordinate system.

In addition, letting Kx be an increase in the X-coordinate value of dot coordinates and Ky be an increase in the Y-coordinate value, the value of $(X_{n+1}, Y_{n+1})$ can be represented by $$X_{n+1} = X_n + K_x$$

$$Y_{n+1} = Y_n + K_y$$

Therefore, the XY coordinate values of the center of the captured image is represented by the following equation:

$$X = \frac{Kx}{n\Delta x} \times (x - x_0) + X_0$$

$$Y = \frac{Ky}{\alpha \Delta x} \times (y - y_0) + Y_0$$

where n is the number of reference dots between the first dot of a plurality of reference dots defining one set of coordinate values and the start dot of reference dots defining coordinate values consecutively arranged following the set of coordinate values.

In addition, $\alpha$ is a coefficient for indicating an increase in y-coordinate in the captured image coordinate system with respect to a distance $\Delta x$ between reference dots of the dot pattern in the captured image coordinate system, and $\alpha \Delta x$ corresponds to the increase Ky in Y-coordinate in the dot coordinate system.

Note that a dot pattern need not always be formed at the position of $\alpha \Delta x$ above the dot pattern in FIG. 28.

When using a one-dimensional dot pattern defined by X-coordinate values, code values may be defined in the region where Y-coordinate values are defined.

With this arrangement, arranging a dot pattern along an actual line can give vector information formed by various line segments such as a CAD drawing, characters/symbols/graphics, the contours of a map, and road information. This makes it possible to print electronic vector information such as DTP information, CAD information, or map information on a medium.

For example, in the case of CAD, conventionally, it is technically impossible to acquire electronic vector information by image copying. Applying the present invention to CAD makes it possible to generate electronic vector information for CAD by reading the entire drawing with the optical reading means.

In addition, the present invention (stream dots) allows to define Z-coordinate values. This makes it possible to express three-dimensional coordinates.

It is therefore possible to read height information at any position on a map by using stream dots for the contours of the map. In addition, printing dots on a stereoscopic surface can read and reproduce the corresponding stereoscopic shape.

The inks used for a stream dot pattern according to the present invention and for visible printed matter on a medium surface will be described next.

The ink to be used for dot printing of a stream dot pattern is preferably stealth ink (invisible ink) which absorbs infrared light or carbon black ink. The ink used for printing general graphics and texts is preferably non-carbon ink which reflects or transmits infrared light.

It is possible to print a dot pattern using almost all types of printers ranging from an offset printer to an inkjet printer by only adding one step of dot printing to general printing steps without requiring any special printing technique.

A dot pattern constituted by minute dots each having a diameter of 0.04 mm (about 0.05 mm in the case of an inkjet printer) is difficult to see. Using colorless transparent infrared-absorbing stealth ink developed for high-quality output can make dots completely invisible.

Note that information dots are generally provided at equal distances from virtual reference points to make the dots unnoticeable. When, however, accurately recognizing information dots by expressing the information using lengths as well as directions, the information may be defined by different distances at the respective virtual reference points.

When not changing the ink and the printing steps at all (four-color printing), K (carbon black) ink of C, M, Y, and K inks is used for dots. In this case, C, M, and Y inks may be used for a CAD drawing, characters/symbols/graphics, a map, a photograph, and graphics, and K ink may be used to print dots on them. Black color is expressed by composite black obtained by mixing C, M, and Y inks at 100%. However, since perfect black cannot be reproduced, black is not emphasized. This may lead to a diffused picture. In addition, a region in which dots are printed becomes a halftone dot pattern because the dots are printed by K ink. A closer look at this region will show a slightly grayish picture. In order to solve this problem, dots may be printed in only a minimum necessary region, and C, M, Y, and K inks may be used for a region in which no dots are printed, as in a conventional technique. However, this allows the scanner to touch only a limited region in which dots are printed.

In addition, since this technique uses ink that reacts in the infrared range and does not allow copying, it is possible to maintain security at a high level. The printing medium is not limited to any specific type of paper used for printing. It is possible to print dots on any type of paper, for example, art paper, mat paper, high-quality paper, plain paper, newspaper, photographic paper, or printer paper. Furthermore, it is possible to print on any medium, other than paper, as long as the medium does not expand or contract.

This technique can use all types of media such as newspaper, plain paper, and polyester, and can print by using printing techniques such as offset printing and rotary press printing, UV printing, and printing using an inkjet printer. That is, the technique is very high in degree of freedom in printing.

Note that the scanner which reads dot codes can perform processing from imaging of a dot pattern to analysis of the dot codes in only 0.1 sec to 0.2 sec. This makes it possible to access information instantly without any stress.

Other examples of the arrangement of a dot pattern will be described next with reference to FIGS. 29 to 31.

Figure 29:
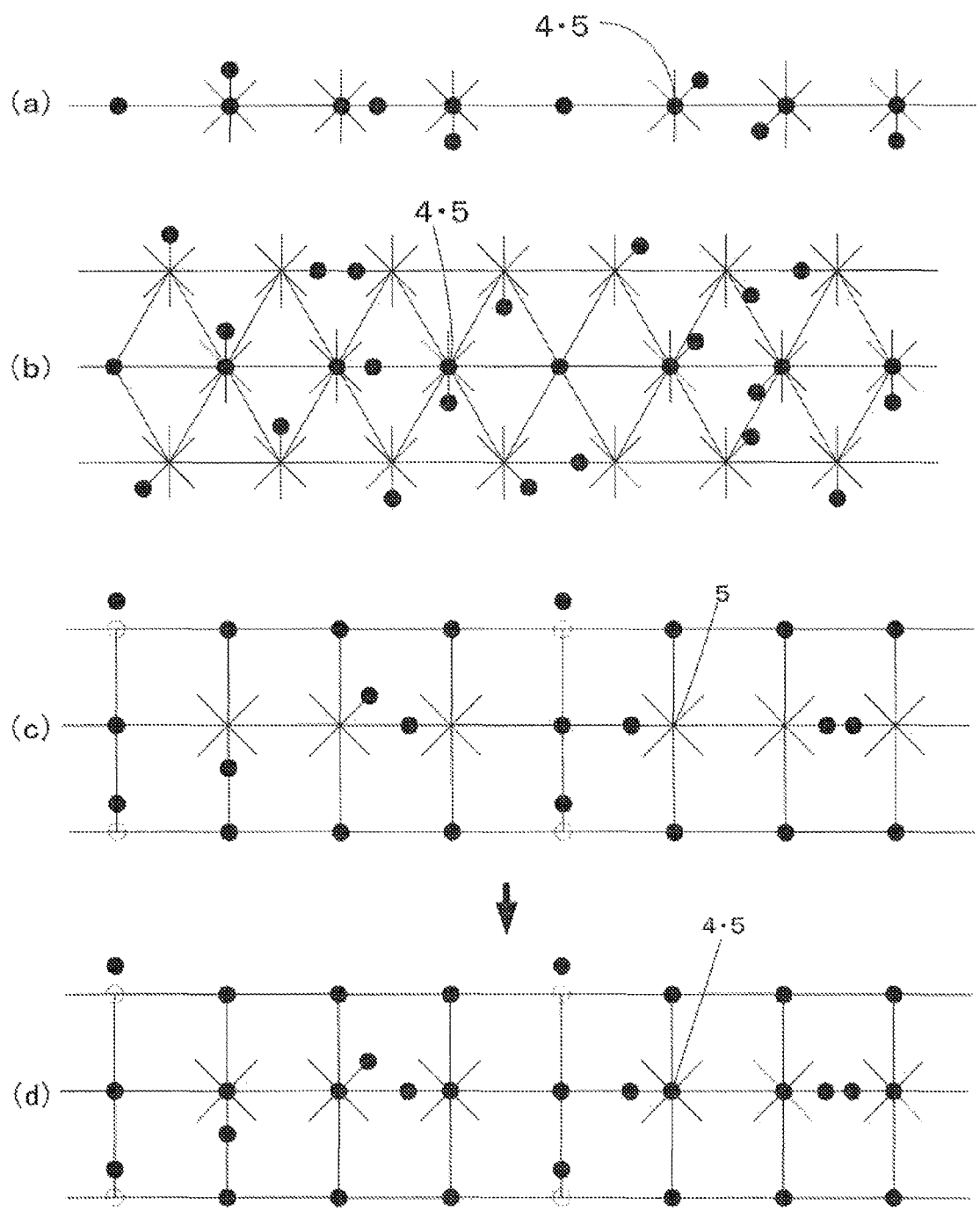
FIG. 29 shows an example of each stream dot pattern.

In FIG. 29, (a) indicates an example in which the virtual reference points 5 are provided on the reference dots 4 on the first virtual reference line instead of the second virtual reference lines. In FIG. 29, (b) indicates an example in which the virtual reference points 5 are provided on the reference dots 4 on the first virtual reference line as well as on the second virtual reference lines.

Referring to (a) in FIG. 29, it is possible to save the time for searching for the second virtual reference lines and increase the reading velocity. Referring to (b) in FIG. 29, it is possible to increase the information amount.

In FIG. 29, (c) and (d) indicate an example in which the reference dots 4 are arranged on the virtual reference points 5 provided on the second virtual reference lines. Referring to (c) in FIG. 29, no dots are arranged on the virtual reference points 5. This arrangement sometimes leads to slight delays and errors when recognizing and analyzing the image data read by the optical reading means as compared with an arrangement in which the reference dots 4 are further arranged on the virtual reference points 5 as indicated by (d) in FIG. 29. Arranging the reference dots 4 on the virtual reference points 5 as indicated by (d) in FIG. 29 makes it possible to also define the virtual reference points 5 from the newly arranged reference dots 4 and perform recognition analysis of the data pattern more accurately.

Note that the first virtual reference line may be provided by connecting the newly arranged reference dots 4, or the second virtual reference lines can be defined.

Figure 30:
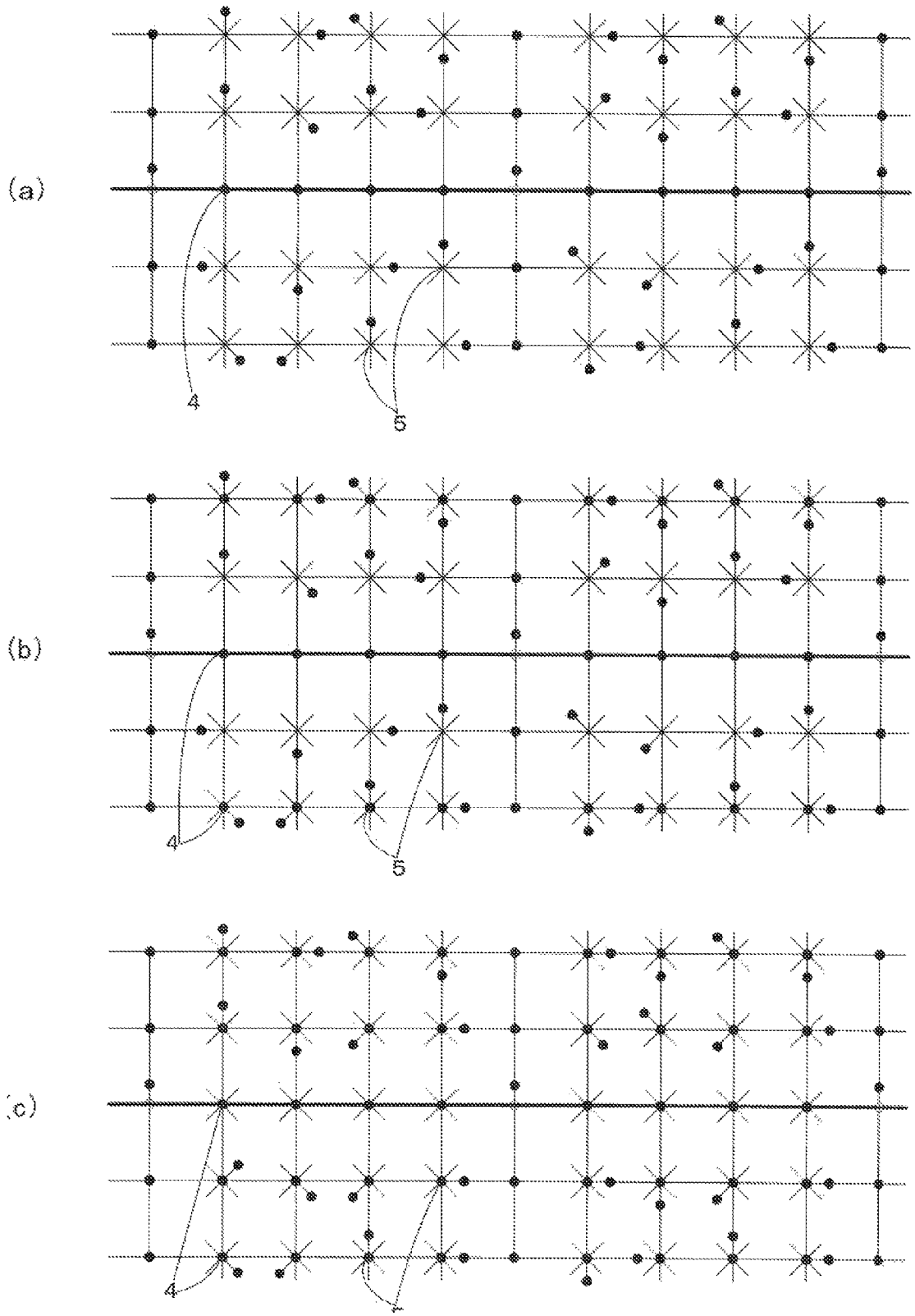
FIG. 30 shows an example of each stream dot pattern.

In FIG. 30, (a) to (c) indicate the comparison between a case in which no reference dots are arranged on virtual reference points and a case in which reference dots are arranged on virtual reference points.

As indicated by (a) in FIG. 30, when no reference dots are arranged on the virtual reference points 5, it is necessary to provide the virtual reference points 5 by defining the second virtual reference lines and the fourth virtual reference lines from the reference dots 4 arranged on the first virtual reference line and the side dots arranged on the third virtual reference lines. The larger a region forming a predetermined information group, the more difficult it is to search for the virtual reference points 5.

In contrast, arranging the reference dots 4 on the virtual reference points 5 as in the example indicated by (b) in FIG. 30 can also define the second virtual reference lines from the newly arranged reference dots 4. This makes it possible to search for the virtual reference points 5 more accurately.

Obviously, it is possible to define the second virtual reference points by arranging a plurality of reference dots in two lines and to search for virtual reference points. In the example indicated by (b) in FIG. 30, for example, the fourth virtual reference lines located on the upper and lower ends of a predetermined information group may be set as the first virtual reference lines (without providing any virtual reference points or arranging no information dots).

Obviously, reference dots can be arranged on all the virtual reference points, as indicated by (c) in FIG. 30.

The step of providing virtual reference points at predetermined positions at which the reference dots arranged on virtual reference points are connected to the reference dots arranged on the first virtual reference line will be described next with reference to (a) to (c) in FIG. 31.

Figure 31:
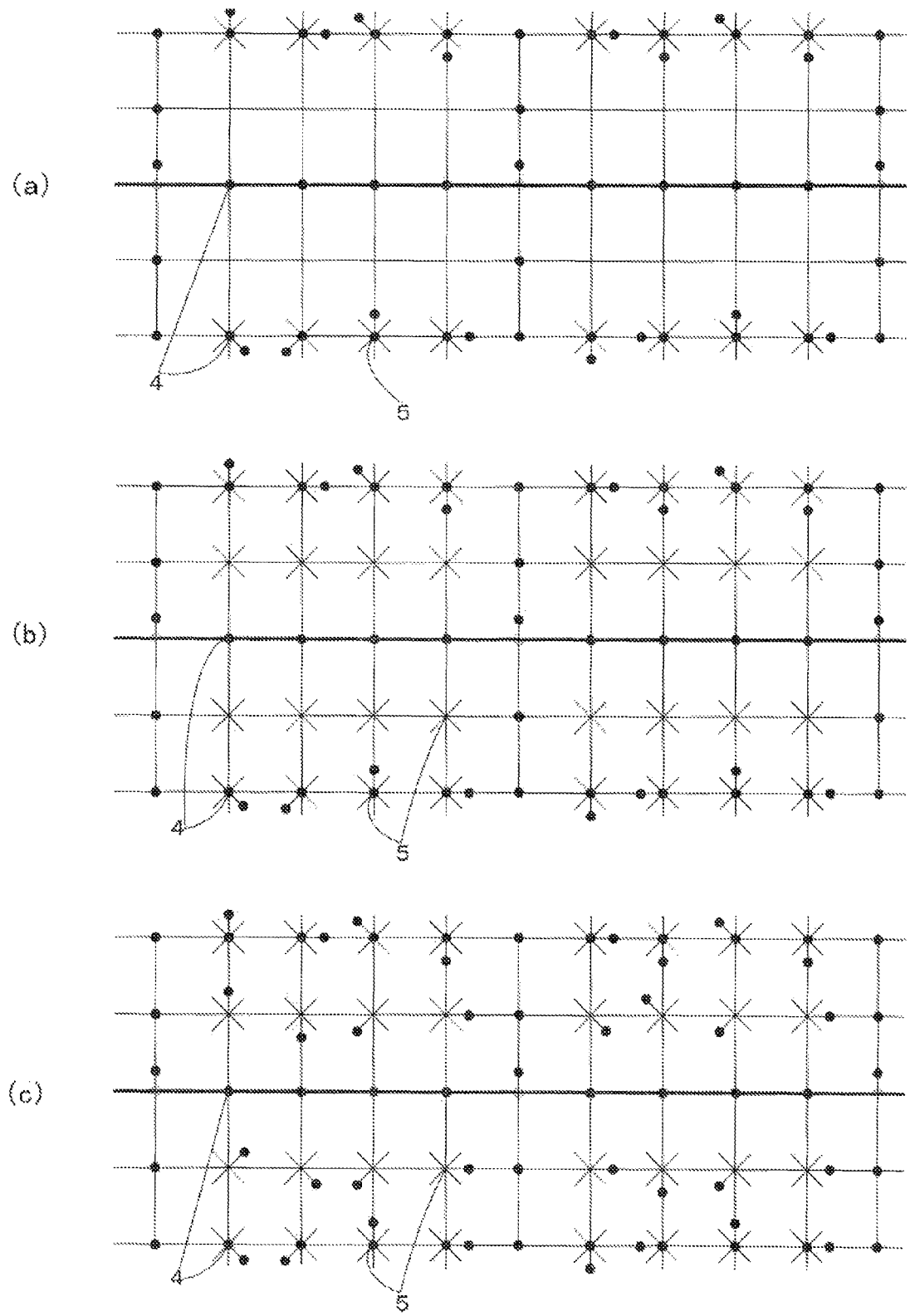
FIG. 31 shows an example of each stream dot pattern.

First of all, lines connecting the reference dots 4 arranged on the virtual reference points 5 and the reference dots 4 arranged on the first virtual reference line are provided as indicated by (a) in FIG. 31. As indicated by (b) in FIG. 31, the new virtual reference points 5 are provided at the intersection points between the provided lines and the fourth virtual reference lines defined from the side dots arranged on the third virtual reference lines.

As indicated by (c) in FIG. 31, information dots are then arranged, which define information with distances and directions from the newly provided virtual reference points 5.

Obviously, when increasing the amount of information defined by one predetermined information group, the reference dots 4 can be further arranged on the newly provided virtual reference points 5 as indicated by (b) in FIG. 31, and the virtual reference points 5 can be further provided at predetermined positions at which the newly arranged reference dots 4 are connected to the reference dots 4 arranged on the first virtual reference line.

As described above, the stream dot pattern according to the present invention allows to define information by an amount similar to that by a conventional dot pattern while properly forming the dot pattern along an actual line including a curve or on a curved surface body such as a globe.

Note that it is also possible to provide virtual reference points between reference dots arranged linearly and arrange virtual reference points at arbitrary positions in a predetermined information group by a dot pattern generation algorithm.

Figure 32:
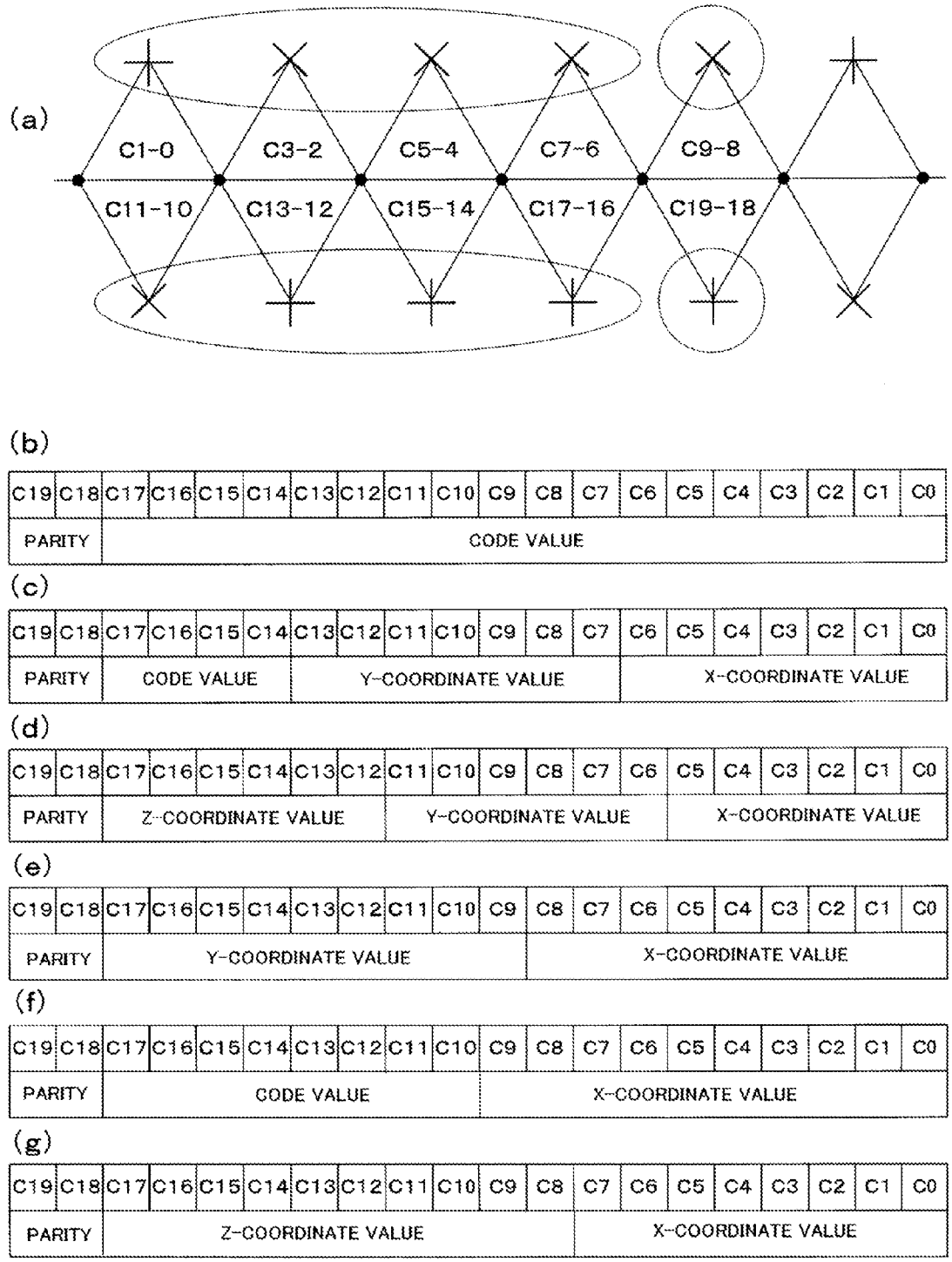
FIG. 32 shows an example of the format of each dot pattern.

FIGS. 32 and 33 explain the relationship between dot patterns, code values, and identifiers.

In the dot pattern indicated by (a) in FIG. 32, a predetermined information group is constituted by 2×5 regions. This predetermined information group is partitioned into C1-0 to C19-18. In FIG. 32, (b) indicates the dot code format of each region.

In FIG. 32, (b) indicates a case in which a dot pattern is constituted by only code values. In C0 to C17, the code values of the respective dot codes of the dot pattern in the respective regions indicated by (a) in FIG. 32 are registered. In C18 and C19, parities are registered.

Referring to (c) in FIG. 32, XY coordinates values are registered together with code values. That is, referring to (a) in FIG. 32, X-coordinate values are registered in C0 to C7, Y-coordinate values are registered in C8 to C15, and code values are registered in C16 to C19.

As described above, in this embodiment, XY coordinate values can be registered, together with code values, in the dot pattern.

In addition, in FIG. 32, (d) indicates a format which registers Z-coordinate values together with XY coordinate values. As described above, the dot pattern according to the present invention can use a very flexible format as in the case in which only code values are registered, the case in which code values and XY coordinates are registered, and the case in which Z-coordinate values are registered together with XY coordinate values.

Note that a code value indicates an active code and/or an index, the active code indicates a processing method, and the index indicates a predetermined region.

In addition, an index includes a coordinate index, which indicates a region in which the page number of paper as a medium or the like is registered. In this region, it is possible to register an identifier identifying a medium itself in which XY coordinate values are registered or a page number as a dot pattern.

In FIG. 32, (e) to (g) indicate other modifications of the format.

The relationship between dot patterns, code values, and identifiers will be described next with reference to FIG. 33.

According to the dot pattern indicated by (a) in FIG. 33, a predetermined information group of the dot pattern and its direction are defined by placing a predetermined dot (key dot or side dot), unlike the case indicated by (a) in FIG. 32 in which a predetermined information group of a dot pattern and its direction are defined by the shifting the direction of each information dot from a virtual reference point. This allows the dot pattern to have shifts in eight directions for one information dot, that is, to have an information amount of 3 bits.

In FIG. 33, (b) indicates a case in which a dot pattern is constituted by only XYZ coordinate values. In this dot pattern, X-coordinate values are registered in C0 to C8, Y-coordinate values are registered in C9 to C17, and Z-coordinate values are registered in C18 to C26.

As described above, using the dot pattern according to the present invention can cope with Z-coordinate values and other coordinate systems (for example, a cylindrical coordinate system, spherical coordinate system, or latitude/longitude system) as well as XY coordinate values.

Other modifications of the format may be those indicated by (c) to (g) in FIG. 33 and the like. Such formats are not limited to those shown in FIG. 33. Obviously, it is possible to freely change the formats within the scope of the present invention.

Other examples of the arrangement of the dot pattern will be described next with reference to FIG. 34.

Figure 34:
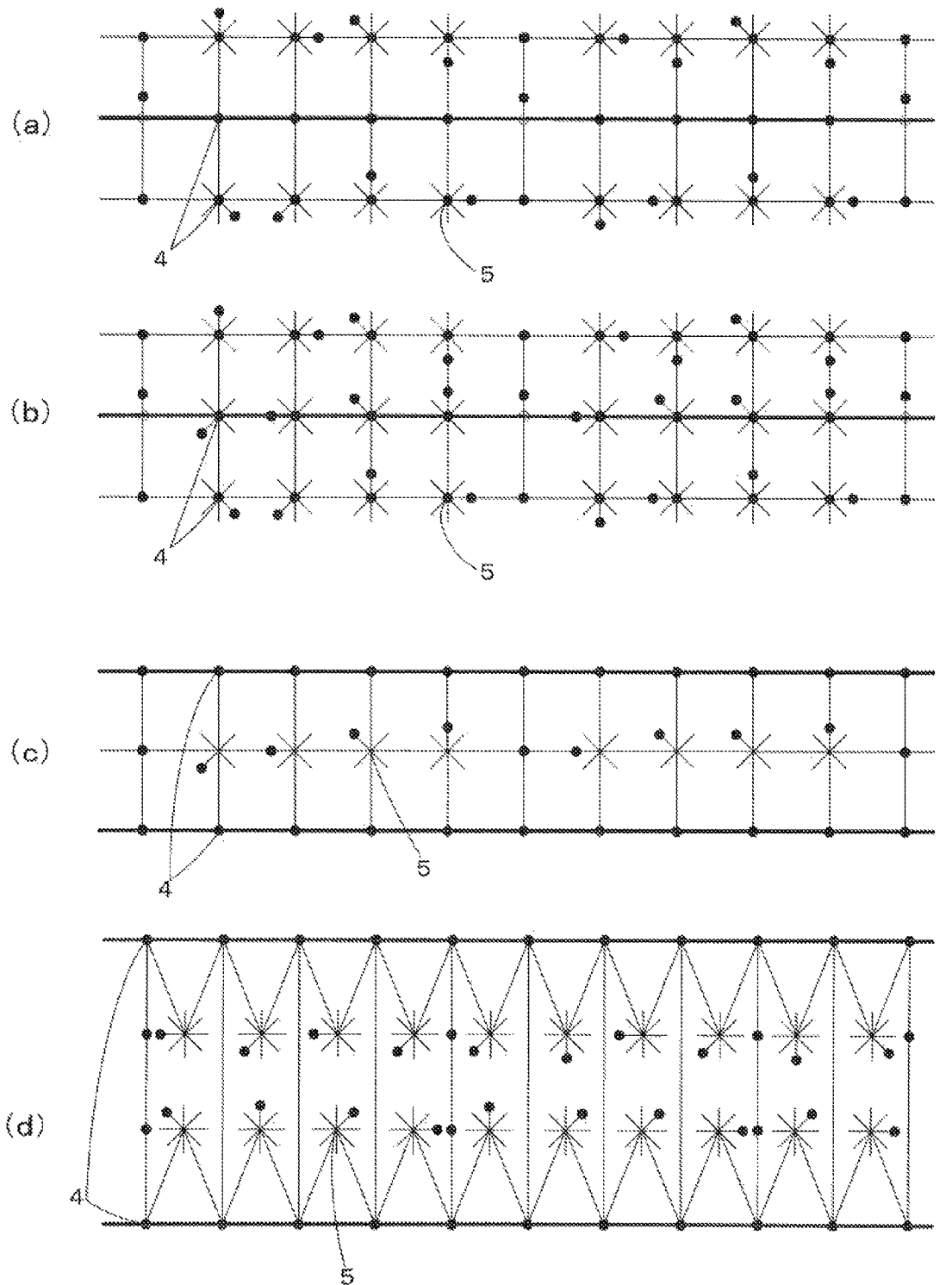
FIG. 34 shows an example of each stream dot pattern.

In FIG. 34, (a) indicates an example in which reference dots are arranged on virtual reference points. In FIG. 34, (b) indicates an example in which reference dots are consecutively arranged in three lines on a medium surface, and virtual reference points are provided on the reference dots on the respective rows.

Note that as the step of arranging reference dots and virtual reference points at the same spots, it is possible to use either the step of providing the virtual reference points on the reference dots or the step of arranging the reference dots on the virtual reference points.

In FIG. 34, (c) indicates an example in which the second virtual reference lines, virtual reference points, and information dots are arranged between rows of reference dots consecutively arranged in lines.

In the example indicated by (c) in FIG. 34, straight lines connecting the reference dots arranged on the different first virtual reference lines are set as the second virtual reference lines, virtual reference points are provided at the midpoints of the second virtual reference lines, and information dots are arranged. However, the arrangement of virtual reference points is not limited to the one in which the second virtual reference lines are defined between the two first virtual reference lines. In addition, obviously, when arranging information dots around the reference dots 4 and defining information according to the degree of information to be input/output, it is possible to provide virtual reference points on reference dots and arrange information dots as described above.

In FIG. 34, (d) indicates an example in which the second virtual reference lines are defined between the two or more first virtual reference lines, and information dots are arranged.

When providing virtual reference points between the two or more first virtual reference lines in this manner, the positions at which the virtual reference points are provided are not limited to the midpoints. However, the virtual reference points are preferably provided at the midpoints to specify the positions of the virtual reference points from the positions of the corresponding reference dots easily and more accurately, improve the recognition ratio, and increase the calculation speed.

Figure 35:
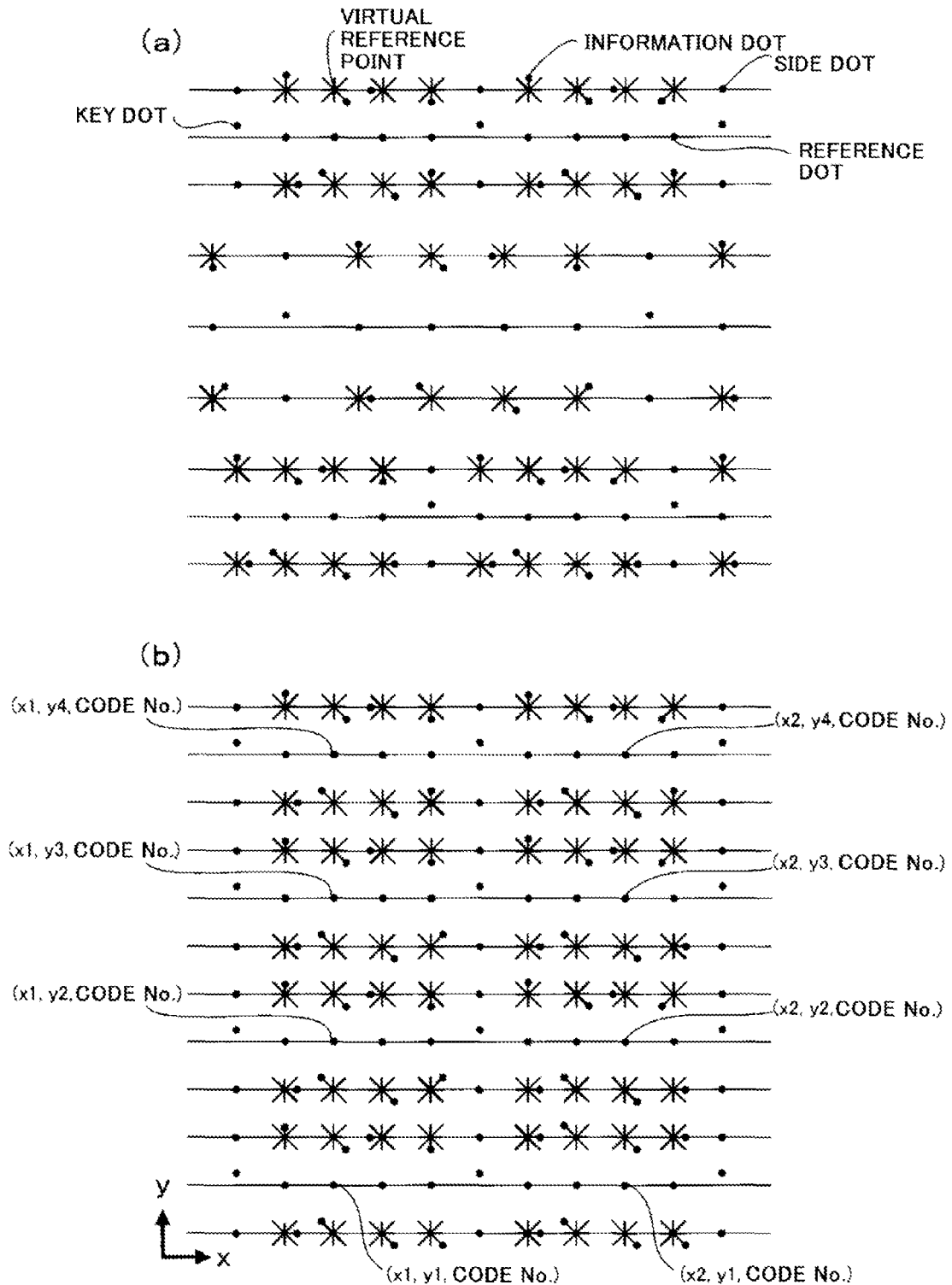
FIG. 35 shows an example of each stream dot pattern.

FIG. 35 shows an example of a state in which stream dot patterns are arranged vertically.

Referring to FIG. 35, key dots and side dots are arranged in addition to reference dots and information dots. The key dots are dots arranged on the two ends of a predetermined information group. The key dots are representative points of the dot pattern 1 corresponding to one region represented by an information dot group. The side dots are dots arranged on extended lines in the positive and negative shifting direction of the key dots 2.

Referring to (b) in FIG. 35, reference dots and stream dot patterns are arranged at equal intervals. XY coordinate values are defined without any gap by forming a plurality of stream dot patterns side by side with reference dots being arranged at predetermined intervals. However, the stream dot pattern according to the present invention is not limited to this. As indicated by (a) in FIG. 35, intervals may be arbitrarily set between dot patterns. In addition, it is possible to arbitrarily set intervals between reference dots.

This makes it possible to form a dot pattern by repeating a predetermined information group in an arbitrary shape conforming to an information region visibly formed on a medium surface without being restricted by the shape of a rectangular region (used as an index) when a dot pattern whose XY coordinates are defined is formed as a two-dimensional code.

INDUSTRIAL APPLICABILITY

According to the present invention, it is possible to define and use information on curved surfaces of globes, human phantoms and the like, and various kinds of products, along the lines drawn on CAD drawings, maps, characters, symbols, and graphics, and contours of photographs, images, and the like.

REFERENCE SIGNS LIST

1 . . . dot pattern
2 . . . key dot
3 . . . information dot
4 . . . reference dot
5 . . . virtual reference point
6 . . . first virtual reference line
7 . . . second virtual reference line
8 . . . third virtual reference line
9 . . . fourth virtual reference line
10 . . . actual line
12 . . . side dot

The invention claimed is:
1. A stream dot pattern, comprising:
a plurality of reference dots consecutively arranged in a single line according to a predetermined rule; and
an information dot which is located at an end point of a vector expressed with one of a plurality of virtual reference points as a start point and whose information is defined by at least one of a distance and a direction from the virtual reference points,
wherein the virtual reference points are provided at predetermined positions on a second virtual reference line, the second virtual reference line is virtually defined at a predetermined position from the reference dots and/or a first virtual reference line and is formed by a straight line and/or a curve, and the first virtual reference line is virtually provided on the plurality of reference dots and is a single line formed by a straight line or a polygonal line and/or a curve.

2. The stream dot pattern according to claim 1, wherein the reference dots are arranged at predetermined intervals.

3. The stream dot pattern according to claim 1, wherein the virtual reference points provided on the second virtual reference line are provided on the reference dots in place of the second virtual reference line.

4. The stream dot pattern according to claim 1, the wherein virtual reference points are further provided on the reference dots.

5. The stream dot pattern according to claim 1, wherein the reference dots are further provided on the virtual reference points.

6. The stream dot pattern according to claim 1, wherein the reference dots are further placed on the virtual reference points, and a virtual reference point is further provided at a predetermined position at which one of the reference dots placed on the virtual reference point is connected to one of the plurality of the plurality of reference dots linearly and consecutively arranged according to a predetermined rule.

7. The stream dot pattern according to claim 1, wherein
the reference dots are arranged in not less than two rows at least on the medium surface,
not less than two first virtual reference lines are provided in correspondence with the reference dots in not less than two rows, and
the second virtual reference line defined at a predetermined position from the reference dots and/or a first virtual reference line is defined between the not less than two first virtual reference lines.

8. The stream dot pattern according to claim 7, wherein the second virtual reference line comprises a straight line connecting a plurality of reference dots arranged on the not less than two different first virtual reference lines.

9. The stream dot pattern according to claim 7, wherein the plurality of virtual reference points arranged at predetermined positions on the second virtual reference lines are provided at midpoints of the second virtual reference lines.

10. The stream dot pattern according to claim 1, wherein
the second virtual reference lines defined at predetermined positions from the reference dots and/or a first virtual reference line comprise straight lines configuring opposite sides forming a triangle having, as a base, a first virtual reference line connecting adjacent reference dots with a straight line, and
the plurality of virtual reference points provided at predetermined positions on the second virtual reference lines are provided on vertices of the triangle or on the opposite sides of the triangle.

11. The stream dot pattern according to claim 10, wherein the triangle is defined by predetermined base angles at the adjacent reference dots, lengths of opposite sides corresponding to predetermined magnifications relative to the base, or a height from the base to the vertex which corresponds to a predetermined magnification ratio relative to the base.

12. The stream dot pattern according to claim 10, wherein the triangle comprises an isosceles triangle or an equilateral triangle.

13. The stream dot pattern according to claim 1, wherein
the second virtual reference line defined at a predetermined position from the reference dots and/or a first virtual reference line comprises a straight line which divides an interior angle at a vertex of the first virtual reference line formed by the polygonal line into equal halves, and
the plurality of virtual reference points provided at predetermined positions on the second virtual reference line are provided at predetermined distances from the plurality of reference dots.

14. The stream dot pattern according to claim 1, wherein the reference dots are arranged only at vertices of the first virtual line formed by a polygonal line.

15. The stream dot pattern according to claim 1, wherein
the second virtual reference line defined at a predetermined position from the reference dots and/or a first virtual reference line comprises a straight line which forms an arbitrary angle with respect to a tangent to the first virtual reference line formed by a curve, and
the plurality of virtual reference points provided at predetermined positions on the second virtual reference line are provided at predetermined positions determined from the adjacent reference dots.

16. The stream dot pattern according to claim 15, wherein a predetermined position determined from the adjacent reference dots is defined by an intersection point between the second virtual reference lines which form predetermined angles from the adjacent reference dots, a distance from the reference dot corresponding to a predetermined magnification ratio relative to a length of the first virtual reference line formed by a curve connecting the adjacent reference dots, or a height from the first virtual reference line, formed by a curve connecting the adjacent reference dots, which corresponds to a predetermined magnification ratio relative to a length of the first virtual reference line.

17. The stream dot pattern according to claim 1, wherein the second virtual reference line defined at a predetermined position from the reference dots and/or a first virtual reference line comprises a straight line passing through the reference dots or a midpoint of the adjacent reference dots.

18. The stream dot pattern according to claim 1, wherein
the second virtual reference line defined at a predetermined position from the reference dots and/or a first virtual reference line comprises: a straight line perpendicular to the first virtual reference line formed by a straight line; or a straight line perpendicular to a tangent to the first virtual reference line formed by a curve, and
the plurality of virtual reference points provided at predetermined positions on the second virtual reference line are provided at predetermined positions determined from the adjacent reference dots.

19. The stream dot pattern according to claim 1, wherein the plurality of virtual reference points provided at predetermined positions on the second virtual reference line are provided at predetermined distances from the first virtual reference line formed by a straight line or from a tangent to the first virtual reference line formed by a curve.

20. The stream dot pattern according to claim 1, wherein the plurality of reference dots are arranged at different intervals, and a direction of a dot pattern and a predetermined information group of the dot pattern are defined by the arrangement intervals.

21. The stream dot pattern according to claim 20, wherein the plurality of reference dots are arranged for each predetermined information group of the dot pattern such that an interval between at least one pair of the adjacent reference dots differs from uniform intervals between other pairs of the adjacent reference dots, and the predetermined information group of the dot pattern is defined by the arrangement intervals.

22. The stream dot pattern according to claim 20, wherein the plurality of reference dots are arranged for each predetermined information group of the dot pattern such that intervals between at least two pairs of the adjacent reference dots differ from each other as well as uniform intervals between other pairs of the adjacent reference dots, and a direction of the dot pattern and the predetermined information group of the dot pattern are defined by the arrangement intervals.

23. The stream dot pattern according to claim 1, wherein information dots each of whose information is defined by a distance and a direction from the virtual reference point at an end point expressed by a vector with the virtual reference point being a start point are placed on two opposite sides of the first virtual reference line in different shifting directions, and a direction of the dot pattern and a predetermined information group of the dot pattern are defined by a difference between the shifting directions.

24. The stream dot pattern according to claim 1, wherein the plurality of virtual reference points provided at predetermined positions on the second virtual reference line are arranged such that different numbers of virtual reference points are arranged on two sides of the first virtual reference line, and a direction of the dot pattern and a predetermined information group of the dot pattern are defined by a difference between the numbers.

25. The stream dot pattern according to claim 1, wherein the information dots each of whose information is defined by a distance and a direction from the virtual reference point at an end point expressed by a vector with the virtual reference point being a start point are arranged such that different numbers of information dots are arranged on two sides of the first virtual reference line, and a direction of the dot pattern and a predetermined information group of the dot pattern are defined by a difference between the numbers.

26. The stream dot pattern according to claim 1, wherein information is defined depending on whether an information dot which is located at an end point expressed by a vector with the virtual reference point being a start point and whose information is defined by a distance and a direction from the virtual reference point is placed for each of the virtual reference points, placed on the virtual reference point, or placed on neither thereof.

27. The stream dot pattern according to claim 1, wherein a direction of the dot pattern and a predetermined information group are defined by shifting and placing at least one of the plurality of reference dots as a key dot to a predetermined position.

28. The stream dot pattern according to claim 27, wherein a direction of the dot pattern and a predetermined information group is defined by placing the key dot at a predetermined position in a direction parallel or perpendicular to a direction of the second virtual reference line.

29. The stream dot pattern according to claim 27, wherein a third virtual reference line which passes through at least one of the plurality of reference dots and is perpendicular to a straight line forming the first virtual reference line or a tangent to a curve forming the first virtual reference line, or divides an interior angle into equal halves at a vertex of a polygonal line forming the first virtual reference line is virtually provided, and a direction of the dot pattern and a predetermined information group are defined by placing the key dot at a predetermined position on the third virtual reference line.

30. The stream dot pattern according to claim 27, wherein the second virtual reference line defined at a predetermined position from the reference dots and/or a first virtual reference line is defined only from the reference dots other than the reference dot shifted as the key dot.

31. The stream dot pattern according to claim 1, wherein a third virtual reference line which passes through at least one of the plurality of reference dots and is perpendicular to a straight line forming the first virtual reference line or a tangent to a curve forming the first virtual reference line, or divides an interior angle into equal halves at a vertex of a polygonal line forming the first virtual reference line is virtually provided, and at least one side dot which defines a direction of the dot pattern and a predetermined information group is placed at a predetermined position on the third virtual reference line.

32. The stream dot pattern according to claim 31, wherein the plurality of virtual reference points provided at predetermined positions on second virtual reference line are provided on a fourth virtual reference line which is parallel to the first virtual reference line and virtually passes through the side dot.

33. The stream dot pattern according to claim 32, wherein the plurality of virtual reference points are provided at predetermined intervals on the fourth virtual reference line.

34. The stream dot pattern according to claim 31, wherein at least not less than one of the side dots is placed on each of two sides of the first virtual reference line such that the side dots are located at different distances from the first virtual reference line, and a direction of the dot pattern is defined by distances between the side dots and the first virtual reference line.

35. The stream dot pattern according to claim 1, wherein
at least one of the plurality of reference dots is shifted and placed as a key dot to a predetermined position,
a third virtual reference line which passes through at least one of the plurality of reference dots and is perpendicular to a straight line forming the first virtual reference line or a tangent to a curve forming the first virtual reference line, or divides an interior angle into equal halves at a vertex of a polygonal line forming the first virtual reference line is virtually provided,
at least one side dot which defines a direction of the dot pattern and a predetermined information group is placed at a predetermined position on the third virtual reference line, and at least not less than one of the side dots is placed on each of two sides of the first virtual reference line such that the side dots are located at equal distances from the first virtual reference line, and
a direction of the dot pattern and a predetermined information group of the dot pattern are defined by a distance between the side dot and the key dot.

36. The stream dot pattern according to claim 1, wherein a reference dot and/or an information dot is formed by a polygonal shape configured to express a direction, and a direction of the dot pattern is defined by the shape.

37. The stream dot pattern according to claim 1, wherein a reference dot and/or an information dot is formed to have a size different from that of other reference dots and/or other information dots, and a direction of the dot pattern and a predetermined information group are defined by a difference between the sizes.

38. The stream dot pattern according to claim 1, wherein a reference dot and/or an information dot is formed to have a shape different from that of other reference dots and/or other information dots, and a direction of the dot pattern and a predetermined information group are defined from a difference between the shapes.

39. The stream dot pattern according to claim 1, wherein information defined by the information dot is XY coordinate values and/or a code value.

40. A stream dot pattern which is configured by one or a plurality of lines of stream dot patterns according to claim 1.

41. The stream dot pattern according to claim 40, wherein a reference dot arranged at a predetermined position in the stream dot pattern serves as a reference for defining the second virtual reference line and/or defining a direction of the dot pattern and a couple of XY coordinate values and/or a code value.

42. The stream dot pattern according to any one of claims 1 to 40, wherein the plurality of reference dots and the plurality of virtual reference points are at least arranged on or along an actual line which is visibly formed on the medium surface.

43. A medium on which a stream dot pattern according to claim 1 is formed.

44. The medium on which a stream dot pattern is formed according to claim 1, the stream dot pattern is formed on a medium by a printed indication, a display indication, or by providing a through hole or a convex/concave pattern on the medium.

45. The medium on which a stream dot pattern is formed according to claim 44, wherein a reference dot and/or an information dot is printed by ink having a property of exhibiting a different reaction to irradiation light than ink used to print visible information on a medium surface.

46. The medium on which a stream dot pattern is formed according to claim 45, wherein the ink having the property of exhibiting the different reaction is invisible.

47. The medium on which a stream dot pattern is formed according to claim 45, wherein
the irradiation light comprises infrared light,
the ink having the property comprises an infrared-absorbing ink, and
the ink used to print visible information on a medium surface comprises an infrared-transmitting ink or an infrared-reflecting ink.

48. An optical reading device, comprising:
optical reading means for imaging the stream dot pattern according to claim 1; and
analysis means for analyzing the stream dot pattern and acquiring numerical values defined by the stream dot pattern.

49. A reading method comprising:
imaging the stream dot pattern according to claim 1;
analyzing image data; and
acquiring numerical values defined by the stream dot pattern.

50. A non-transient computer readable medium storing a program executed on an electronic device to carry out:
analyzing image data imaged obtained by imaging the stream dot pattern according to claim 1 by optical reading means; and
acquiring numerical values defined by the stream dot pattern.

51. A stream dot pattern reading device comprising:
optical reading means for imaging the stream dot pattern according to claim 1; and
analysis means for analyzing the stream dot pattern, acquiring numerical values defined by the stream dot pattern, and controlling an information output device based on the acquired numerical values.

52. A reading method comprising:
imaging the stream dot pattern according to claim 1;
analyzing image data;
acquiring numerical values defined by the stream dot pattern; and
controlling an information output device based on the acquired numerical values.

53. An information processing device, comprising:
optical reading means for imaging the stream dot pattern according to claim 1; and
analysis means for analyzing the image data, acquiring numerical values defined by the stream dot pattern, and executing processing corresponding to the decoded numerical values.

54. A non-transient computer readable medium storing a stream dot pattern generation program executed on an electronic device to carry out generating the stream dot pattern according to claim 1.

55. A stream dot pattern generation device which is programmed in accordance with a stream dot pattern generation algorithm to carry out generating the stream dot pattern according to claim 1.

56. A stream dot pattern generation method comprising generating a stream dot pattern in accordance with a stream dot pattern generation algorithm for generating the stream dot pattern according to claim 1.

57. A speech output device comprising:
optical reading means for imaging the stream dot pattern according to claim 1;
analysis means for analyzing the stream dot pattern and acquiring numerical values defined by the stream dot pattern; and
speech output means for outputting speech associated with the numerical values acquired by the analysis means.

58. An information input/output device comprising:
optical reading means for imaging the stream dot pattern according to claim 1;
analysis means for analyzing the stream dot pattern and acquiring numerical values defined by the stream dot pattern; and
means for carrying out at least one of outputting information associated with the numerical values acquired by the analysis unit and executing a program associated therewith.

59. A non-transient computer readable medium storing a program executed on an electronic device to carry out:
analyzing image data obtained by imaging the stream dot pattern according to claim 1 by optical reading means;
acquiring numerical values defined by the steam dot pattern; and
carrying out at least one of outputting information associated with the acquired numerical values and executing a program associated therewith.

60. The information processing device according to claim 53, wherein
the corresponding processing is for outputting an execution result of at least one of speech, an image, a moving image, a character, and a program.

61. A medium on which a stream dot pattern is formed, comprising the following steps, when forming, on a medium surface, a stream dot pattern defining information according to a predetermined rule for dots:
1) arranging a plurality of reference dots consecutively on the medium surface in a single line according to a predetermined rule;
2) providing a first virtual reference line which connects the plurality of reference dots and is a single line formed by a straight line or a polygonal line and/or a curve;
3) providing a second virtual reference line which is defined at a predetermined position from the reference dots and/or the first virtual reference line, and is formed by a straight line and/or a curve;

4) providing a plurality of virtual reference points at predetermined positions on the second virtual reference line; and
5) placing an information dot whose information is defined by a distance and a direction from the virtual reference point at an end point expressed by a vector with the virtual reference point being a start point.

\* \* \* \* \*